(12) United States Patent
Michael

(10) Patent No.: US 11,999,435 B2
(45) Date of Patent: Jun. 4, 2024

(54) VEHICLE AND VEHICLE COMPONENTS

(71) Applicant: LiteCycle, Inc., Vancouver, WA (US)

(72) Inventor: Jeffrey Michael, Vancouver, WA (US)

(73) Assignee: LiteCycle, Inc., Vancouver, WA (US)

( * ) Notice: Subject to any disclaimer, the term of this patent is extended or adjusted under 35 U.S.C. 154(b) by 393 days.

(21) Appl. No.: 17/348,069

(22) Filed: Jun. 15, 2021

(65) Prior Publication Data

US 2021/0309318 A1 Oct. 7, 2021

Related U.S. Application Data

(60) Continuation-in-part of application No. 16/942,198, filed on Jul. 29, 2020, now Pat. No. 11,034,408.
(Continued)

(51) Int. Cl.
*B62K 25/22* (2006.01)
*B62K 17/00* (2006.01)
(Continued)

(52) U.S. Cl.
CPC .............. *B62K 25/22* (2013.01); *B62K 17/00* (2013.01); *B62K 25/005* (2013.01); *B62K 25/24* (2013.01);
(Continued)

(58) Field of Classification Search
CPC ...... B62K 25/22; B62K 17/00; B62K 25/005; B62K 25/24; B62K 25/26; B62K 25/286;
(Continued)

(56) References Cited

U.S. PATENT DOCUMENTS

| 2,320,489 A | 6/1943 | Turner et al. |
| RE30,547 E * | 3/1981 | Belden ................... B62K 21/10 |
| | | 280/271 |

(Continued)

FOREIGN PATENT DOCUMENTS

| KR | 10-2004-0045526 | 6/2004 |
| KR | 10-2008-0093666 | 10/2008 |

(Continued)

OTHER PUBLICATIONS

International Preliminary Report on Patentability and Written Opinion of the International Searching Authority for International Application No. PCT/US2014/029751 which is associated with U.S. Appl. No. 14/854,037, dated Sep. 15, 2015, The International Bureau of WIPO, Geneva, Switzerland.
(Continued)

*Primary Examiner* — James A English
*Assistant Examiner* — Matthew Joseph Ganci
(74) *Attorney, Agent, or Firm* — Gardner, Linn, Burkhart & Ondersma LLP

(57) ABSTRACT

A position adjusting system for use in a vehicle includes a seat for supporting a rider, a rear wheel and a steerable front wheel, a steering arrangement including a handle bar for allowing the rider to control the steerable wheel, and a hub for interconnecting the components of the wheeled vehicle. The steerable wheel is steerable about at least two axes. The position adjusting system includes an adjustable seat support movably connected to the hub, an adjustable handle bar support movably connected to the hub, and a releasable position locking system configured to lock the position of the components of the vehicle relative to the hub. The hub includes a first portion and second portion, wherein the first and second portions are moveably connected to one another, (Continued)

such as by pivoting, sliding, or a combination of pivoting and sliding.

20 Claims, 32 Drawing Sheets

Related U.S. Application Data which is a division of application No. 16/286,617, filed on Feb. 27, 2019, now abandoned, which is a continuation of application No. 15/582,663, filed on Apr. 29, 2017, now Pat. No. 10,227,105, which is a continuation of application No. 14/854,037, filed as application No. PCT/US2014/029751 on Mar. 14, 2014, now Pat. No. 9,669,894.

(60) Provisional application No. 61/786,586, filed on Mar. 15, 2013.

(51) Int. Cl.
*B62K 25/00* (2006.01)
*B62K 25/24* (2006.01)
*B62K 25/26* (2006.01)
*B62K 25/28* (2006.01)
*B62M 17/00* (2006.01)

(52) U.S. Cl.
CPC ............ *B62K 25/26* (2013.01); *B62K 25/286* (2013.01); *B62M 17/00* (2013.01)

(58) Field of Classification Search
CPC ................ B62K 21/005; B62K 25/30; B62K 2025/044; B62K 2025/045; B62K 2025/048; B62M 17/00; B62J 1/04; B62J 2001/085
See application file for complete search history.

(56) References Cited

U.S. PATENT DOCUMENTS

| | | | |
|---|---|---|---|
| 4,502,727 A | | 3/1985 | Holcomb |
| 4,909,537 A | * | 3/1990 | Tratner ................ B62K 25/005 403/100 |
| 5,282,517 A | | 2/1994 | Prince |
| 5,498,013 A | | 3/1996 | Hwang |
| 5,611,557 A | | 3/1997 | Farris et al. |
| 5,629,524 A | | 5/1997 | Stettner et al. |
| 6,112,840 A | | 9/2000 | Forbes |
| 6,119,449 A | | 9/2000 | Kohler |
| 6,131,934 A | | 10/2000 | Sinclair |
| 6,203,042 B1 | | 3/2001 | Wilcox |
| 6,206,397 B1 | | 3/2001 | Klassen et al. |
| 6,276,234 B1 | | 8/2001 | Harrington |
| 6,450,520 B1 | | 9/2002 | Girard |
| 6,543,308 B2 | | 4/2003 | Harrington |
| 7,104,158 B2 | | 9/2006 | Harrington |
| 7,128,329 B2 | | 10/2006 | Weagle |
| 7,316,288 B1 | | 1/2008 | Bennett et al. |
| 7,450,101 B2 | | 11/2008 | Arimoto et al. |
| 7,806,217 B2 | | 10/2010 | Hasegawa et al. |
| 8,074,381 B2 | | 12/2011 | Harrington |
| 8,100,425 B2 | * | 1/2012 | Raynor ................ B62K 25/28 280/771 |
| 8,136,829 B1 | | 3/2012 | Kang et al. |
| 9,056,644 B2 | | 6/2015 | Hudak |
| 2003/0038448 A1 | | 2/2003 | Efflandt, Sr. |
| 2003/0092534 A1 | | 5/2003 | Forcillo |
| 2003/0146596 A1 | | 8/2003 | Muser |
| 2004/0239071 A1 | | 12/2004 | Chamberlain et al. |
| 2004/0239072 A1 | | 12/2004 | Chou |
| 2004/0239158 A1 | | 12/2004 | Clutton |
| 2005/0057018 A1 | | 3/2005 | Saiki |
| 2005/0236804 A1 | | 10/2005 | Alonzao |
| 2006/0061059 A1 | * | 3/2006 | Lesage ................ B62K 25/286 280/284 |
| 2006/0064223 A1 | | 3/2006 | Voss |
| 2006/0071444 A1 | | 4/2006 | Griffiths |
| 2006/0197306 A1 | | 9/2006 | O'Connor |
| 2008/0073868 A1 | | 3/2008 | Weagle |
| 2009/0102158 A1 | * | 4/2009 | Antonot ............... B62K 25/286 280/284 |
| 2010/0109282 A1 | | 5/2010 | Weagle |
| 2010/0264623 A1 | | 10/2010 | Peterson |
| 2011/0037580 A1 | | 2/2011 | Lin |
| 2011/0095507 A1 | | 4/2011 | Plantet et al. |
| 2011/0272909 A1 | | 11/2011 | Twers |
| 2012/0126506 A1 | | 5/2012 | Zawistowski |
| 2012/0166044 A1 | | 6/2012 | Battlogg et al. |
| 2012/0326416 A1 | | 12/2012 | Talavasek |
| 2013/0154308 A1 | | 6/2013 | Sotoyama et al. |
| 2013/0249188 A1 | | 9/2013 | Beale |
| 2014/0159338 A1 | | 6/2014 | Thoma |
| 2014/0210180 A1 | | 7/2014 | Hudak |
| 2014/0221158 A1 | | 8/2014 | Mabey et al. |
| 2014/0274565 A1 | | 9/2014 | Boyette et al. |
| 2015/0307152 A1 | | 10/2015 | van Steenwyk |
| 2015/0353160 A1 | | 12/2015 | Augustinoy et al. |
| 2016/0153515 A1 | | 6/2016 | Ebersbach et al. |
| 2018/0200566 A1 | | 7/2018 | Weston et al. |

FOREIGN PATENT DOCUMENTS

| | | |
|---|---|---|
| KR | 10-2011-0002511 | 1/2011 |
| KR | 10-2011-0016766 | 2/2011 |
| WO | WO 2012-029115 | 3/2012 |

OTHER PUBLICATIONS

ISR and Written Opinion for related PCT/US2014/029751 dated Sep. 16, 2014.

* cited by examiner

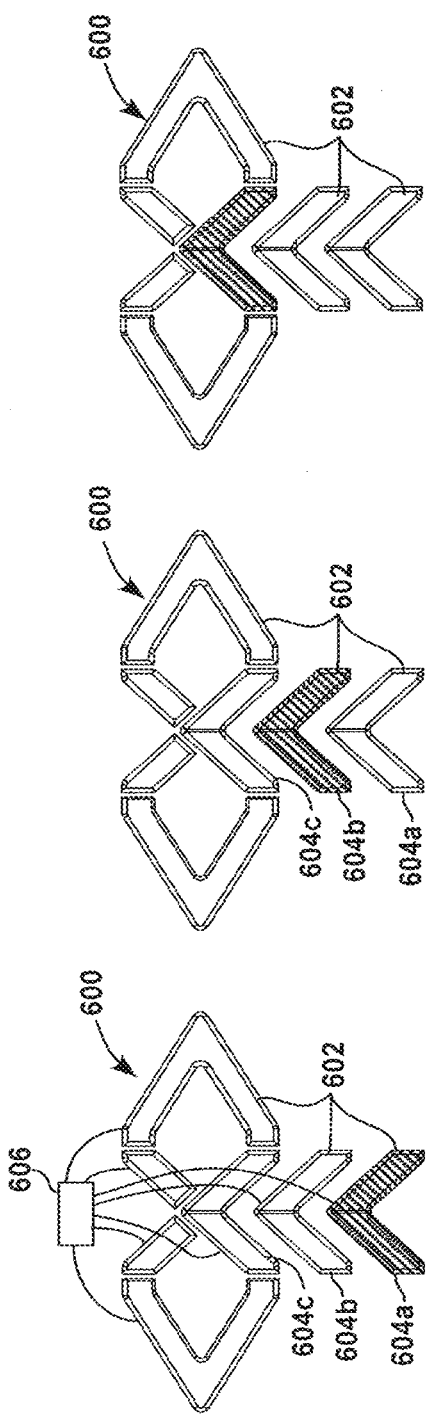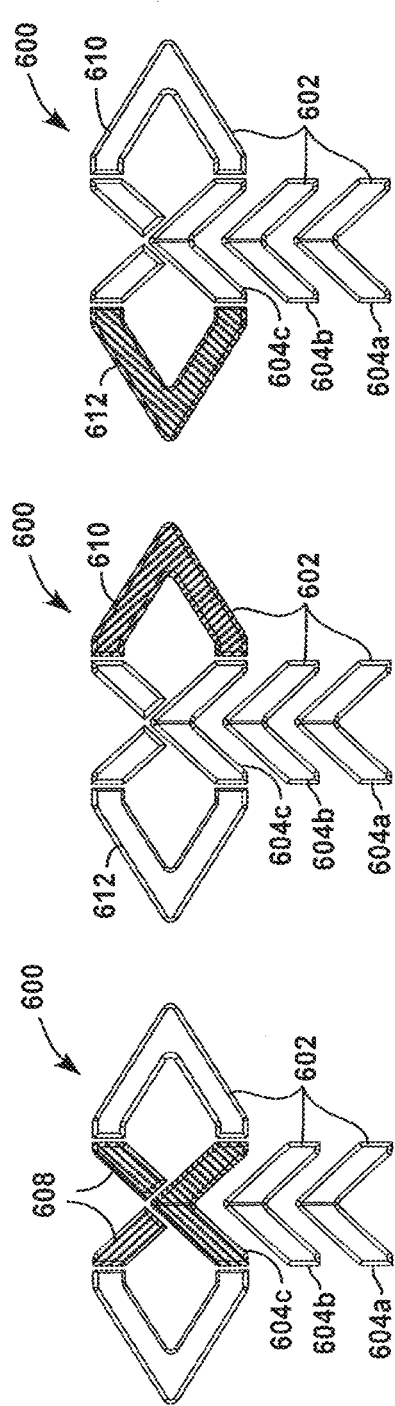

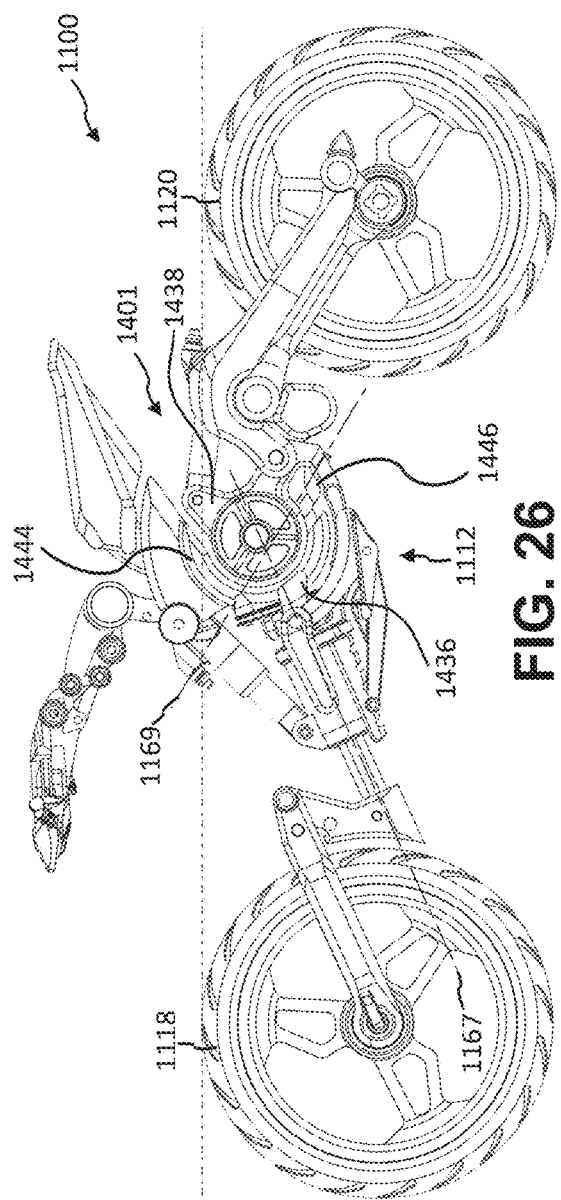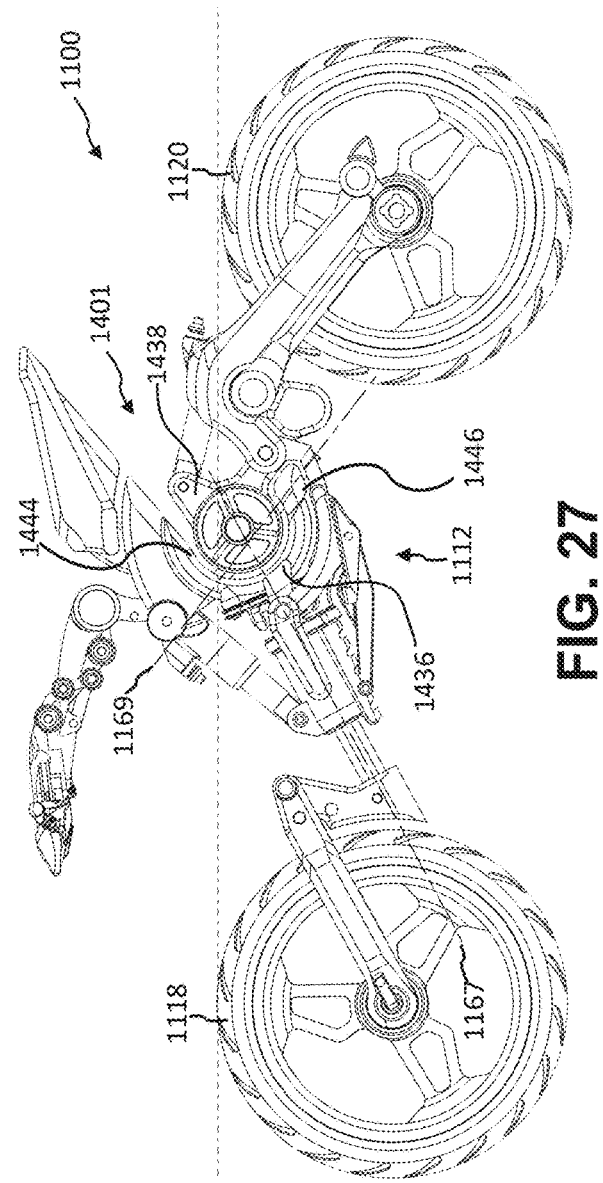

VEHICLE AND VEHICLE COMPONENTS

CROSS REFERENCE TO RELATED APPLICATIONS

The present application is a continuation-in-part application of U.S. patent application Ser. No. 16/942,198 filed on Jul. 29, 2020, which will issue as U.S. Pat. No. 11,034,408 on Jun. 15, 2021, which is a divisional application of abandoned U.S. patent application Ser. No. 16/286,617 filed on Feb. 27, 2019, which is a continuation application of U.S. patent application Ser. No. 15/582,663 filed on Apr. 29, 2017 and issued as U.S. Pat. No. 10,227,105 on Mar. 12, 2019, which is a continuation application of U.S. patent application Ser. No. 14/854,037 filed on Sep. 15, 2015 and issued as U.S. Pat. No. 9,669,894 on Jun. 6, 2017, which is the U.S. National Stage of International Patent Application No. PCT/US2014/029751 filed on Mar. 14, 2014, which claims priority to and the benefit of U.S. Provisional patent application Ser. No. 61/786,586 filed on Mar. 15, 2013, the disclosures of which are hereby incorporated herein by reference in their entirety.

BACKGROUND AND FIELD OF THE INVENTION

The present invention relates to methods and arrangements for providing vehicles and vehicle components including suspension systems, steering systems, rotational drive systems, ergonomic position adjusting systems, and safety systems.

Present day vehicles have grown to a high level of popularity and many are highly specialized for certain applications. These specialized applications impose extraordinary requirements on various vehicle systems and components. Despite these extraordinary requirements, many of the basic vehicle systems such as suspension systems, steering systems, driveline systems, ergonomic position adjusting systems, and safety systems have remained relatively unchanged for quite some time.

SUMMARY OF THE INVENTION

In some aspects, the present disclosure provides a suspension system for use in a vehicle that has a main vehicle body and a suspended assembly that supports the main body of the vehicle. The suspended assembly assists in providing directional control of the vehicle and stability in a lateral direction relative to a normal straight-ahead direction of travel of the vehicle. The suspension system includes a first suspension arrangement that movably connects the suspended assembly to the main vehicle body and controls movement of the suspended assembly relative to the main vehicle body through a range of motion along a first path that is primarily perpendicular to the lateral direction. The suspension system also includes a second suspension arrangement that controls movement of the suspended assembly relative to the main vehicle body through a range of motion along a second path that is also primarily perpendicular to the lateral direction when the vehicle is traveling in the normal straight-ahead direction. The second path of the second suspension arrangement is different than the first path of the first suspension arrangement such that the combination of the range of motion of the first suspension arrangement along the first path and the range of motion of the second suspension arrangement along the second path result in an overall range of motion for the suspended assembly relative to the main body that is defined by a surface area when the vehicle is traveling in the normal straight-ahead direction.

In some aspects, the surface area is a planar surface area.

In some aspects, the surface area is a curved surface area.

In some aspects, the first path of the first suspension arrangement is primarily horizontal and parallel with the normal straight-ahead direction of travel of the vehicle and the second path of the second suspension arrangement is primarily vertical and perpendicular to the normal straight-ahead direction of travel of the vehicle.

In some aspects, the first path of the first suspension arrangement is oriented at an angle in the range of about zero to thirty degrees (0°-30°) from horizontal.

In some aspects, the suspended assembly that supports the vehicle includes a component selected from a group of components consisting of a wheel, a ski, a skid, a float, and a tread.

In some aspects, the second suspension arrangement movably connects the suspended assembly to the first suspension arrangement.

In some aspects, the first suspension arrangement includes a telescopic shock absorber having a longitudinal axis with a first end attached to the main body of the vehicle and a second end that is telescopically movable along the longitudinal axis of the telescopic shock absorber relative to the first end of the telescopic shock absorber and the main body of the vehicle. The movable second end of the telescopic shock absorber controls movement of the suspended assembly relative to the main vehicle body through the range of motion along the first path.

In some aspects, the second suspension arrangement includes an articulated linkage having a first link, a second link, a third link, and a fourth link with each of the links having a first and a second spaced apart pivot point. The articulated linkage connects the suspended assembly to the first suspension arrangement such that 1) the first link is fixed to the movable second end of the telescopic shock absorber of the first suspension arrangement, 2) the first pivot point of the first link is pivotally connected to the first pivot point of the second link at a first articulated linkage pivot point, 3) the second pivot point of the first link is pivotally connected to the first pivot point of the third link at a second articulated linkage pivot point, 4) the second pivot point of the second link is pivotally connected to the first pivot point of the fourth link at a third articulated linkage pivot point, 5) the second pivot point of the third link is pivotally connected to the second pivot point of the fourth link at a fourth articulated linkage pivot point, and 6) the fourth link is connected to and supports the suspended assembly. The second suspension arrangement includes a shock absorber connected between the first link that is fixed to the movable second end of the telescopic shock absorber of the first suspension arrangement and one of the other links of the articulated linkage. The shock absorber is connected to the articulated linkage such that it controls movement of the suspended assembly relative to the movable second end of the telescopic shock absorber of the first suspension arrangement through the range of motion along the second path.

In some aspects, the suspended assembly is a steerable suspended assembly with the suspended assembly being connected to the second suspension arrangement such that at least portions of the suspended assembly are rotatable relative to the second suspension arrangement about a first steering axis.

In some aspects, the rotation of the rotatable portions of the suspended assembly about the first steering axis is controlled by a steering assembly selected from a group of steering assemblies consisting of a hydraulic steering assembly, a pneumatic steering assembly, a cable steering assembly, a rack and pinion steering assembly, and a mechanical push rod steering assembly.

In some aspects, the second end of the telescopic shock absorber is rotatable about the longitudinal axis of the telescopic shock absorber relative to the first end of the telescopic shock absorber and the main body of the vehicle thereby providing a second steering axis.

In some aspects, the rotation of the second end of the telescopic shock absorber is controlled by a steering assembly selected from a group of steering assemblies consisting of a hydraulic steering assembly, a pneumatic steering assembly, a cable steering assembly, a rack and pinion steering assembly, and a mechanical push rod steering assembly.

In some aspects, the second suspension arrangement movably connects the suspended assembly to the main vehicle body.

In some aspects, the suspension system includes an articulated linkage that connects the suspended assembly to the main vehicle body. The first suspension arrangement includes a first biasing and dampening arrangement connected between the main vehicle body and the articulated linkage to control movement of the suspended assembly relative to the main vehicle body through the range of motion along the first path. The second suspension arrangement includes a second biasing and dampening arrangement connected between the main vehicle body and the articulated linkage to control movement of the suspended assembly relative to the main vehicle body through the range of motion along the second path.

In some aspects, the first and second biasing and dampening arrangements are shock absorbers.

In some aspects, a plurality of the links of the articulated linkage are rotational drive transmitting links that include a first and a second spaced apart hinge point. The spaced apart hinge points each having an associated axis of rotation that provides a pivot point for the articulated linkage. Each rotational drive transmitting link includes 1) a driven member that is supported and rotates about the axis of the first hinge point of the rotational drive transmitting link and the associated pivot point of the articulated linkage, 2) a drive member that is supported and rotates about the axis of the second hinge point of the rotational drive transmitting link and the associated pivot point of the articulated linkage, and 3) a rotational drive mechanism for transmitting rotational movement from the driven member of the rotational drive transmitting link to the drive member of the rotational drive transmitting link. The plurality of rotational drive transmitting links are connected to one another in series with the second hinge point of a given one of the rotational drive transmitting links being pivotally connected to the first hinge point of the next rotational drive transmitting link such that the drive member of the given rotational drive transmitting link rotationally drives the driven member of the next rotational drive transmitting link to rotate about the associated pivot point of the articulated linkage thereby providing the transmission of a rotational drive through the series of rotational drive transmitting links.

In some aspects, the rotational drive mechanism is a mechanism selected from the group of mechanisms consisting of a chain drive, a belt drive, a shaft drive, and a gear drive.

In some aspects, each rotational drive transmitting link includes an enclosed space that houses the associated drive member, driven member, and drive mechanism of the rotational drive transmitting link.

In some aspects, the articulated linkage has a first link, a second link, a third link, and a fourth link with each of the links having a first and a second spaced apart pivot point. The articulated linkage connects the suspended assembly to the main vehicle body such that 1) the first pivot point of the first link and the first pivot point of the fourth link are pivotally connected to one another and pivotally connected to the main body of the vehicle at a first articulated linkage pivot point, 2) the second pivot point of the first link is pivotally connected to the first pivot point of the second link at a second articulated linkage pivot point, 3) the second pivot point of the fourth link is pivotally connected to the first pivot point of the third link at a third articulated linkage pivot point, and 4) the second pivot point of the second link and the second pivot point of the third link are pivotally connected to one another at a fourth articulated linkage pivot point. The suspended assembly is connected to a desired portion of the articulated linkage. The first suspension arrangement includes a first biasing and dampening arrangement connected between the main vehicle body and one of the links of the articulated linkage to control movement of the suspended assembly relative to the main vehicle body through the range of motion along the first path. The second suspension arrangement includes a second biasing and dampening arrangement connected between the main vehicle body and another one of the links of the articulated linkage to control movement of the suspended assembly relative to the main vehicle body through the range of motion along the second path.

In some aspects, the first and second biasing and dampening arrangements are shock absorbers.

In some aspects, the vehicle is a human powered vehicle selected from the group of vehicles consisting of a bicycle, a tricycle, and a quadracycle.

In some aspects, the suspension system includes a sensing arrangement for sensing certain characteristics of the movement of the suspension system and the suspension system includes an arrangement for modifying the function of elements of the suspension system in response to the certain characteristics sensed by the sensing arrangement.

In some aspects, the present disclosure provides a rotational drive transmission for use in a vehicle. The transmission includes an articulated linkage having a plurality of rotational drive transmitting links that each have a first and a second spaced apart hinge point. The spaced apart hinge points each have an associated axis of rotation that provides a pivot point for the articulated linkage. Each rotational drive transmitting link includes 1) a driven member that is supported and rotates about the axis of the first hinge point of the rotational drive transmitting link and the associated pivot point of the articulated linkage, 2) a drive member that is supported and rotates about the axis of the second hinge point of the rotational drive transmitting link and the associated pivot point of the articulated linkage, and 3) a rotational drive mechanism for transmitting rotational movement from the driven member of the rotational drive transmitting link to the drive member of the rotational drive transmitting link. The plurality of rotational drive transmitting links are connected to one another in series with the second hinge point of a given one of the rotational drive transmitting links being pivotally connected to the first hinge point of a next rotational drive transmitting link such that the drive member of the given rotational drive transmitting link rotationally drives the driven member of the next rotational drive transmitting link to rotate about the associated pivot point of the articulated linkage thereby providing the transmission of a rotational drive through the series of rotational drive transmitting links.

In some aspects, the rotational drive mechanism for transmitting rotational movement from the driven member of one of the rotational drive transmitting links to the drive member of that rotational drive transmitting link includes a shifting arrangement for changing the drive ratio between the driven member and the drive member of that rotational drive transmitting link.

In some aspects, the shifting arrangement includes a selecting arrangement for selecting any given one of a plurality of different drive ratios.

In some aspects, the rotational drive mechanism is a mechanism selected from the group of mechanisms consisting of a chain drive, a belt drive, a shaft drive, and a gear drive.

In some aspects, each rotational drive transmitting link includes an enclosed space that houses the associated drive member, driven member, and drive mechanism of the rotational drive transmitting link.

In some aspects, the transmission includes a first and a second rotational drive transmitting link. The vehicle is a wheeled vehicle that includes a main body, a suspended wheel assembly including a drive wheel that supports the main body of the vehicle, a suspension system for connecting the suspended wheel assembly to the main body of the vehicle, and a crank set assembly having a crank set rotational axis, the crank set allowing a rider of the vehicle to input a rotational drive about the crank set rotational axis. The articulated linkage provides at least a portion of the suspension system for connecting the suspended wheel assembly to the main body of the vehicle. The first rotational drive transmitting link is pivotally connected to the main body of the vehicle with the driven member of the first rotational drive transmitting link being rotationally connected to the crank set assembly such that the rotational drive input from the rider drives the driven member of the first rotational drive transmitting link. The drive wheel is rotationally connected to the drive member of the second rotational drive transmitting link such that the drive member of the second rotational drive transmitting link drives the drive wheel thereby causing the rotational drive input from the rider to drive the drive wheel.

In some aspects, the vehicle is a human powered vehicle selected from the group of vehicles consisting of a bicycle, a tricycle, and a quadracycle.

In some aspects, the present disclosure provides a rear wheel suspension adjusting arrangement for use in a vehicle including a frame having a front and a back, a suspended rear drive wheel that supports the frame, and a suspension system for connecting the rear drive wheel to the frame. The suspension adjusting arrangement includes a configuration adjusting arrangement for changing the positioning of the suspension system relative to the frame such that the suspension system may be moved into an uphill configuration when the vehicle is traveling uphill and such that the suspension system may be moved into a downhill configuration when the vehicle is traveling downhill. The suspension adjusting arrangement also includes an activating arrangement for activating the configuration adjusting arrangement to cause the configuration adjusting arrangement to change the positioning of the suspension system relative to the frame while the vehicle is being used.

In some aspects, the vehicle includes a front wheel and the vehicle has a wheel base that is defined by the distance between the front wheel and the rear wheel. The suspension adjusting arrangement changes the wheel base of the vehicle as the configuration adjusting arrangement moves the suspension system between the uphill configuration and the downhill configuration.

In some aspects, the vehicle is a human powered vehicle selected from the group of vehicles consisting of a bicycle, a tricycle, and a quadracycle.

In some aspects, the activating arrangement includes a sensor arrangement for sensing when the vehicle is traveling uphill and downhill.

In some aspects, the activating arrangement is manually controlled by an operator of the vehicle.

In some aspects, the configuration adjusting arrangement includes an actuator selected from the group of actuators consisting of a motorized actuator, a pneumatic actuator, a hydraulic actuator, a cable driven actuator, a push rod driven actuator, and a magnetic actuator.

In some aspects, the vehicle further includes a crank set assembly having a crank set rotational axis. The crank set is configured to allow a rider to input a rotational drive about the crank set rotational axis for driving the rear drive wheel. The rear wheel has a rear wheel axis and the suspension system has an effective swing arm length that extends from the crank set rotational axis to the rear wheel axis. The configuration adjusting arrangement decreases the effective swing arm length when the vehicle is traveling uphill and increases the effective swing arm length when the vehicle is traveling downhill.

In some aspects, the activating arrangement includes a pivoting member that is pivotally connected to the frame of the vehicle about a pivoting member rotational axis that is parallel to, but spaced apart from, the crank set rotational axis. The crank set rotational axis is located below the pivoting member rotational axis when the vehicle is in an upright position such that the weight of the rider on the crank set causes the pivoting member to pivot causing the crank set rotational axis to move toward the front of the frame when the vehicle is traveling downhill and causing the crank set rotational axis to move toward the rear of the frame when the vehicle is traveling uphill. The configuration adjusting arrangement includes a suspension pivot point that is located on the pivoting member above the pivoting member rotational axis when the vehicle is in the upright position. The suspension system is pivotally connected to the suspension pivot point of the pivoting member of the suspension adjusting arrangement such that the weight of the rider on the crank set causes the pivoting member to pivot with the suspension pivot point moving toward the rear of the frame causing the suspension system to move into a downhill configuration when the vehicle is traveling downhill and with the suspension pivot point moving toward the front of the frame causing the suspension system to move into a uphill configuration when the vehicle is traveling uphill.

In some aspects, the suspension adjusting arrangement includes a dampening arrangement for dampening the speed of the pivoting of the pivoting member of the activating arrangement.

In some aspects, the present disclosure provides a steering system for use in a wheeled vehicle that has a main vehicle body and a steerable wheel that supports the main body of the vehicle. The steerable wheel has a wheel axis around which the wheel rotates in a wheel rotation plane that is perpendicular to the wheel axis. The steerable wheel assists in providing directional control of the vehicle and stability in a lateral direction relative to a normal straight-ahead direction of travel for the vehicle. The steering system includes a first steering arrangement that controls movement of the steerable wheel relative to the main vehicle body such that the steerable wheel pivots about a first steering axis. The steering system also includes a second steering arrangement that controls movement of the steerable wheel relative to the main vehicle body such that the steerable wheel pivots about a second steering axis, the second steering axis being different than the first steering axis.

In some aspects, the first steering axis is primarily vertical allowing the first steering arrangement to move the steerable wheel through a range of motion that pivots the wheel rotation plane of the steerable wheel relative to the normal straight-ahead direction of travel. Also, the second steering axis is primarily horizontal allowing the second steering arrangement to move the steerable wheel through a range of motion that tilts the wheel rotation plane of the steerable wheel relative to the normal straight-ahead direction of travel.

In some aspects, the second steering axis of the second steering arrangement is oriented at an angle in the range of about zero to thirty degrees (0°-30°) from horizontal.

In some aspects, the vehicle is a human powered vehicle selected from the group of vehicles consisting of a bicycle, a tricycle, and a quadracycle.

In some aspects, the present disclosure provides a steering system for use in a vehicle that includes a main vehicle body, a suspended assembly that supports the main body of the vehicle, and a suspension arrangement for connecting the suspended assembly to the main body of the vehicle. The suspended assembly assists in providing directional control of the vehicle. The steering system includes a wheel axle that makes up a portion of the suspended assembly. The wheel axle has an axle rotational axis and two bearing surfaces that are spaced apart from one another along the wheel axle rotational axis and the wheel axle defines an opening within the wheel axle that is located between the two spaced apart bearing surfaces. The steering system also includes a steering arrangement that is located within the opening within the wheel axle. The steering arrangement defines a steering axis and the steering arrangement is rotatably connected to the wheel axle such that the wheel axle is movable about the steering axis. The steering system further includes a steering actuator that is connected to the steering arrangement such that the steering actuator controls the movement of the wheel axle about the steering axis.

In some aspects, the suspended assembly that supports the vehicle includes a component selected from a group of components consisting of a wheel, a ski, a skid, a float, and a tread.

In some aspects, the vehicle is a human powered, wheeled vehicle selected from the group of vehicles consisting of a bicycle, a tricycle, and a quadracycle.

In some aspects, the opening within the wheel axle has a shape selected from the group of shapes consisting of a cylinder, a sphere, a combination of portions of a sphere, and a combination of one or more cylinders and portions of a sphere.

In some aspects, the steering actuator includes a steering assembly selected from a group of steering assemblies consisting of a hydraulic steering assembly, a pneumatic steering assembly, a cable steering assembly, a rack and pinion steering assembly, and a mechanical push rod steering assembly.

In some aspects, portions of the steering actuator are enclosed within portions of the suspension arrangement.

In some aspects, the present disclosure provides a position adjusting arrangement, assembly, or system for use in a wheeled vehicle including a seat for supporting a rider, a plurality of wheels with at least one of the wheels being a steerable wheel, a steering arrangement having a handle bar for allowing the rider to control the steerable wheel, and a hub for interconnecting the components of the vehicle. The position adjusting arrangement includes an arrangement for connecting the wheels to the hub and an adjustable seat support arrangement for connecting the seat to the hub. The adjustable seat support arrangement is movably connected to the hub. The position adjusting arrangement also includes an adjustable handle bar support arrangement for connecting the handle bar to the hub. The adjustable handle bar support arrangement is movably connected to the hub. The position adjusting arrangement further includes a releasable position locking arrangement or system that is releasable by the rider when the rider is riding the vehicle. The position locking arrangement is configured to lock the relative positions of the hub, the adjustable seat support arrangement, and the adjustable handle bar support arrangement when the position locking arrangement is not released by the rider.

In some aspects, the vehicle is a human powered vehicle selected from the group of vehicles consisting of a bicycle, a tricycle, and a quadracycle.

In some aspects, the position adjusting arrangement further includes a variable length link for connecting the adjustable seat support arrangement to the adjustable handle bar support arrangement. The variable length link has a first end that is pivotally connected to the adjustable handle bar support arrangement and a second end that is pivotally connected to the adjustable seat support arrangement. The position locking arrangement includes a link locking arrangement or lock for locking the variable length link at a desired length.

In some aspects, the adjustable seat support arrangement and the adjustable handle bar support arrangement are pivotally connected to one another at a same pivot point that they are pivotally connected to the hub.

In some aspects, the hub includes a first portion that is connected to the wheels, a second portion that is connected to the adjustable seat support arrangement and the adjustable handle bar support arrangement, and a hub positioning arrangement that is configured to allow the first portion of the hub to move relative to the second portion of the hub. The position locking arrangement includes a hub position locking arrangement of hub position lock for locking the position of the first portion of the hub relative to the second portion of the hub.

In some aspects, the hub positioning arrangement includes a slidable track connecting the first portion of the hub to the second portion of the hub.

In some aspects, the second portion of the hub is connected to the first portion of the hub and the hub positioning arrangement is provided by the pivoting of the second portion of the hub relative to the first portion of the hub.

In some aspects, the present disclosure provides another position adjusting arrangement, assembly, or system for a wheeled vehicle having two steering axes with one or both of the steering axes extending through the main vehicle body. The position adjusting assembly includes a hub arrangement or assembly forming a portion of the main vehicle body and including a first hub portion and a second hub portion that are pivotally movable relative to one another. One or both of the hub portions are be movable relative to one or both of the steering axes. The position adjusting assembly includes a seat support arrangement for connecting the seat to the hub and a handle bar support arrangement for connecting the handle bar to the hub. The hub movably interconnects the vehicle wheels, the seat support, and the handle bar support relative to the main vehicle body.

In some aspects, the seat support and the handle bar support are each moveably connected to the hub and are movable relative to one another and the main vehicle body.

In some aspects, the hub includes a hub positioning arrangement in which the first and second hub portions are connected to one another and the hub positioning arrangement is provided by the pivoting one of the hub portions relative to the other hub portion.

In some aspects, the hub positioning arrangement includes a hub position locking arrangement or hub position lock for locking the positions of the first hub portion and the second hub portion relative to one another.

In some aspects, the wheeled vehicle and position adjusting assembly include a releasable position locking arrangement or system to lock the relative positions of the hub, the seat support, and the handle bar support when the position locking arrangement is not released by the rider. The position locking arrangement may be releasable by the rider when the rider is riding the vehicle.

In some aspects, the wheeled vehicle and position adjusting assembly include a first axis steering arrangement or assembly that controls movement of the steerable wheel relative to the main vehicle body about the first steering axis and a second axis steering arrangement or assembly that controls movement of the steerable wheel relative to the main vehicle body about the second steering axis.

In some aspects, the first axis steering assembly and the second axis steering assembly may include a cable steering system disposed along the handle bar support such that the rider can manipulate the cable steering system via the handle bar.

In some aspects, the handle bar is moveable relative to the handle bar support about a first handle bar steering axis. As such, movement of the handle bar about the first handle bar steering axis controls movement of the steerable wheel about the first steering axis.

In some aspects, the handle bar is further moveable relative to the handle bar support about a second handle bar steering axis. As such, movement of the handle bar about the second handle bar steering axis controls movement of the steerable wheel about the second steering axis.

In some aspects, the first axis steering assembly includes a rotatable steering tube assembly positioned between the steerable wheel and the main vehicle body. The longitudinal axis of the steering tube assembly is co-axial with the first steering axis. At least a portion of the steering tube assembly is rotatable relative to the main vehicle body about the first steering axis.

In some aspects, the present disclosure provides another position adjusting system for a wheeled vehicle having two steering axes with one or both of the steering axes extending through the main vehicle body. The position adjusting assembly includes a hub arrangement or assembly forming a portion of the main vehicle body and interconnects the vehicle wheels, the seat, and the handle bars with the main vehicle body. The hub includes a first hub portion and a second hub portion that are movable relative to one another. The position adjusting system includes a seat support for connecting the seat to the hub, a handle bar support for connecting the handle bar to the hub. The position adjusting system further includes a first axis steering arrangement or assembly to control movement of the steerable wheel about the first steering axis and a second axis steering arrangement or assembly to control movement of the steerable wheel about the second steering axis.

In some aspects, the first axis steering assembly includes a cable steering system positioned along the handle bar support. In this aspect, movement of the handle bar about a handle bar steering axis controls movement of the steerable wheel about the first steering axis.

In some aspects, the second axis steering assembly includes a cable steering system positioned along the handle bar support. In this aspect, movement of the handle bar about a handle bar steering axis controls movement of the steerable wheel about the second steering axis.

In some aspects, the cable steering system of the first axis steering assembly may be different than the cable steering system of the second axis steering assembly. In yet another aspect, the handle bar steering axis of the first axis steering assembly may be different than the handle bar steering axis of the second axis steering assembly.

In some aspects, the present disclosure provides a signal arrangement for use in a vehicle by a vehicle operator to indicate the intentions of the operator of the vehicle. The signal arrangement includes a plurality of signaling elements configured to indicate the operator's intention to continue traveling in a primarily straight-ahead direction.

In some aspects, the vehicle is a human powered vehicle selected from the group of vehicles consisting of a bicycle, a tricycle, and a quadracycle.

In some aspects, the plurality of signaling elements include a plurality of vertically spaced apart, upwardly pointing, lighted arrows that are controlled to illuminate in sequence from the lowermost arrow to the uppermost arrow when the operator activates the signal arrangement to indicate the intention to continue traveling in the primarily straight-ahead direction.

In some aspects, the present disclosure provides a bicycle seat for supporting a bicycle rider on a bicycle. The bicycle seat includes a saddle for supporting the rider when the bicycle seat is attached to the bicycle. The saddle has a nose portion located at the front of the saddle when the seat is attached to the bicycle. The bicycle seat also includes a seat mount having a first end configured to allow the bicycle seat to be attached to the bicycle and a second end that is pivotally connected to the saddle such that the seat mount supports the saddle and such that the nose portion of the saddle is free to pivot relative to the seat mount when the seat is attached to the bicycle. The bicycle seat further includes a biasing arrangement connected between the seat mount and the nose portion of the saddle for biasing the nose portion of the saddle into a desired position when the seat is attached to the bicycle. The biasing arrangement allows the nose portion of the saddle to pivot downward relative to the rider when pressure is applied to the nose portion of the saddle.

In some aspects, the bicycle includes a frame and the seat mount includes a seat post for attaching the seat to the frame, the seat post being slidably connected to the frame to allow the position of the seat to be adjusted relative to the frame.

In some aspects, the present disclosure provides a collision impact reduction system for reducing the impact force associated with a collision on a passenger in a passenger carrying vehicle. The collision impact reduction system including a suspended passenger compartment for carrying at least one passenger. The suspended passenger compartment is supported within the vehicle such that the suspended passenger compartment is movable within the vehicle in at least one direction in response to the vehicle colliding with another object. The collision impact reduction system also includes at least one shock absorbing mount for supporting the suspended passenger compartment within the vehicle. The shock absorbing mount is attached between the suspended passenger compartment and another portion of the vehicle to dampen the impact force associated with the collision that is transferred from the vehicle to the suspended passenger compartment and passenger in the at least one direction that the suspended passenger compartment is able to move within the vehicle.

In some aspects, the collision impact reduction system further includes a guide track that extends in a longitudinal direction within the vehicle. The suspended passenger compartment is connected to the guide track such that the suspended passenger compartment is movable in the longitudinal direction.

In some aspects, the suspended passenger compartment is connected to the guide track such that the suspended passenger compartment may also pivot about the longitudinal direction of the guide track.

In some aspects, the at least one shock absorbing mount includes a front shock absorbing mount and a rear shock absorbing mount. The front shock absorbing mount is configured to dampen a frontal impact to the vehicle and the rear shock absorbing mount is configured to dampen a rear impact to the vehicle.

In some aspects, the at least one shock absorbing mount is provided by a shock absorbing mount selected from the group consisting of a shock absorber, a foam mount, and a polymer mount.

In some aspects, the suspended passenger compartment includes a roll bar.

In some aspects, the vehicle includes a steering system having a steering wheel located within the suspended passenger compartment for steering the vehicle. The steering system is configured to allow movement of the steering wheel with the suspended passenger compartment relative to the rest of the vehicle while maintaining steering control of the vehicle with the steering wheel.

In some aspects, the steering system is a steering system selected from the group of steering systems consisting of a steering system having a telescoping articulated linkage, an electric steering system, a hydraulic steering system, a pneumatic steering system and a magnetically coupled steering system.

These and other objects, advantages, purposes and features of this invention will become apparent upon review of the following specification in conjunction with the drawings.

BRIEF DESCRIPTION OF THE DRAWINGS

FIGS. 13a, 13b, 13c, 13d, 13e, and 13f are rear views of a signal arrangement in accordance with aspects of the present invention.

FIG. 26 is a left side view of the motorcycle of FIG. 18, depicting the motorcycle in a relaxed or upright riding position.

FIG. 27 is a left side view of the motorcycle of FIG. 18, depicting the motorcycle in a tactical or forward riding position.

Like reference numerals in the various drawings indicate like elements.

DESCRIPTION OF THE PREFERRED EMBODIMENTS

Aspects of the present disclosure relate to methods and arrangements for providing suspension systems, steering systems, rotational drive systems, ergonomic position adjusting systems, safety systems, and other vehicle systems and components. In the following description, numerous specific details are set forth in order to provide a thorough understanding of the present invention. However, it will be obvious to one skilled in the art that the present invention may be embodied in a wide variety of specific configurations. Also, well known vehicle components and hardware have not been described in detail herein in order not to unnecessarily obscure the present invention.

Some aspects of the present disclosure relate to methods and arrangements for providing variable path suspension systems that may be used in vehicles such as bicycles, motorcycles, automobiles, off-road vehicles, or any other desired vehicle. In accordance with aspects of this disclosure, these variable path suspension systems may utilize multiple suspension arrangements to allow a suspended assembly such as a wheel, tread, ski, skid, float, or any other desired suspended assembly to move along a variable path relative to the rest of the vehicle. The use of a variable path may allow the suspension system to respond to a wide variety of obstacles or terrain while providing improved stability and control of the vehicle.

Figure 1:
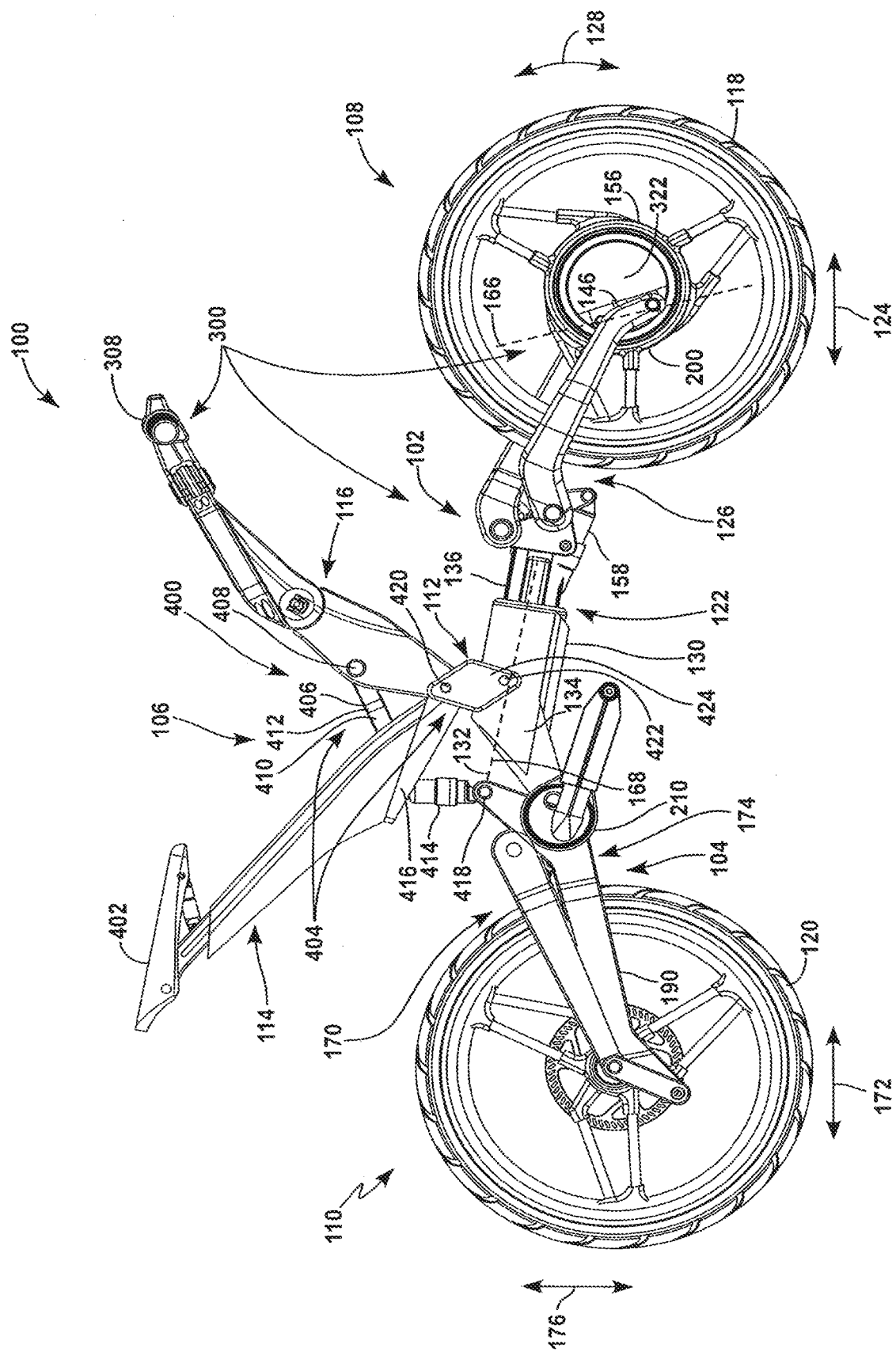
FIG. 1 is a side view of a bicycle in accordance with aspects of the present invention.

Turning to the drawings, wherein like components are designated by like reference numerals throughout the various figures, attention is initially directed to FIG. 1. This figure illustrates a first embodiment of a vehicle 100 designed in accordance with this disclosure. In this example, vehicle 100 takes the form of a bicycle that includes a front suspension system 102 and a rear suspension system 104, both of which are designed in accordance with aspects of this disclosure. Although suspension systems 102 and 104 will be described initially as being part of a bicycle, it should be understood that the suspension systems of the present disclosure may be used in a wide variety of applications and are not limited to bicycles. Instead, these suspension systems may be used in any desired application including a wide variety of vehicles such as motorcycles, automobiles, trucks, off-road vehicles, or any other type of vehicle.

As illustrated in FIG. 1, vehicle 100 includes a main vehicle body 106 and two suspended assemblies 108 and 110 that are configured to support main body 106 of vehicle 100. In this embodiment, main body 106 includes a hub arrangement, assembly, or system 112, a seat support arrangement 114, and a handle bar support arrangement, assembly, or system 116. Front suspended assembly 108 includes a front wheel 118 that is movably connected to main body 106 of vehicle 100 using front suspension system 102. Rear suspended assembly 110 includes a rear wheel 120 that is movably connected to main body 106 of vehicle 100 using rear suspension system 104. Suspended assemblies 108 and 110 are configured to support vehicle 100 and assist in providing directional control of the vehicle and stability in a lateral direction relative to a normal straight-ahead direction of travel of the vehicle.

As will be described in more detail hereinafter, front suspension system 102 and rear suspension system 104 of vehicle 100 are different variations of suspension systems that are both designed in accordance with aspects of this disclosure. Although front suspension system 102 will be described herein as being a suspension system for a steerable front wheel of a bicycle and rear suspension system 104 will be described herein as being a suspension system for a rear wheel of a bicycle, it should be understood that the invention is not limited to these specific applications. Instead, various aspects of front suspension system 102 and/or rear suspension system 104 may be used to provide a suspension system for a front wheel or a rear wheel for any desired vehicle. Furthermore, it should be understood that aspects of the suspension arrangements described herein may be used in any desired suspended assembly in any desired application and remain within the scope of the invention. This includes suspended assemblies that have support elements such as a wheel, a ski, a skid, a float, a tread, or any other support element for a suspended assembly.

Figure 2:
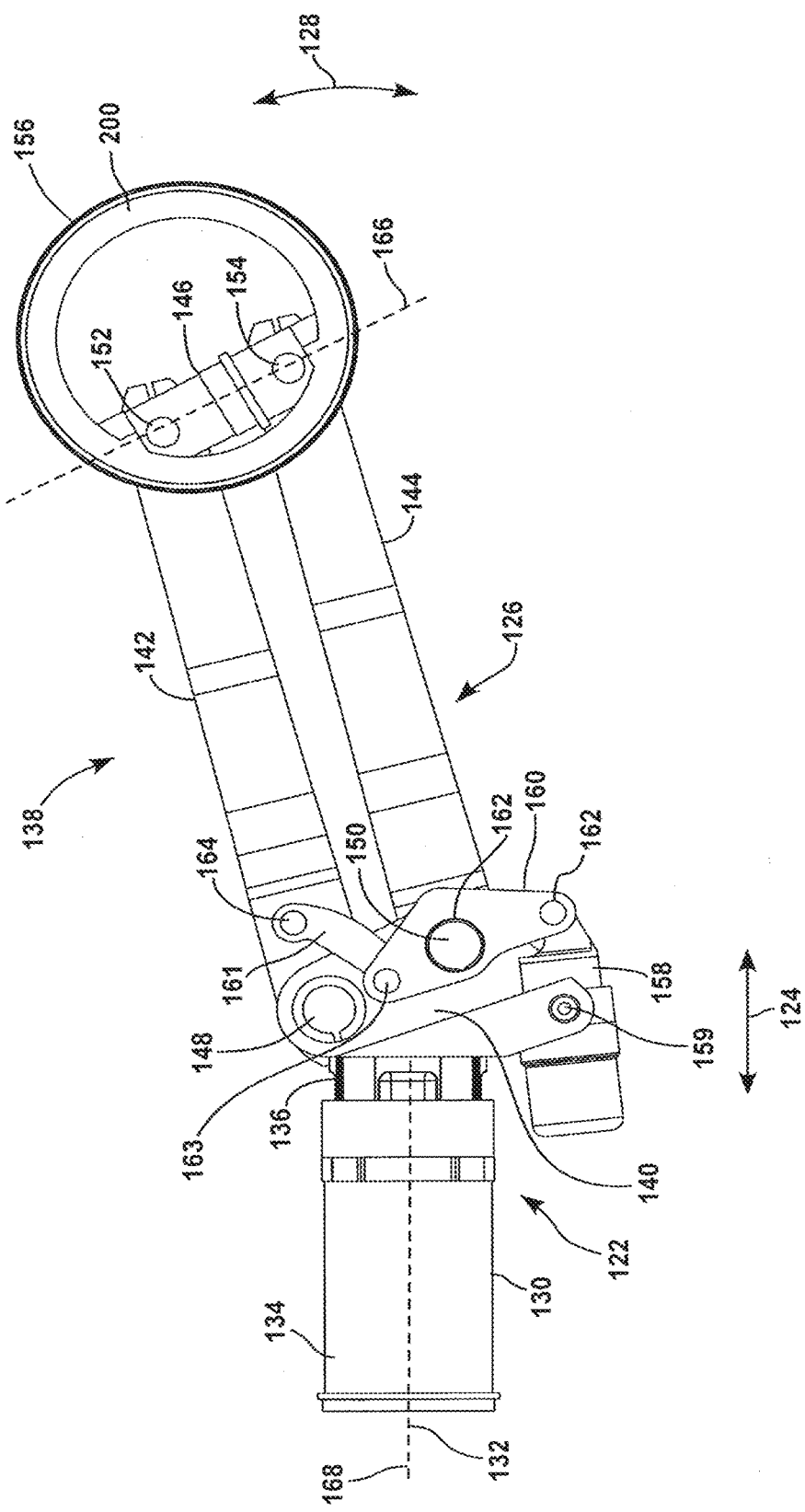
FIG. 2 is a side view of a front suspension system in accordance with aspects of the present invention in a heavily loaded or compressed position.
Figure 3:
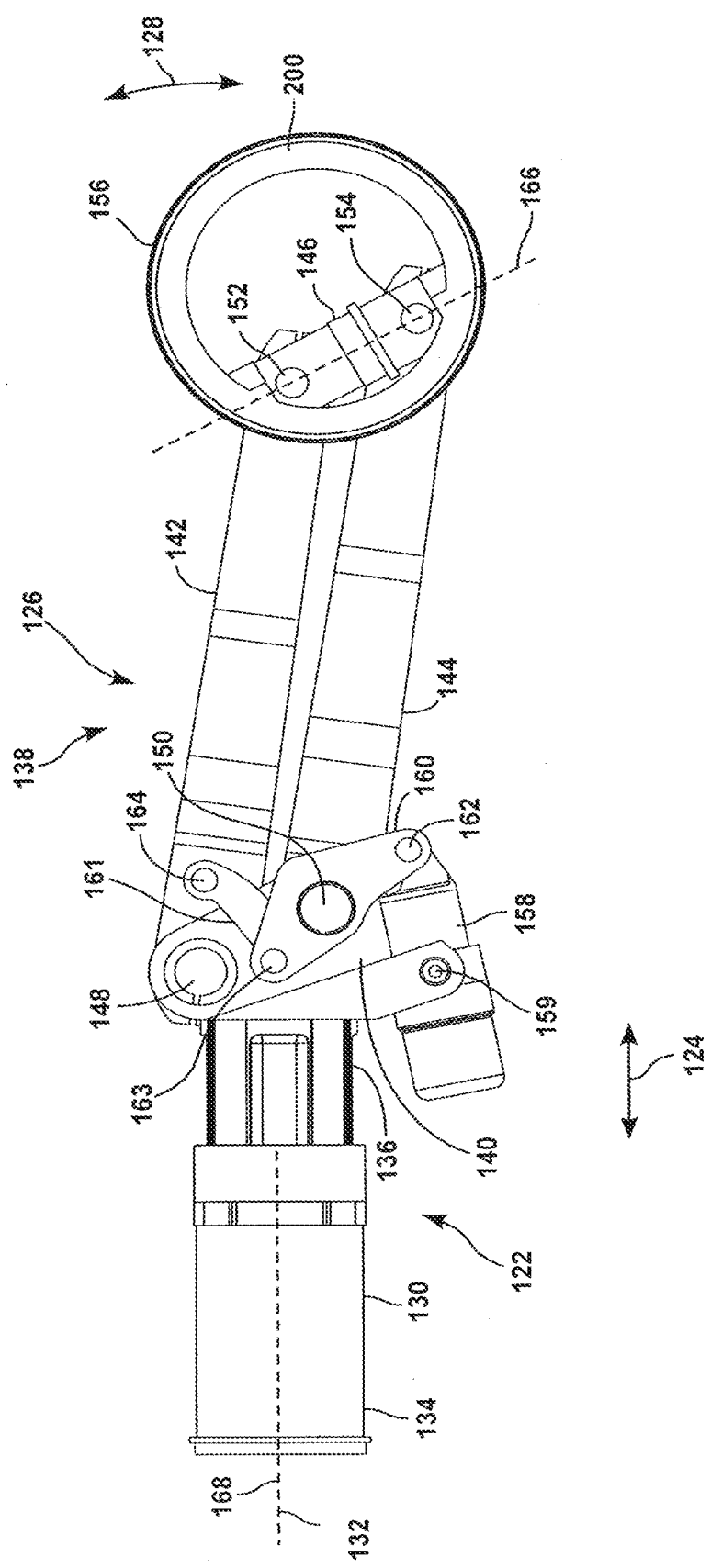
FIG. 3 is a side view of a front suspension system of FIG. 2 in an unloaded position.

Referring now to FIGS. 1-3, a first embodiment of a suspension system in accordance with aspects of this disclosure will be described in more detail with reference to front suspension system 102. Front suspension system 102 includes a first front suspension arrangement 122 that movably connects front suspended assembly 108 (which in this example includes wheel 118) to hub arrangement 112 and main vehicle body 106. First front suspension arrangement 122 controls the movement of front suspended assembly 108 relative to main vehicle body 106 through a range of motion along a first front path 124 that is primarily perpendicular to the lateral direction relative to the normal straight-ahead direction of travel of vehicle 100. This allows front suspension system 102 to support main body 106 of vehicle 100 while also providing lateral stability to the vehicle. In this example, path 124 is primarily horizontal and parallel with the normal straight-ahead direction of travel of the vehicle.

Front suspension system 102 also includes a second front suspension arrangement 126 that controls movement of front suspended assembly 108 relative to main vehicle body 106 through a range of motion along a second front path 128 that is also primarily perpendicular to the lateral direction when vehicle 100 is traveling in the normal straight-ahead direction. This again allows front suspension system 102 to support main body 106 of vehicle 100 while also providing lateral stability to the vehicle. In this example, second front path 128 is primarily vertical and perpendicular to the normal straight-ahead direction of travel of the vehicle.

In accordance with some aspects of this disclosure, second front path 128 of second front suspension arrangement 126 is different than first front path 124 of first front suspension arrangement 122. With this configuration, front suspension system 102 may use the combination of the range of motion of first front suspension arrangement 122 and the range of motion of second front suspension arrangement 126 to provide an overall range of motion for the suspended assembly relative to the main body that is defined by a surface area when the vehicle is traveling in the normal straight-ahead direction. As is the case in the embodiment being described, this surface area may be defined by a planar surface area in configurations in which the first path and the second path fall entirely within a common plane. Alternatively, as will be described in more detail hereinafter, this surface area may be defined by a curved surface area in configurations in which at least one of the first or second paths is a curved path that is not entirely coplanar with the other path.

Although first front path 124 associated with first front suspension arrangement 122 has been described as being primarily horizontal and second front path 128 associated with second front suspension arrangement 126 has been described as being primarily vertical, this is not a requirement. Instead, it should be understood that first and second suspension arrangements 122 and 126 may be oriented in any desired manner and remain within the scope of the invention. This may cause first and second front paths 124 and 128 to be paths that are not primarily horizontal and vertical. As would be understood by one skilled in the art, the variable path feature associated with using a first and a second suspension arrangement as described herein would be provided regardless of the orientation or angles of the first and second paths associated with the two suspension arrangements so long as the two paths are different from one another.

In the specific embodiment of front suspension system 102 that is being described, front suspended assembly 108 and front wheel 118 are steerable relative to main vehicle body 106 and front wheel 118 is independently steerable relative to the front suspension system 102, as will be described in further detail below. As illustrated in FIGS. 1-3, second front suspension arrangement 126 movably connects front suspended assembly 108 to first front suspension arrangement 122. First front suspension arrangement 122 then movably connects front suspended assembly 108 and second front suspension arrangement 126 to main vehicle body 106. In other words, second front suspension arrangement 126 is only connected to main vehicle body 106 through first front suspension arrangement 122 in this specific embodiment. As will be described in more detail hereinafter, this configuration allows the use of a multi-axis steering system.

In vehicle 100, first front suspension arrangement 122 of front suspension system 102 includes a telescopic shock absorber 130 having a longitudinal axis 132 with a first end 134 and a second end 136. First end 134 of telescoping shock absorber 130 is attached to hub arrangement 112 of main vehicle body 106. Second end 136 of telescoping shock absorber 130 is telescopically movable along longitudinal axis 132 of telescopic shock absorber 130 relative to first end 134 of the telescopic shock absorber 130 and main vehicle body 106. Movable second end 136 of telescopic shock absorber 130 controls movement of second front suspension arrangement 126 and therefore front suspended assembly 108 relative to main vehicle body 106 through the range of motion along first front path 124.

As shown best in FIGS. 2 and 3, second front suspension arrangement 126 includes an articulated linkage 138 having a first link 140, a second link 142, a third link 144, and a fourth link 146. Each of the links has a first and a second spaced apart pivot point. Articulated linkage 138 connects front suspended assembly 108 to first front suspension arrangement 122 with first link 140 being fixed to movable second end 136 of telescopic shock absorber 130 of first front suspension arrangement 122. The first pivot point of first link 140 is pivotally connected to the first pivot point of second link 142 at a first articulated linkage pivot point 148. The second pivot point of first link 140 is pivotally connected to the first pivot point of third link 144 at a second articulated linkage pivot point 150. The second pivot point of second link 142 is pivotally connected to the first pivot point of fourth link 146 at a third articulated linkage pivot point 152. And finally, the second pivot point of third link 144 is pivotally connected to the second pivot point of fourth link 146 at a fourth articulated linkage pivot point 154. This configuration provides articulated linkage 138 which controls the movement of front suspended assembly 108 along second front path 128.

As illustrated in FIGS. 1-3, fourth link 146 of second front suspension arrangement 126 is connected to, and supports front suspended assembly 108. In vehicle 100, suspension assembly 108 includes a wheel hub 156 that is configured to support wheel 118. Second front suspension arrangement 126 further includes a shock absorber 158 that is connected between first link 140 and one of the other links of the articulated linkage. In this embodiment, shock absorber 158 is connected to articulated linkage 138 such that it controls movement of front suspended assembly 108 relative to movable second end 136 of telescopic shock absorber 130 of first front suspension arrangement 122 through the range of motion along second front path 128. Shock absorber 158 also biases articulated linkage 138 into a position that allows front suspension system 102 to support main vehicle body 106 while allowing for the range of motion of suspension arrangement 126 along second front path 128.

As shown best in FIGS. 2 and 3, in this specific embodiment, shock absorber 158 is pivotally mounted to first link 140 of articulated linkage 138 at a pivot point 159. This embodiment of second front suspension arrangement 126 also includes a linkage made up of a rocker arm 160 and a pull link 161 for connecting the movable end of shock absorber 158 to second link 142. Rocker arm 160 is pivotally connected to first link 140 of articulated linkage 138 at pivot point 150 such that rocker arm 160 is free to pivot about pivot point 150. This is the same pivot point that third link 144 is pivotally connected to first link 140. Rocker arm 160 further includes two additional spaced apart pivot points and pull link 161 also includes two spaced apart pivot points. With this specific linkage, one of the additional spaced apart pivot points of rocker arm 160 is pivotally connected to the movable end of shock absorber 158 at a pivot point 162. One of the spaced apart pivot points of pull link 161 is pivotally connected to the other additional spaced apart pivot point of rocker arm 160 at a pivot point 163. And finally, the other spaced apart pivot point of pull link 161 is pivotally connected to second link 142 of articulated linkage 138 at a pivot point 164.

With the above described configuration, as second link 142 pivots about its first pivot point 148 in response to movements of suspension arrangement 126, pull link 161 is forced to move as pivot point 164 on second link 142 moves. This movement of pull link 161 causes rocker arm 160 to move and pivot about pivot point 150 since rocker arm 160 is pivotally connected to pull link 161 at pivot point 163. This pivoting of rocker arm 160 causes movement of the movable end of shock absorber 158 since rocker arm 160 is pivotally connected to the movable end of shock absorber 158 at pivot point 162. In this specific embodiment, shock absorber 158 is a compression type shock absorber with a relatively central connection point 159 for pivotally connecting the body of shock absorber 158 to first link 140 of articulated linkage 138. This relatively central connection point 159 of shock absorber 158 is used in this example to minimize the change of the resistance rate that can occur as a result of the changing angle of the shock absorber as the length changes during the articulation of the connected linkage.

Although the specific embodiment of articulated linkage 138 shown in FIGS. 2 and 3 has been described as including rocker arm 160, this is not required. Instead, as would be understood by one skilled in the art, articulated linkage 138 and the arrangement for controlling the motion of linkage may be provided by a wide variety of suitable and readily providable articulated linkages and arrangements for controlling the motion of the linkage. Furthermore, although suspension arrangement 126 has been described as including shock absorber 158 as an arrangement for biasing articulated linkage into a desired configuration and controlling the movement of suspension arrangement 126 along second front path 128, this is not a requirement. Instead, any suitable and readily providable biasing and/or dampening arrangement may be used. This includes various spring arrangements with separate dampeners, compressible foam or polymer mounts, torsion bars with dampeners, or any other suitable and readily providable biasing and/or dampening arrangement.

Although first front suspension arrangement 122 of vehicle 100 has been described as being provided by a telescoping shock absorber and second front suspension arrangement 126 of vehicle 100 has been described as being provided by an articulated linkage with an additional shock absorber, this is not a requirement of the invention. Instead, it should be understood that the first and second suspension arrangements may be provided by any suitable and readily providable suspension arrangement. This includes various spring suspension arrangements with separate dampeners, compressible foam or polymer mounts, torsion bars with dampeners, various multi-link suspension arrangements, or any other suitable and readily providable suspension arrangement.

As mentioned above, front suspended assembly 108 may be a steerable suspended assembly as illustrated best in FIGS. 2 and 3. In this embodiment, steerable front suspended assembly 108 is connected to second front suspension arrangement 126 such that at least portions of steerable front suspended assembly 108 are rotatable relative to second front suspension arrangement 126 about a first steering axis 166. In the case of vehicle 100, wheel hub 156 is pivotally connected to fourth link 146 of articulated linkage 138 such that wheel hub 156 may pivot about first steering axis 166. As will be described in more detail hereinafter, the rotation or pivoting of the rotatable portions of the suspended assembly about first steering axis 166 may be controlled by any suitable and readily providable steering assembly. This may include, but is not limited to a hydraulic steering assembly, a pneumatic steering assembly, a cable steering assembly, a rack and pinion steering assembly, or a mechanical push rod steering assembly.

In accordance with another aspect of this disclosure, second end 136 of telescopic shock absorber 130 may be rotatable about longitudinal axis 132 of telescopic shock absorber 130 relative to first end 134 of the telescopic shock absorber 130 and main body 106 of vehicle 100. This configuration of telescoping shock absorber 130 provides a second steering axis 168 that corresponds to longitudinal axis 132 of telescoping shock absorber 130. As will be described in more detail hereinafter, the rotation or pivoting of second end 136 of telescoping shock absorber 130 causes second front suspension arrangement 126 and front suspended assembly 108 to rotate or pivot about second steering axis 168. This rotation or pivoting of second end 136 of telescoping shock absorber 130 may be controlled by any suitable and readily providable steering assembly. This may include, but is not limited to a hydraulic steering assembly, a pneumatic steering assembly, a cable steering assembly, a rack and pinion steering assembly, or a mechanical push rod steering assembly.

Depending upon the specific requirements of a particular application, the first front suspension arrangement 122, and therefore the range of motion of the first front suspension arrangement 122 along the first path 124, may be oriented in any desired orientation relative to the vehicle. For example, as illustrated best in FIG. 1, first front suspension arrangement 122 and first front path 124 may be primarily horizontal and parallel with the normal straight-ahead direction of travel of vehicle 100. However, as also illustrated in FIG. 1, first front suspension arrangement 122 and first front path 124 may be oriented at a slight angle from horizontal. For example, this angle may be in the range of about zero to thirty degrees (0°-30°) from horizontal. Setting this angle to a particular angle for a specific application may allow the overall suspension system to be tuned to provide a desired set of operating characteristics for the specific application.

In a similar manner, the specific configuration of second front suspension arrangement 126 determines the relative shape and orientation of the range of motion of front suspended assembly 108 along second path 128. In the embodiment described above, second path 128 is a linear curved path relative to the position of second front suspension arrangement 126. Again, it should be understood that the specific configuration of second front suspension arrangement 126 may be arranged to provide desired suspension characteristics. This ability to design the configuration of the suspension system to provide desired suspension characteristics again allows the overall suspension system to be tuned to provide a specific set of operating characteristics for a specific application.

As mentioned above, the combination of the ability of second front suspension arrangement 126 to move through a range of motion along second path 128 and first front suspension arrangement 122 to move through a range of motion along first front path 124 allows front suspended assembly 108 to move through a variable path. In accordance with aspects of this disclosure, this variable path suspension system may be used to allow the suspension system to respond to a wide variety of obstacles or terrain while providing improved stability and control of the vehicle.

As also mentioned above, the combination of the range of motion of first front suspension arrangement 122 and the range of motion of second front suspension arrangement 126 provide an overall range of motion for the suspended assembly relative to the main body that is defined by a surface area when the vehicle is traveling in the normal straight-ahead direction. However, it should be understood that the addition of a second steering axis such as second steering axis 168 as described above for telescoping shock absorber 130 introduces another degree of freedom for an overall suspension system such as front suspension system 102. This means that front suspension system 102 still provides a range of motion for the suspended assembly relative to the main body that is defined by a surface area when the vehicle is traveling in the normal straight-ahead direction. However, this configuration also allows an overall range of motion for front suspended assembly 108 relative to main body 106 that is defined by a volume rather than a surface area when the range of motion associated with the pivoting of the second steering axis is included in the overall range of motion of the suspended assembly relative to the main vehicle body.

Figure 4:
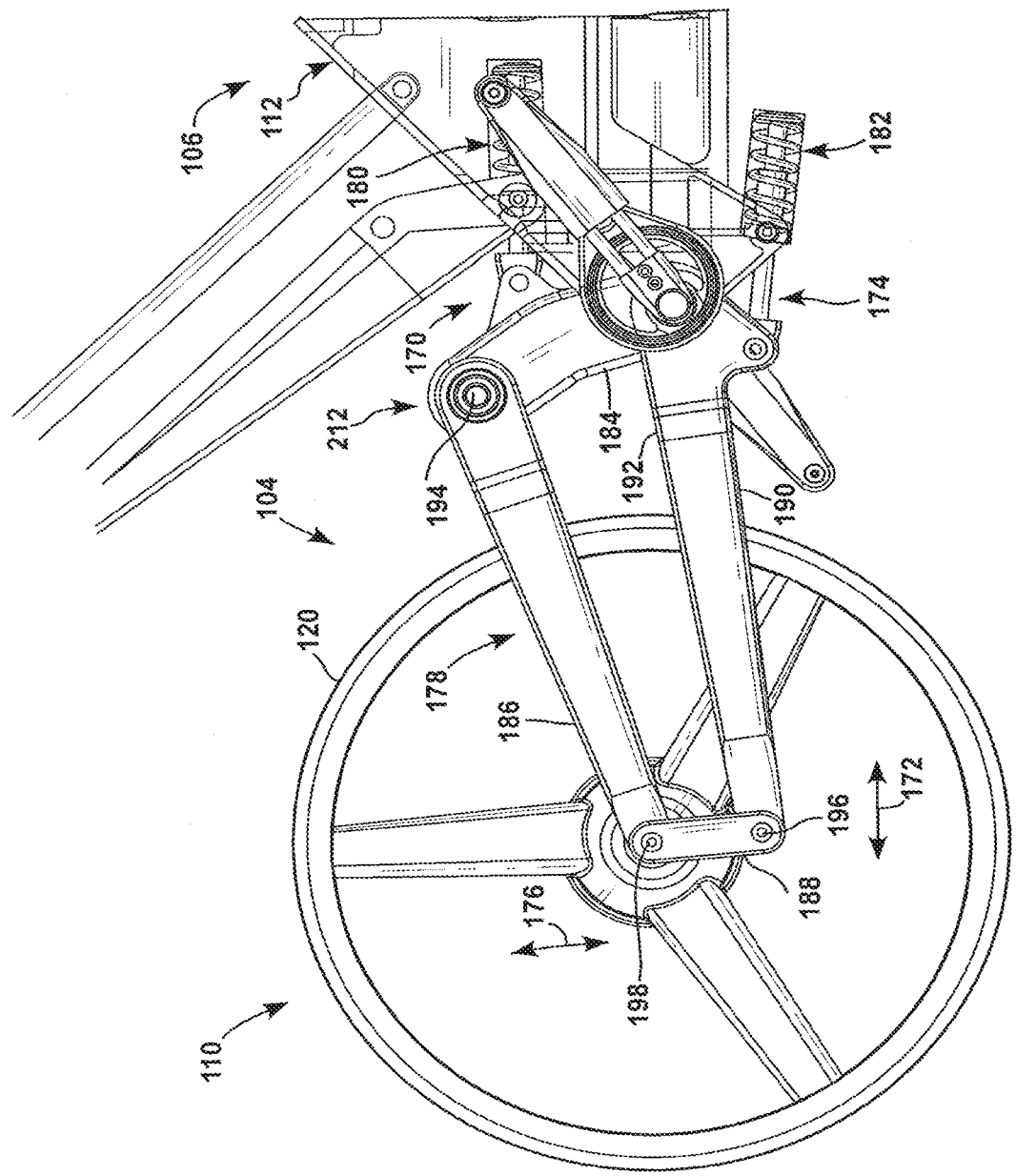
FIG. 4 is a side view of a rear suspension system and a rotational drive transmission in accordance with aspects of the present invention.

Referring now to FIGS. 1 and 4, a second embodiment of a suspension system in accordance with aspects of this disclosure will be described in more detail with reference to rear suspension system 104. In a manner similar to that described above for front suspension system 102, suspension system 104 includes a first rear suspension arrangement 170 that movably connects rear suspended assembly 110 (which in this example includes rear wheel 120) to hub arrangement 112 of main vehicle body 106. First rear suspension arrangement 170 controls movement of rear suspended assembly 110 relative to main vehicle body 106 through a range of motion along a first rear path 172 that is primarily perpendicular to the lateral direction when the vehicle is traveling in the normal straight-ahead direction. This allows rear suspension system 104 to support main body 106 of vehicle 100 while also providing lateral stability to the vehicle. In this example, first rear path 172 is primarily horizontal and parallel with the normal straight-ahead direction of travel of the vehicle.

Rear suspension system 104 also includes a second rear suspension arrangement 174 that controls movement of rear suspended assembly 110 relative to main vehicle body 106 through a range of motion along a second rear path 176 that is also primarily perpendicular to the lateral direction when vehicle 100 is traveling in the normal straight-ahead direction. This again allows rear suspension system 104 to support main body 106 of vehicle 100 while also providing lateral stability to the vehicle. In this example, second rear path 176 is primarily vertical and perpendicular to the normal straight-ahead direction of travel of the vehicle.

In accordance with aspects of this disclosure, second rear path 176 of second rear suspension arrangement 174 is different than first rear path 172 of first rear suspension arrangement 170. With this configuration, rear suspension system 104 may use the combination of the range of motion of first rear suspension arrangement 170 along first rear path 172 and the range of motion of second rear suspension arrangement 174 along second rear path 176 to provide a combined range of motion for rear suspended assembly 110 relative to main body 106 that is defined by a surface area. In the embodiment being described, this surface area is defined by a planar surface area. As mentioned above and in accordance with aspects of this disclosure, this configuration allows rear suspended assembly 110 to move through a variable path relative to main vehicle body 106 in response to obstacles. This variable path suspension system may be used to allow the suspension system to respond to a wide variety of obstacles or terrain while providing improved stability and control of the vehicle.

Although first rear path 172 associated with first rear suspension arrangement 170 has been described as being primarily horizontal and second rear path 176 associated with second rear suspension arrangement 174 has been described as being primarily vertical, this is not a requirement. Instead, as mentioned above for front suspension system 102, the suspension arrangements may be oriented in any desired manner such that the paths defined by the range of motion associated with the suspension arrangements are oriented at any desired orientation or angle relative to the direction of travel of the vehicle. It should be understood that any of these configurations remain within the scope of the invention.

As illustrated best in FIG. 4, suspension system 104 includes an articulated linkage 178 that connects rear suspended assembly 110 to hub arrangement 112 of main vehicle body 106. In this embodiment, first rear suspension arrangement 170 includes a first biasing and dampening arrangement 180 connected between hub arrangement 112 of main vehicle body 106 and articulated linkage 178 to control movement of rear suspended assembly 110 relative to main vehicle body 106 through the range of motion along first rear path 172. Second rear suspension arrangement 174 includes a second biasing and dampening arrangement 182 connected between hub arrangement 112 of main vehicle body 106 and articulated linkage 178 to control movement of rear suspended assembly 110 relative to main vehicle body 106 through the range of motion along second rear path 176.

In the embodiment being described, first and second biasing and dampening arrangements 180 and 182 are pull shocks. However, as mentioned above, this is not a requirement. Instead, any suitable and readily providable biasing and dampening arrangement may be used. This includes various spring arrangements with separate dampeners, compressible foam or polymer mounts, torsion bars with dampeners, or any other suitable and readily providable biasing and dampening arrangement.

In the case of suspension system 104, articulated linkage 178 includes a first link 184, a second link 186, a third link 188, and a fourth link 190. Each of the links has a first and a second spaced apart pivot point. In this embodiment, articulated linkage 178 connects rear suspended assembly 110 directly to hub arrangement 112 of main vehicle body 106. The first pivot point of first link 184 and the first pivot point of fourth link 190 are pivotally connected to one another and pivotally connected to hub arrangement 112 of main vehicle body 106 at a first articulated linkage pivot point 192. The second pivot point of first link 184 is pivotally connected to the first pivot point of second link 186 at a second articulated linkage pivot point 194. The second pivot point of fourth link 190 is pivotally connected to the first pivot point of third link 188 at a third articulated linkage pivot point 196. The second pivot point of second link 186 and the second pivot point of third link 188 are pivotally connected to one another at a fourth articulated linkage pivot point 198. And finally, in this embodiment, rear wheel 120 of rear suspended assembly 110 is rotatably connected to articulated linkage 178 at fourth articulated linkage pivot point 198.

As shown in FIG. 4, first rear suspension arrangement 170 includes first biasing and dampening arrangement 180 that is connected between hub arrangement 112 of main vehicle body 106 and first link 184 of articulated linkage 178. First biasing and dampening arrangement 180 controls the movement of rear suspended assembly 110 relative to main vehicle body 106 through the range of motion along first rear path 172 when second rear suspension arrangement 174 is held in place. Second rear suspension arrangement 174 includes second biasing and dampening arrangement 182 connected between hub arrangement 112 of main vehicle body 106 and fourth link 190 of articulated linkage 178. Second biasing and dampening arrangement 182 controls the movement of rear suspended assembly 110 relative to main vehicle body 106 through the range of motion along second rear path 176 when first rear suspension arrangement 170 is held in place.

Although biasing and dampening arrangements 180 and 182 are described as being respectively connected to first link 184 and fourth link 190, this is not a requirement. Instead, the biasing and dampening arrangements may be connected to any portion of the articulated linkage in any manner that allows them in combination to control the movement of the suspended assembly through a desired range of variable paths that are dictated by the range of motion associated with the articulated linkage.

The above described suspension system configurations provide variable path suspension systems that may be used in vehicles such as bicycles, motorcycles, automobiles, off-road vehicles, or any other desired vehicle. In accordance with aspects of this disclosure, these variable path suspension systems utilize multiple suspension arrangements to allow a suspended assembly such as a wheel, tread, ski, skid, float, or any other desired suspended assembly to move along a variable path relative to the rest of the vehicle. The use of this variable path suspension system allows the suspension system to respond to a wide variety of obstacles or terrain while providing improved stability and control of the vehicle.

Referring back to FIGS. 1-3, the action of front suspension system 102 will be described in more detail to illustrate the capabilities of suspension systems designed in accordance with this disclosure. When front wheel 118 initially strikes an obstacle such as a large rock, the initial reaction is that the force of the impact will tend to stop the forward progress of wheel 118. The momentum of the bicycle will cause telescoping shock absorber 130 of first front suspension arrangement 122 to compress. This is because shock absorber 130 of first front suspension arrangement 122 is the suspension arrangement that provides the range of motion in the horizontal direction in this embodiment. This compression of telescoping shock absorber 130 allows some time for second front suspension arrangement 126 (which in this embodiment includes articulated linkage 138) to react to the obstacle by allowing front wheel 118 to move up vertically so that it can proceed over the obstacle. At this point, both suspension arrangements 122 and 126 are heavily loaded as best illustrated in FIG. 2. However, because front suspension system 102 allows front wheel 118 to move both horizontally and vertically relative to the main body of the bicycle, the force of the impact with the obstacle is spread out over a much longer time than would be the case with a conventional suspension system. This very significantly reduces the intensity of the impact.

As front wheel 118 rides up the obstacle, the heavy loading of telescoping shock absorber 130 of first front suspension arrangement 122 begins to push wheel 118 forward over the obstacle. This allows front wheel 118 to crawl over the obstacle as first front suspension arrangement 122 unloads and moves back to its original position. The heavy loading of second front suspension arrangement 126 then pushes front wheel 118 back down as the front wheel clears the obstacle. This allows second front suspension arrangement 126 to unload and move back to its original position.

In accordance with aspects of this disclosure, the suspension path that is described above and that the suspended assembly travels relative to the main body of the vehicle is a variable path. In other words, the path that the suspended assembly follows during the loading of the suspension arrangements is very different than the path that the suspended assembly follows during the unloading of the suspension arrangements. In the example described above, the suspended assembly initially moves primarily back horizontally, then primarily up vertically, then primarily forward horizontally, and finally primarily down vertically. This ability to travel through a wide variety of variable paths allows this type of variable path suspension to respond to a wide variety of obstacles or terrain while providing improved stability and control of the vehicle.

The variable path suspension systems described herein allow a suspended assembly to move through a range of motion that provides time for the suspension system to react to obstacles it encounters. This reaction time significantly reduces the impact forces associated with encountering the obstacle. This in turn reduces the stresses placed on the vehicle and may provide a smoother ride compared to conventional suspension systems. This may also allow the variable path suspension systems described herein to keep a suspended assembly in better contact with the surface supporting the vehicle compared to conventional suspension systems. This may provide improved handling and safety for the vehicle.

Although vehicle 100 has been described as a two wheeled, it should be understood that this is not a requirement. Instead, vehicle 100 may be a tricycle or a quadracycle and still remain within the scope of the invention. Furthermore, vehicle 100 may be a human powered vehicle using a pedal and crank assembly to rotationally drive the rear wheel of the vehicle as will be described in more detail hereinafter. Alternatively, vehicle 100 may be a hybrid vehicle or an electric vehicle. For example, vehicle 100 may include a wheel hub motor 200 as part of front wheel hub 156.

In some situations, the variable path suspension system described herein may act as a safety system to a degree, by absorbing some of the impact associated with a collision. For example, if vehicle 100 collides with an obstacle that front wheel 118 is not able to pass over, telescoping shock absorber 130 of first front suspension arrangement 122 would act as an impact reduction system by compressing along the primarily horizontal direction along first front path 124. This relative motion between front wheel 118 and main vehicle body 106 provides some time for the rider and the vehicle to react to the impact and may significantly reduce the impact forces that are transferred to the rider.

Figure 5:
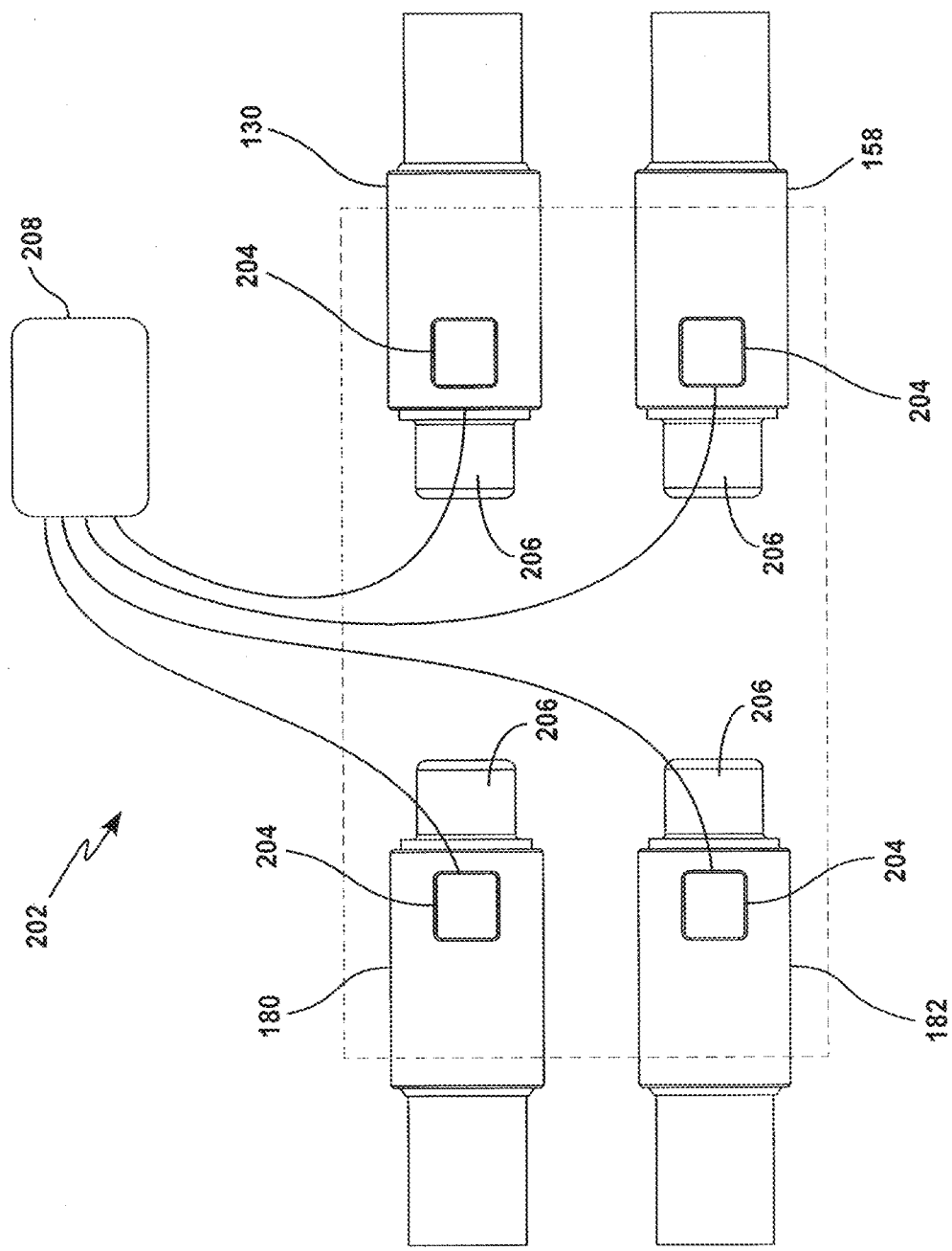
FIG. 5 is a schematic drawing of a suspension adjusting system in accordance with aspects of the present invention.

Referring now to FIG. 5, vehicle 100 may further include a suspension adjusting system 202 for adjusting the suspension action of suspension systems 102 and 104. Suspension adjusting system 202 may include one or more sensor arrangements 204 for detecting certain characteristics of the movement of the suspension system. For example, sensors 204 may sense the pressures associated with shock absorbers 130 and 158 of front suspension system 102 and shock absorbers 180 and 182 of rear suspension system 104. Suspension systems 102 and 104 may include one or more adjusting arrangements 206 for modifying the function of elements of the suspension system in response to the certain characteristics sensed by the sensing arrangement. For example, adjusting arrangements 206 may adjust the stiffness, pressure, range of travel, or any other characteristic of the elements of the suspension such as shock absorbers 130, 158, 180, and 182. Suspension adjusting system 202 may also include a control arrangement 208 configured to control adjusting arrangements 206. Control arrangement 208 may be a manual control that allows the rider to manually select different settings for adjusting arrangements 206 to provide different suspension system characteristics. Alternatively, control arrangement 208 may be an automated control or computer control that uses information provided by sensing arrangements 204 and automatically selects different settings for adjusting arrangements 206 to provide different suspension system characteristics.

In one example of a suspension adjusting system for a bicycle, the system may include a setting that configures the suspension system such that a degree of the relatively horizontal suspension travel is required first before allowing the relatively vertical suspension to activate. Alternatively, the spring rate of the relatively vertical suspension may be decreased once a pre-determined amount of relatively horizontal suspension travel has been met. These approaches may offer a system that assists in counteracting the bobbing effect of the rider in the vertical direction that can result from the pedaling motion. This may reduce or eliminate the activation of the suspension system due to the bobbing effect and may avoid wasting the rider's energy on the activation of the suspension system in response to the bobbing effect.

This allows the rider to have suspension when needed, but not waste energy when suspension is not needed.

In another example, the sensing arrangement of the suspension system may be used to sense impact information from the front wheel or wheels of the vehicle when an obstacle is hit. The control arrangement may use this impact information to rapidly adjust and prepare the rear suspension for the impact in a more efficient manner.

In the embodiment illustrated by rear suspension system 104 in FIGS. 1 and 4, both first rear suspension arrangement 170 and second rear suspension arrangement 174 movably connect rear suspended assembly 110 to hub arrangement 112 of main vehicle body 106. This is different than the embodiment described above for front suspension system 102 in which the two suspension arrangements are connected in series. That is, in front suspension system 102, front suspended assembly 108 was connected to second front suspension arrangement 126, second front suspension arrangement 126 was in turn connected to first front suspension arrangement 122, and first front suspension arrangement 122 was in turn connected to main vehicle body 106. This serial connection of the suspension arrangements in front suspension system 102 allows that configuration to provide a second axis of steering as mentioned above and as will be described in more detail hereinafter.

Although the serial connection of the suspension arrangements in front suspension system 102 allows that configuration to provide a second axis of steering, this serial connection of the suspension arrangements is not a requirement. Instead, any desired configuration that uses multiple suspension arrangements that allow, the suspended assembly to move through a variable path as described above would remain within the scope of the invention. For example, in another embodiment that provides a second steering axis, the telescoping shock absorber 130 of front suspension system 102 may be replaced with a base plate that is rotationally attached to hub arrangement 112 of main vehicle body 106. This base plate may be controlled by a steering mechanism to provide the second axis of steering in a manner similar to that described above for telescoping shock absorber 130. With this configuration, telescoping shock absorber 130 would no longer be available to provide the first front suspension arrangement for front suspension system 102. Instead, articulated linkage 138 may be configured in a manner similar to that described above for articulated linkage 178 with an additional biasing and dampening arrangement connected between the base plate and one of the links of the articulated linkage to provide the additional suspension arrangement.

As described above for suspension system 104, articulated linkage 178 may be pivotally connected directly to hub arrangement 112 of main vehicle body 106 as indicated by pivot point 192 in FIG. 4. The use of pivot point 192 to pivotally connect articulated linkage 178 to hub arrangement 112 means that pivot point 192 will remain in the same location relative to main vehicle body 106 regardless of the movement of rear suspended assembly 110 and rear wheel 120. In accordance with aspects of this disclosure, this allows pivot point 192 to be used as a rotational drive input location for a rotational drive input such as a crank assembly 210. This rotational drive may be transmitted through rotational drive transmitting links that make up some of the links of the articulated linkage of the suspension system.

Figure 6:
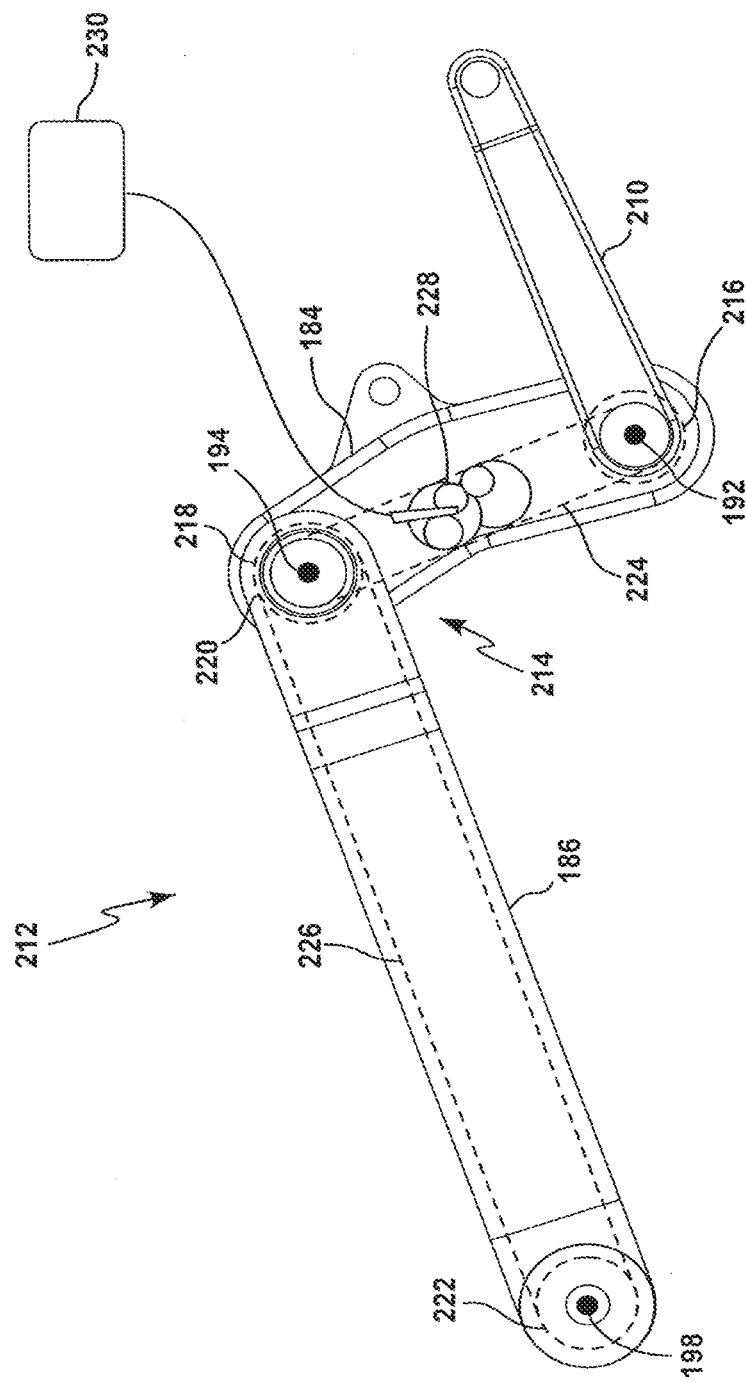
FIG. 6 is a side view of portions of the rear suspension system and the rotational drive transmission of FIG. 4.

Referring now to FIGS. 4 and 6, a rotational drive transmission arrangement 212 designed in accordance with aspects of this disclosure will be described in more detail. In this embodiment, rotational drive transmission arrangement 212 includes a drive transmitting articulated linkage 214 that makes up a portion of articulated linkage 178 of rear suspension system 104. Drive transmitting articulated linkage 214 includes a plurality of rotational drive transmitting links that each have a first and a second spaced apart hinge point. As shown best in FIG. 6, drive transmitting articulated linkage 214 includes a first rotational drive transmitting link provided by first link 184 of articulated linkage 178 and a second rotational drive transmitting link provided by second link 186 of articulated linkage 178. The first and second spaced apart hinge points of drive transmitting links 184 and 186 each have an associated axis of rotation that provides a pivot point for drive transmitting articulated linkage 214. In this case, the first hinge point and associated axis of rotation for drive transmitting link 184 is located at pivot point 192 of articulated linkage 178. The second hinge point and associated axis of rotation for drive transmitting link 184 is located at pivot point 194 of articulated linkage 178. The first hinge point and associated axis of rotation for drive transmitting link 186 is also located at pivot point 194 of articulated linkage 178 where link 184 is pivotally connected to link 186. And finally, the second hinge point and associated axis of rotation for drive transmitting link 186 is located at pivot point 198 of articulated linkage 178.

In accordance with aspects of this disclosure, each rotational drive transmitting link includes a driven member, a drive member, and a drive mechanism that allows the driven member to drive the drive member of the rotational drive transmitting link. In this example, first rotational drive transmitting link 184 includes a driven member 216 that is supported and rotates about the axis of the first hinge point of rotational drive transmitting link 184 at pivot point 192 of drive transmitting articulated linkage 214. Second rotational drive transmitting link 186 also includes a driven member 218 that is supported and rotates about the axis of the first hinge point of rotational drive transmitting link 186 at axis or pivot point 194 of drive transmitting articulated linkage 214. First rotational drive transmitting link 184 further includes a drive member 220. Drive member 220 is supported and rotates about the axis of the second hinge point of rotational drive transmitting link 184 at pivot point 194 of drive transmitting articulated linkage 214. And, second rotational drive transmitting link 186 further includes a drive member 222 that is supported and rotates about the axis of the second hinge point of rotational drive transmitting link 186 at pivot point 198 of drive transmitting articulated linkage 214.

Each rotational drive transmitting link also includes a rotational drive mechanism for transmitting rotational movement from the driven member of the rotational drive transmitting link to the drive member of the rotational drive transmitting link. In this example, first link 184 includes a rotational drive mechanism 224 and second link 186 includes a rotational drive mechanism 226. Rotational drive mechanisms 224 and 226 may be any suitable and readily providable drive mechanism such as a chain drive, a belt drive, a shaft drive, a gear drive, or any other drive mechanism.

As illustrated in FIG. 6, crank assembly 210 may be connected to driven member 216 of first rotational drive transmitting link 184 such that driven member 216 rotates with crank assembly 210. First and second rotational drive transmitting links 184 and 186 are connected to one another in series with the second hinge point of first rotational drive transmitting link 184 being pivotally connected to the first hinge point of second rotational drive transmitting link 186 at pivot point 194. Additionally, drive member 220 of first rotational drive transmitting link 184 is connected to driven member 218 of second rotational drive transmitting link 186 such that drive member 220 of first link 184 rotationally drives driven member 218 of second link 186. This causes both drive member 220 of first link 184 and driven member 218 of second link 186 to rotate about the associated axis or pivot point 194 of drive transmitting articulated linkage 214 thereby providing the transmission of any rotational drive through rotational drive transmitting links 184 and 186.

Figure 7:
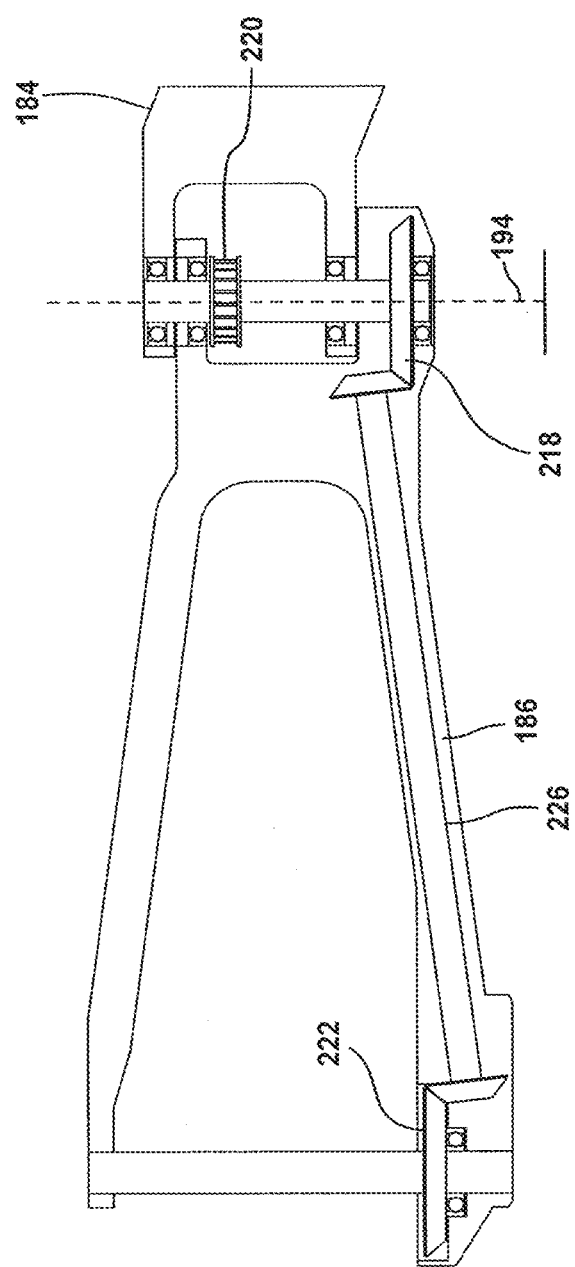
FIG. 7 is a top view of portions of the rear suspension system and the rotational drive transmission of FIG. 4.

As shown best in FIGS. 6 and 7, each of the rotational drive transmitting links described above may include an enclosed space that houses the associated drive member, driven member, and drive mechanism of the rotational drive transmitting link. For example, FIG. 7 illustrates an embodiment of second rotational drive transmitting link 186 in which rotational drive mechanism 226 is provided as a geared shaft drive that is housed within second link 186.

Drive transmitting articulated linkage 214 may further include a shifting arrangement 228 for changing the drive ratio of the drive transmitting articulated linkage. Shifting arrangement 228 may be any suitable and readily providable shifting arrangement including a geared shifting arrangement, a planetary gear shifting arrangement, a sprocket shifting arrangement, a continuously variable pulley shifting arrangement, or any other desired shifting arrangement. Shifting arrangement 228 may include a selecting arrangement 230 for selecting any of the drive ratios that are available from the shifting arrangement. Selecting arrangement may be any suitable and readily providable selecting arrangement including a manual selecting arrangement such as a cable assembly, an automated selecting arrangement that automatically selects a drive ratio based on a particular characteristic of the rotational drive transmission such as torque or rotational speed, or any other desired selecting arrangement.

Although shifting arrangement 228 and selecting arrangement 230 have been described as being located within first rotational drive transmitting link 184, this is not a requirement. Instead, shifting arrangement 228 and selecting arrangement 230 may be located within a spindle arrangement associated with crank assembly 210, within a hub arrangement associated with rear wheel 120, or at any other desired location along the drive line from the crank assembly to the drive wheel.

Furthermore, although rotational drive transmission 212 has been described as being a rotational drive transmission for a bicycle, this is not a requirement. Instead, it should be understood that the rotational drive transmission described herein may be used in any desired application including a wide variety of vehicles such as motorcycles, automobiles, trucks, off-road vehicles, or any other type of vehicle and remain within the scope of the invention.

Figure 8:
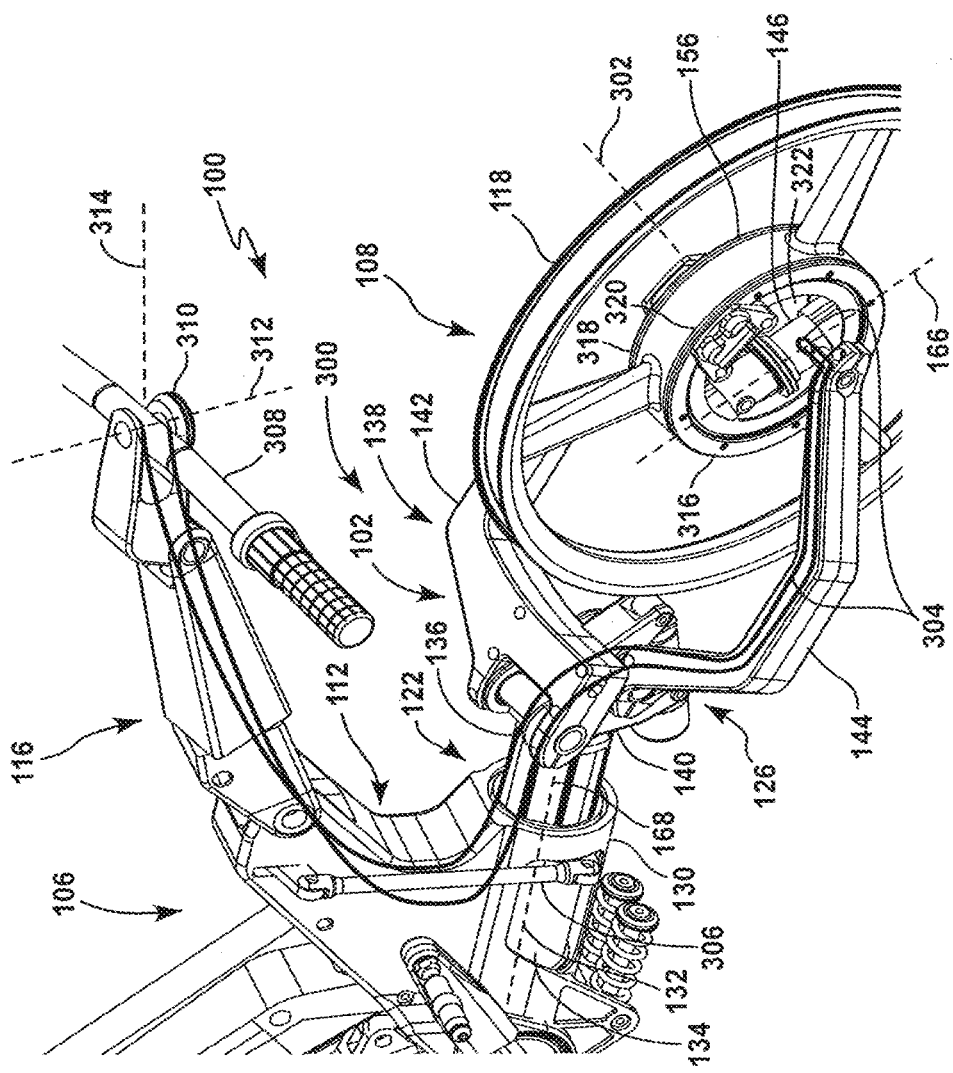
FIG. 8 is a perspective view of a multi-axis steering system in accordance with aspects of the present invention.
Figure 9:
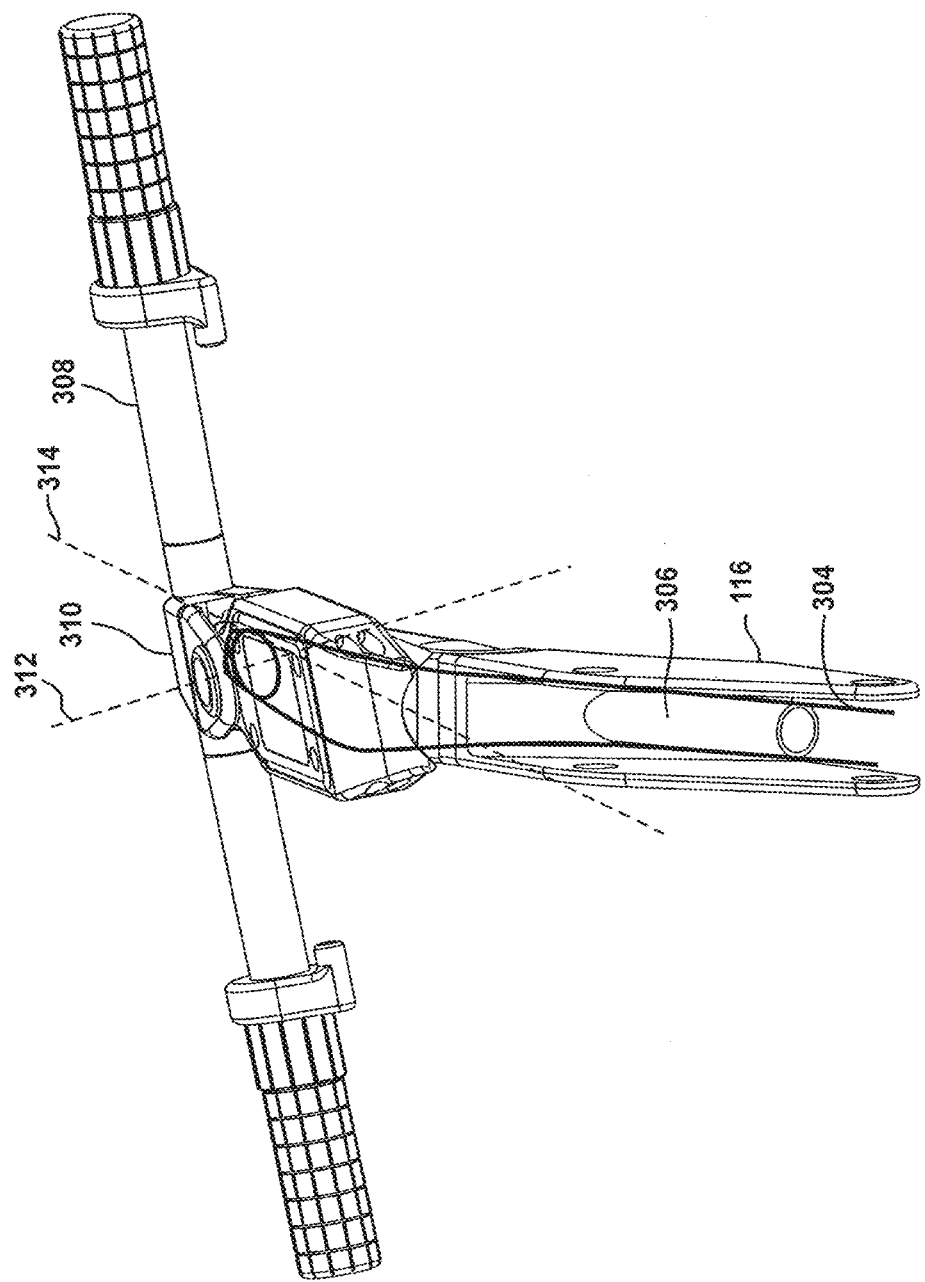
FIG. 9 is a rear perspective view of a portion of the multi-axis steering system of FIG. 8.

The configuration described above for vehicle 100 and front suspension system 102 provides a multi-axis steering system designed in accordance with aspects of this disclosure. Referring to FIGS. 8 and 9, this embodiment of a multi-axis steering system, which is designated by reference numeral 300, will be described in more detail. As indicated above, vehicle 100 has a main vehicle body 106 and steerable front wheel 118 that supports main body 106 of vehicle 100. Front wheel 118 has a front wheel axis 302 around which front wheel 118 rotates in a wheel rotational plane that is perpendicular to front wheel axis 302. Front wheel 118 assists in providing directional control of the vehicle and stability in a lateral direction relative to a normal straight-ahead direction of travel for the vehicle.

Multi-axis steering system 300 includes a first steering arrangement 304 that controls movement of front wheel 118 relative to main vehicle body 106 such that front wheel 118 pivots about first steering axis 166. As was described above, front wheel 118 is part of steerable front suspended assembly 108 which is connected to second front suspension arrangement 126 such that at least portions of steerable front suspended assembly 108 are rotatable relative to second front suspension arrangement 126 about first steering axis 166. In the case of vehicle 100, wheel hub 156 is pivotally connected to fourth link 146 of articulated linkage 138 such that wheel hub 156 may pivot about first steering axis 166. The rotation or pivoting of the rotatable portions of suspended assembly 106, including wheel hub 156 and front wheel 118, about first steering axis 166 is controlled by first steering arrangement 304. In this embodiment, first steering arrangement 304 is a cable steering assembly.

Although first steering arrangement 304 is described as being a cable steering assembly, it should be understood that the first steering arrangement may be any suitable and readily providable steering arrangement. This may include a hydraulic steering assembly, a pneumatic steering assembly, a rack and pinion steering assembly, a mechanical push rod steering assembly, or any other desired steering assembly.

Multi-axis steering system 300 also includes a second steering arrangement 306 that controls movement of front wheel 118 relative to main vehicle body 106 such that front wheel pivots about second steering axis 168. In accordance with aspects of this disclosure, the second steering axis is different than the first steering axis.

As was also described above, second end 136 of telescopic shock absorber 130 is rotatable about longitudinal axis 132 of telescopic shock absorber 130 relative to first end 134 of the telescopic shock absorber 130 and main body 106 of vehicle 100. This configuration of telescoping shock absorber 130 provides second steering axis 168 that corresponds to longitudinal axis 132 of telescoping shock absorber 130. The rotation or pivoting of second end 136 of telescoping shock absorber 130 causes second front suspension arrangement 126 and front suspended assembly 108 to rotate or pivot about second steering axis 168. This rotation or pivoting of second end 136 of telescoping shock absorber 130 is controlled by second steering arrangement 306. In this embodiment, second steering arrangement 306 is a mechanical push rod steering assembly.

Although second steering arrangement 306 is described as being a mechanical push rod steering assembly, it should be understood that the second steering arrangement may be any suitable and readily providable steering arrangement. This may include a hydraulic steering assembly, a pneumatic steering assembly, a cable steering assembly, a rack and pinion steering assembly, or any other desired steering assembly.

First steering axis 166 may be primarily vertical allowing first steering arrangement 304 to move front wheel 118 through a range of motion that pivots the wheel rotational plane of front wheel 118 relative to the normal straight-ahead direction of travel of vehicle 100. Additionally, second steering axis 168 may be primarily horizontal allowing second steering arrangement 306 to move front wheel 118 through a range of motion that tilts the wheel rotational plane of front wheel 118 relative to the normal straight-ahead direction of travel of vehicle 100.

Alternatively, second steering axis 168 of second steering arrangement 306 may be oriented at an angle relative to horizontal. This angle may be in the range of about zero to thirty degrees (0°-30°) from horizontal. By adjusting this angle, the suspension action and the steering action may be tuned for specific applications or vehicle designs.

As illustrated best in FIG. 9, handle bar support arrangement 116 supports a handle bar 308. Handle bar 308 is pivotally connected to an outward end 310 of handle bar support arrangement 116 such that handle bar 308 pivots about a first handle bar steering axis 312. In this embodiment, first handle bar steering axis 312 is primarily vertical and first steering arrangement 304 is connected to handle bar 308 such that pivotal movement of handle bar 308 about first handle bar steering axis 312 causes a corresponding pivotal movement of steerable front wheel 118 about first steering axis 166.

Handle bar 308 is also pivotally connected to handle bar support arrangement 116 such that handle bar 308 pivots about a second handle bar steering axis 314 that is a different axis than first handle bar steering axis 312. In this embodiment, second handle bar steering axis 314 is primarily horizontal and second steering arrangement 306 is connected to handle bar 308 such that pivotal movement of handle bar 308 about second handle bar steering axis 314 causes a corresponding tilting movement of steerable front wheel 118 about second steering axis 168.

Although the above described multi-axis steering system has been described with reference to a bicycle, this is not a requirement. Instead, it should be understood that these configurations may be used to provide multi-axis steering systems that may be used in any other desired vehicle.

In accordance with another aspect of this disclosure, the above described steering configuration provides a steering arrangement that is located within the wheel axle of a suspended assembly. As described above, steering system 300 may be used in vehicle 100 that includes main vehicle body 106, front suspended assembly 108, and front suspension system 102 for connecting front suspended assembly 108 to main body 106 of vehicle 100. Front suspended assembly 108 includes steerable front wheel 118 which supports main body 106 of vehicle 100. Steering system 300 includes an axle 316 that makes up a portion of front suspended assembly 108. Axle 316 has an axle rotational axis designated by front wheel axis 302.

As illustrated in FIG. 8, front suspended assembly 108 further includes a first bearing 318 and a second bearing 320 that are spaced apart from one another along axle rotational axis 302. Bearings 318 and 320 support front wheel 118 for rotation about axle 316 around front wheel axis 302. First and second bearings 318 and 320 have a relatively large diameter such that axle 316 defines a relatively large opening 322 within axle 316 that is located between spaced apart bearings 318 and 320. Bearings 318 and 320 also have outer bearing surfaces that support front wheel 118 for rotation about axle 316 and inner bearing surfaces that are supported by axle 316.

As was described above, steering system 300 includes first steering arrangement 304 and fourth link 146 of articulated linkage 138 that defines first steering axis 166. In accordance with aspects of this disclosure, fourth link 146 and portions of first steering arrangement 304 are located within opening 322 of axle 316. Axle 316 is pivotally connected to fourth link 146 and first steering arrangement 304 such that axle 316 is movable about first steering axis 166. With this configuration, steering system 300 uses first steering arrangement 304 as a steering actuator such that first steering arrangement 304 controls the movement of axle 316 about first steering axis 166.

The above described configuration allows the elements located within opening 322 of axle 316, such as fourth link 146 and portions of first steering arrangement 304, to be connected to second front suspension arrangement 126 and to axle 316 without them having to rotate about axle 316. In accordance with aspects of this disclosure, this allows the steering mechanism and steering axis associated with a steering system to be located within the wheel axle of the suspended assembly that is being steered. This provides an inherently stable steering arrangement.

As shown best in FIG. 8, opening 322 within axle 316 has a generally cylindrical shape. Although opening 322 is describe in this embodiment as having a cylindrical shape, it should be understood that this is not a requirement. Instead, opening 322 may be a sphere, a combination of portions of a sphere, a combination of one or more cylinders and portions of a sphere or spheres, or any other desired volumetric shape.

Some aspects of the present disclosure relate to methods and arrangements for providing position adjusting systems for use in a wheeled vehicle such as a bicycle. In accordance with aspects of this disclosure, these position adjusting systems allow a rider of the vehicle to easily adjust their riding position and the configuration of the vehicle as they are riding the vehicle.

Figure 10:
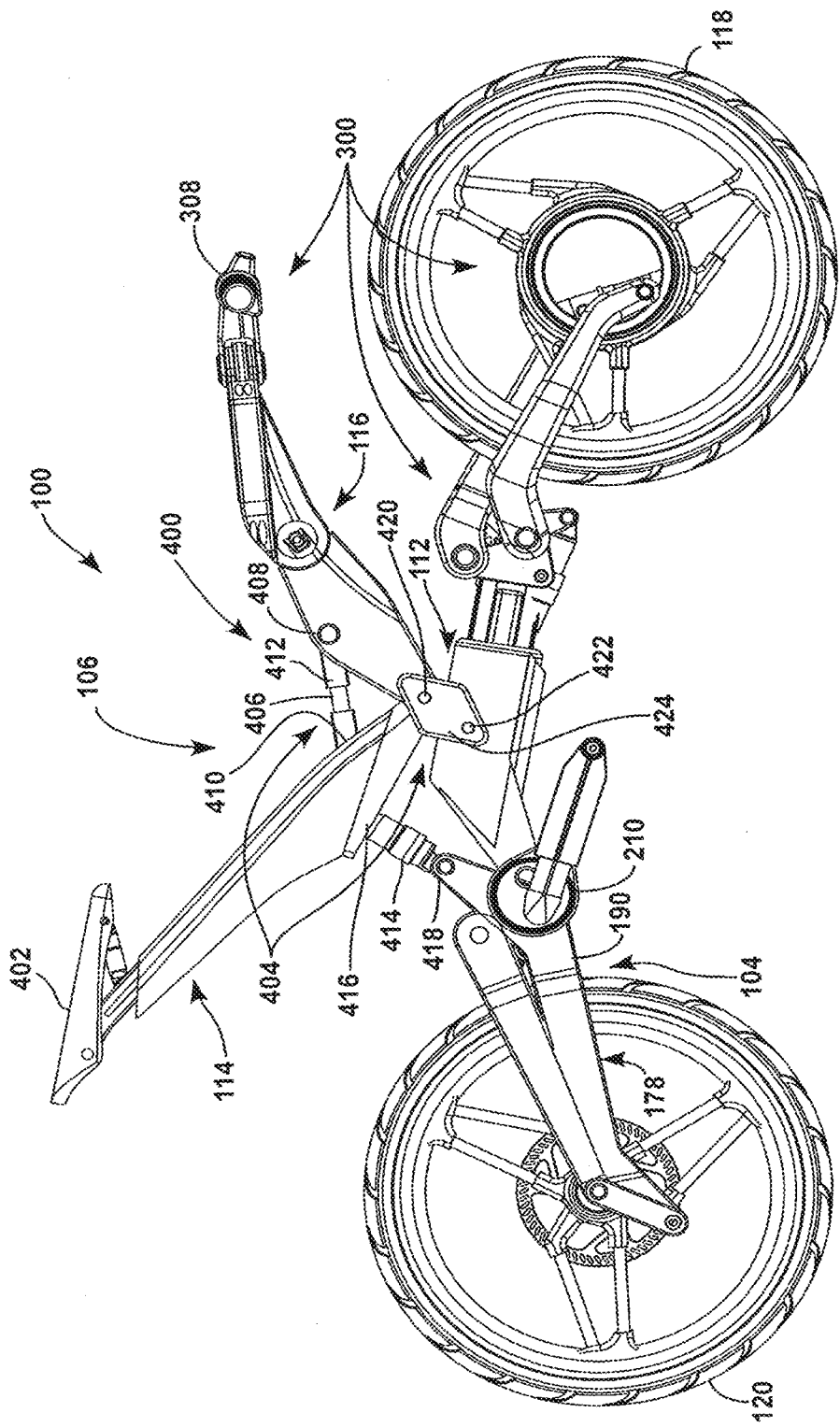
FIG. 10 is a side view of a position adjusting arrangement in accordance with aspects of the present invention.
Figure 11:
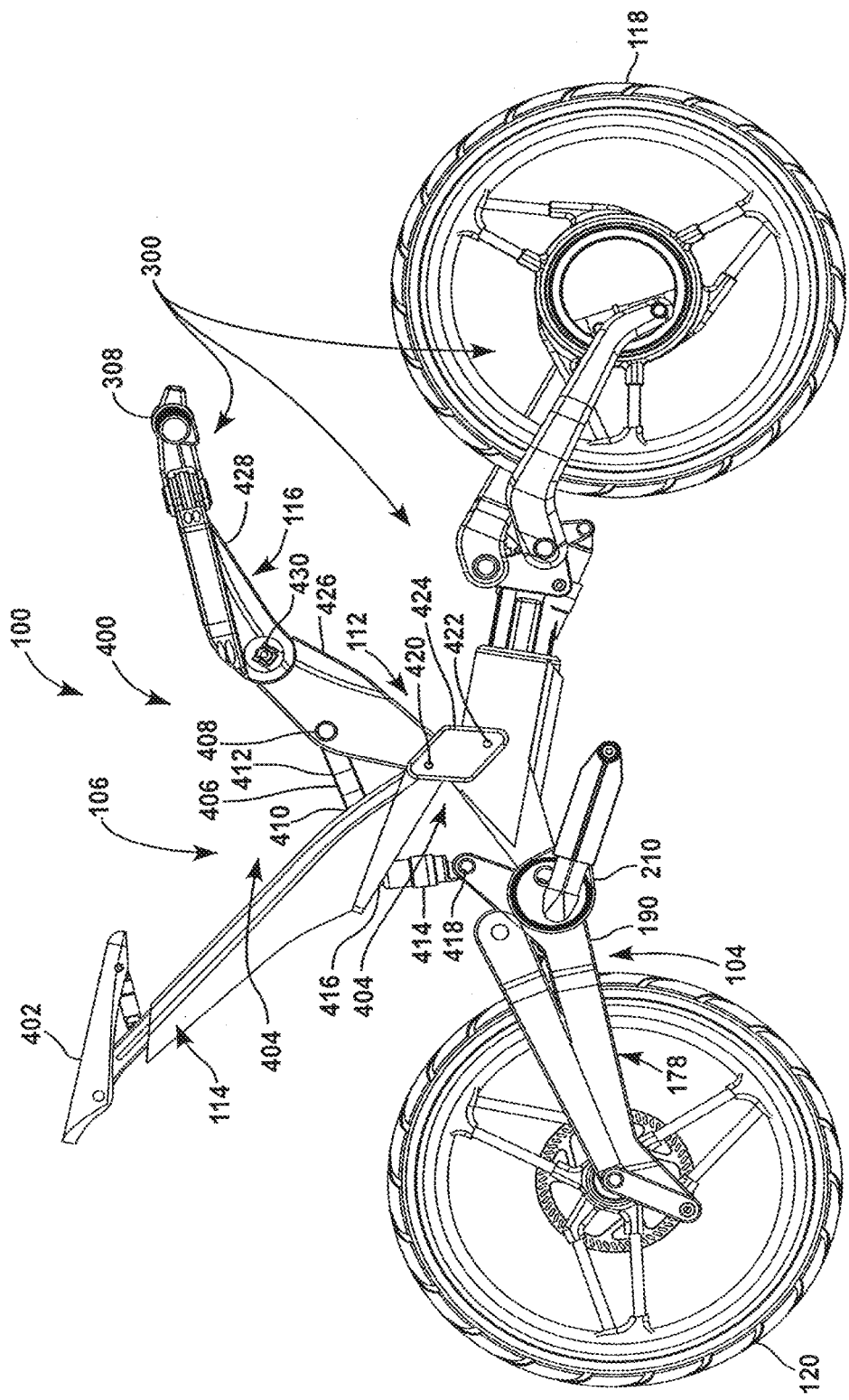
FIG. 11 is a side view of the position adjusting arrangement of FIG. 10 in a second configuration.

Referring to FIGS. 1 and 10-11, a first embodiment of a position adjusting arrangement assembly, or system 400 designed in accordance with aspects of the present disclosure will be described with reference to vehicle 100. As mentioned above, vehicle 100 includes seat support arrangement 114, handle bar support arrangement 116, rear wheel 120, steerable front wheel 118, steering arrangement 300, and hub arrangement 112 for interconnecting components of vehicle 100. Steering arrangement 300 includes handle bar 308 for allowing the rider to control steerable front wheel 118 and seat support arrangement 114 includes a seat 402 for supporting the rider. In this embodiment, seat support arrangement 114 is an adjustable seat support arrangement pivotally connected to hub arrangement 112 and handle bar support arrangement 116 is an adjustable handle bar support arrangement pivotally connected to hub arrangement 112. Position adjusting arrangement 400 further includes a releasable position locking arrangement or system 404 that is releasable by the rider when the rider is riding vehicle 100. Position locking arrangement 404 is configured to lock the relative positions of hub arrangement 112, adjustable seat support arrangement 114, and adjustable handle bar support arrangement 116 when position locking arrangement 404 is not released by the rider.

In the embodiment illustrated in FIG. 1, position adjusting arrangement 400 includes a variable length link 406 for connecting adjustable seat support arrangement 114 to adjustable handle bar support arrangement 116. Variable length link 406 has a first end 408 that is pivotally connected to adjustable handle bar support arrangement 116 and a second end 410 that is pivotally connected to adjustable seat support arrangement 114. Position locking arrangement 404 includes a link locking arrangement 412 for locking variable length link 406 at a desired length.

The above described configuration of position adjusting arrangement 400 allows a rider to adjust the position of handle bar support arrangement 116 relative to seat support arrangement 114 by releasing link locking arrangement 412. This is illustrated best in FIGS. 10 and 11 with FIG. 10 showing handle bar support arrangement 116 moved forward and away from seat support arrangement 114 and FIG. 11 showing handle bar support arrangement 116 moved backward towards seat support arrangement 114.

Position adjusting arrangement 400 may also include a biasing arrangement 414 for connecting adjustable seat support arrangement 114 to another portion of vehicle 100. In this example, biasing arrangement 414 takes the form of a shock absorber for biasing seat support arrangement 114 into a desired position and dampening the movement of seat support arrangement 114. Shock absorber 414 has a first end 416 that is pivotally connected to adjustable seat support arrangement 114 and a second end 418 that is pivotally connected to link 190 of articulated linkage 178 of rear suspension system 104.

In the embodiment being described, adjustable seat support arrangement 114 and adjustable handle bar support arrangement 116 are pivotally connected to one another at a pivot point 420. Adjustable seat support arrangement 114 and adjustable handle bar support arrangement 116 are also pivotally connected to hub arrangement 112 at this same pivot point 420. This allows the combination of seat support arrangement 114 and handle bar arrangement 116 to pivot together about pivot point 420 relative to hub arrangement 112. In this embodiment, hub arrangement 112 further includes a second pivot point 422 at which hub arrangement 112 is pivotally connected to telescoping shock absorber 130 of front suspension system 102. Pivot point 422 of hub arrangement 112 is configured such that pivot point 420 of hub arrangement may be moved forward or backward relative to telescoping shock absorber 130 and the rest of vehicle 100 as hub arrangement 112 pivots about pivot point 422. Position locking arrangement 404 further includes a hub locking arrangement 424 for locking the position of hub arrangement 112 relative to telescoping shock absorber 130. A hub axle may be installed at either of the pivot points 420 or 422 to provide the pivot axis between the respective components.

The above described configuration of position adjusting arrangement 400 allows a rider to adjust the position of the combination of handle bar support arrangement 116 and seat support arrangement 114 relative to the rest of vehicle 100 by releasing hub locking arrangement 424. This is shown best in FIGS. 10 and 11 with FIG. 10 showing the combination of handle bar support arrangement 116 and seat support arrangement 114 moved forward relative to the rest of vehicle 100 and FIG. 11 showing the combination of handle bar support arrangement 116 and seat support arrangement moved backward towards relative to the rest of vehicle 100. This is possible because the only other connection between the combination of handle bar support arrangement 116 and seat support arrangement 114 is biasing arrangement 414 which is pivotally connected at both of its ends between seat support arrangement 114 and rear suspension system 104. Therefore, the pivoting of hub arrangement 112 about pivot point 422 will cause the pivoting of biasing arrangement 414 about its pivotally connected ends allowing the back and forth movement of the combination of seat support arrangement 114 and handle bar support arrangement 116.

Link locking arrangement 412 and hub locking arrangement 424 may be any suitable and readily providable locking arrangement including a clamping arrangement, a cam lock arrangement, or any other desired locking arrangement. For example, these locking arrangements may be provided by spring-loaded clamps that are normally biased into a locked position. Furthermore, the mechanisms for allowing the rider to release the locking arrangements may be any suitable and readily providable release mechanism. For example, the locking arrangements may be released by the rider using a cable system that is actuated by twist grips or thumb levers located on the handle bar.

Although position adjusting arrangement 400 has been described as including variable length link 406 and pivoting hub arrangement 112, it should be understood that position adjusting arrangement may include additional position adjusting features. For example, as illustrated in FIG. 11, handle bar support arrangement 116 may be an articulated linkage having a first link 426 and a second link 428 that are pivotally connected at pivot point 430 to allow the height of handle bar 308 to be adjusted. Pivot point 430 may include a locking arrangement for locking the position of second link 428 relative to first link 426.

Figure 12:
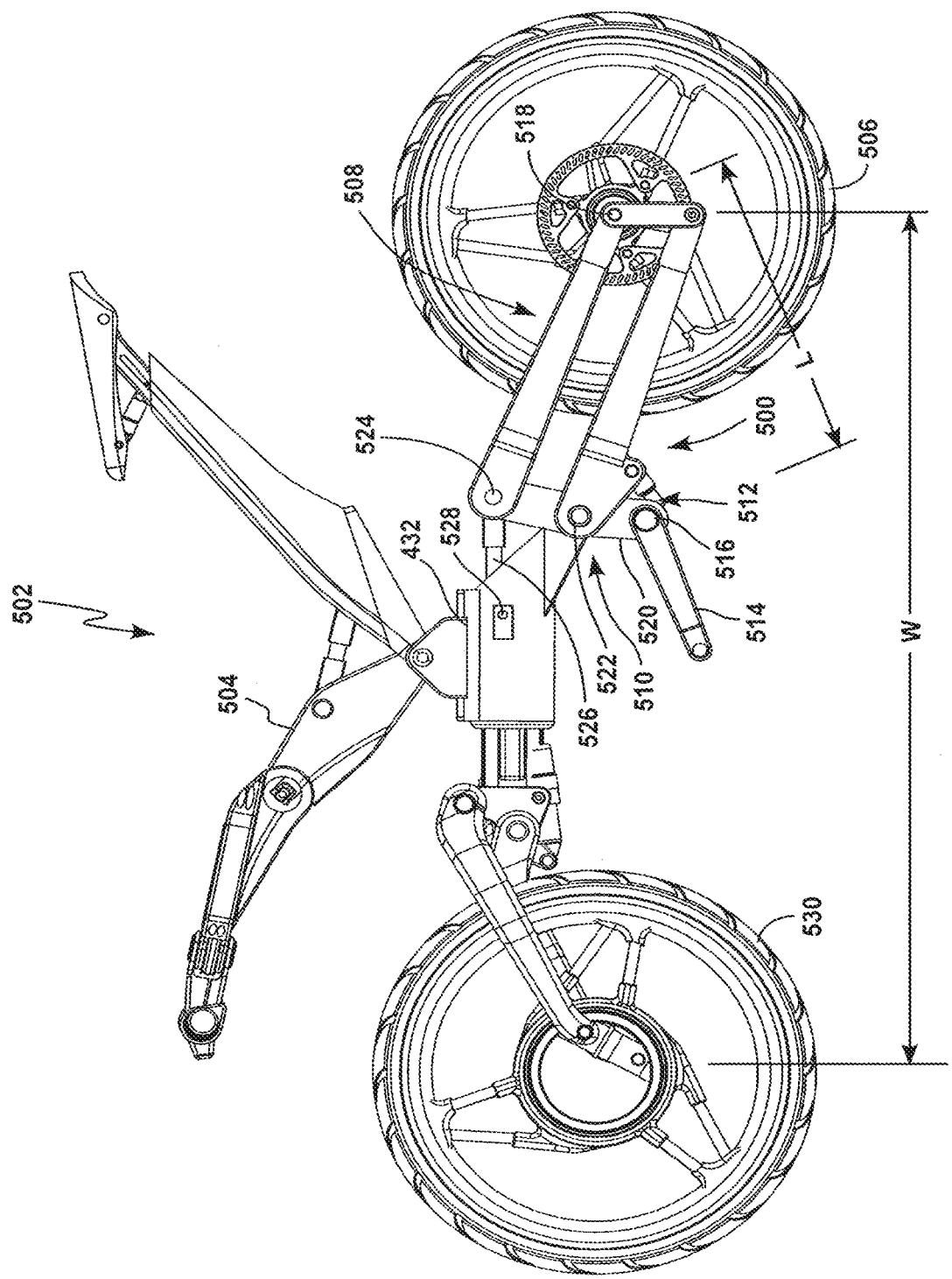
FIG. 12 is a side view of another embodiment of a position adjusting arrangement and a suspension adjusting arrangement in accordance with aspects of the present invention.

Although hub arrangement 112 has been described as being pivotally connected to telescoping shock absorber 130 to provide the front to back adjustment of seat support arrangement 114 and handle bar support arrangement 116, this is not a requirement. Instead, any suitable and readily providable mechanism that allows the front to back adjustment of seat support arrangement 114 and handle bar support arrangement 116 may be used. For example, as illustrated in FIG. 12, a slidable track 432 may be used to provide this feature. A hub axle may be installed at the pivot point between the slideable portion of the hub and the seat support arrangement 114 and handle bar support arrangement 116 to provide the pivot axis between the respective components.

Referring to FIG. 12, a rear wheel suspension adjusting arrangement 500 designed in accordance with aspects of this disclosure will be described in more detail. Rear wheel suspension adjusting arrangement 500 may be used in a vehicle 502 including a frame 504, a suspended rear drive wheel 506 that supports frame 504, and a suspension system 508 for connecting rear drive wheel 506 to frame 504. Suspension adjusting arrangement 500 includes a configuration adjusting arrangement 510 for changing the positioning of suspension system 508 relative to frame 504 such that suspension system 508 may be moved into an uphill configuration when vehicle 502 is traveling uphill and such that suspension system 508 may be moved into a downhill configuration when vehicle 502 is traveling downhill. Suspension adjusting arrangement 500 also includes an activating arrangement 512 for activating configuration adjusting arrangement 510 to cause configuration adjusting arrangement 510 to change the positioning of suspension system 508 relative to frame 504 while vehicle 502 is being used.

In a first embodiment, vehicle 502 further includes a crank set assembly 514 having a crank set rotational axis 516. Crank set assembly 514 is configured to allow a rider to input a rotational drive about crank set rotational axis 516 for driving rear drive wheel 506. Rear wheel 506 has a rear wheel axis 518 and suspension system 508 has an effective swing arm length L that extends from crank set rotational axis 516 to rear wheel axis 518. As will be described in more detail hereinafter, configuration adjusting arrangement 510 decreases effective swing arm length L when vehicle 502 is traveling uphill and increases effective swing arm length L when vehicle 502 is traveling downhill.

As illustrated in FIG. 12, activating arrangement 512 includes a pivoting member 520 that is pivotally connected to frame 504 of vehicle 502 about a pivoting member rotational axis 522 that is parallel to, but spaced apart from, crank set rotational axis 516. Crank set rotational axis 516 is located below pivoting member rotational axis 520 when vehicle 502 is in an upright position such that the weight of the rider on crank set assembly 514 causes pivoting member 520 to pivot. With this configuration, the weight of the rider on crank set assembly 514 causes crank set rotational axis 516 to move toward the front of frame 504 when vehicle 502 is traveling downhill and causes crank set rotational axis 516 to move toward the rear of frame 504 when vehicle 502 is traveling uphill.

Configuration adjusting arrangement 510 further includes a suspension pivot point 524 that is located on pivoting member 520 above pivoting member rotational axis 522 when vehicle 502 is in an upright position. Suspension system 508 is pivotally connected to suspension pivot point 524 of pivoting member 520 of suspension adjusting arrangement 500 such that the weight of the rider on crank set assembly 514 causes pivoting member 520 to pivot with suspension pivot point 524 moving toward the rear of frame 504 causing suspension system 508 to move into a downhill configuration when vehicle 502 is traveling downhill. With this configuration, suspension pivot point 524 moves toward the front of frame 504 causing suspension system 508 to move into an uphill configuration when vehicle 502 is traveling uphill.

Suspension adjusting arrangement 500 may further include a dampening arrangement 526 for dampening the speed of the pivoting of pivoting member 520 of activating arrangement 512. Alternatively, dampening arrangement 526 may take the form of an actuator for mechanically controlling the pivoting of pivoting member 520. In this case, actuator 526 may be any suitable and readily providable actuator including a motorized actuator, a pneumatic actuator, a hydraulic actuator, a cable driven actuator, a push rod driven actuator, a magnetic actuator, or any other desired actuator. In some embodiments, actuator 526 may be manually controlled by an operator of the vehicle. Alternatively, activating arrangement 512 may include a sensor arrangement 528 for sensing when vehicle is traveling uphill and downhill, and actuator 526 may be automatically controlled.

Vehicle 502 may include a front wheel 530 such that vehicle 502 has a wheel base that is defined by the distance W between front wheel 530 and the rear wheel 506. In accordance with aspects of this disclosure, suspension adjusting arrangement 500 changes the wheel base of the vehicle as configuration adjusting arrangement 510 moves suspension system 508 between the uphill configuration and the downhill configuration.

Some aspects of the present disclosure relate to methods and arrangements for providing a signal arrangement for use in a vehicle by a vehicle operator to indicate the intentions of the operator of the vehicle. The signal arrangement may be used in vehicles such as a bicycle, a tricycle, a quadracycle, a motorcycles, an automobile, an off-road vehicle, or any other desired vehicle. In accordance with one aspect of this disclosure, the signal arrangement includes a plurality of signaling elements configured to indicate the operator's intention to continue traveling in a primarily straight-ahead direction.

Referring to FIGS. 13a-f, a signal arrangement 600 designed in accordance with the invention will be described. In this embodiment, signal arrangement 600 includes a plurality of signaling elements 602. Signal elements 602 include a plurality of vertically spaced apart, upwardly pointing, lighted arrows 604. In this example, signal arrangement 600 includes three lighted arrows 604 a, 604 b, and 604 c. As illustrated in FIG. 13a, signal arrangement 600 further includes a controller 606 that is configured to control the illumination of signal elements 602. As illustrated by FIGS. 13a-c and in accordance with aspects of this disclosure, controller 606 is configured to illuminate lighted arrows 604 a-c in sequence from lowermost lighted arrow 604 a to uppermost lighted arrow 604 c when the operator activates signal arrangement 600 to indicate the intention to continue traveling in the primarily straight-ahead direction.

Signal arrangement 600 may further include additional lighted elements 608 that may combine with uppermost lighted arrow 604 c to provide a lighted X that may be used to indicate braking or the intention to stop as illustrated in FIG. 13d. Signal arrangement 600 may also include lighted arrows 610 and 612 that may be respectively used to indicate a right turn or a left turn as illustrated in FIGS. 13e and 13f. In a preferred embodiment for use with a bicycle, signal arrangement may use LEDs to provide light sources for each of signal elements 602 and signal arrangement 600 may be mounted to the bottom back portion of the bicycle seat.

Figure 14:
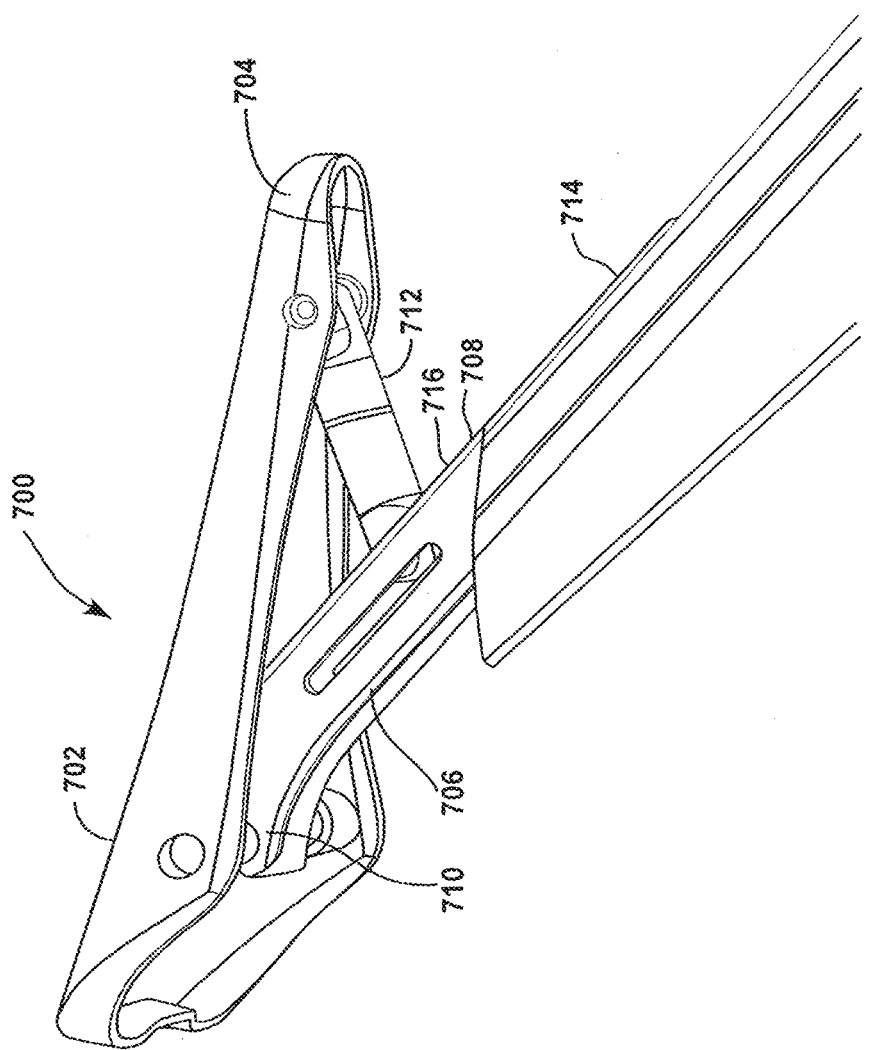
FIG. 14 is a side perspective view of a bicycle seat in accordance with aspects of the present invention.

Some aspects of the present disclosure relate to methods and arrangements for providing a bicycle seat for supporting a bicycle rider on a bicycle. Referring now to FIG. 14, a bicycle seat 700 includes a saddle 702 for supporting the rider when bicycle seat 700 is attached to a bicycle. Saddle 702 has a nose portion 704 located at the front of saddle 702 when bicycle seat 700 is attached to the bicycle. Bicycle seat 700 also includes a seat mount 706. Seat mount 706 has a first end 708 configured to allow bicycle seat 700 to be attached to the bicycle. Seat mount 706 also has a second end 710 that is pivotally connected to saddle 702 such that seat mount 706 supports saddle 702 and such that nose portion 704 of saddle 702 is free to pivot relative to seat mount 706 when seat 700 is attached to the bicycle. Bicycle seat 700 further includes a biasing arrangement 712 connected between seat mount 706 and nose portion 704 of saddle 702. Biasing arrangement 712 is configured to bias nose portion 704 of saddle 702 into a desired position when bicycle seat 700 is attached to the bicycle. Biasing arrangement 712 allows nose portion 704 of saddle 702 to pivot downward relative to the rider when pressure is applied to nose portion 704 of saddle 702. The bicycle may include a frame 714 and seat mount 706 may include a seat post 716 for attaching bicycle seat 700 to frame 714 with seat post 716 being slideably connected to frame 714 to allow the position of bicycle seat 700 to be adjusted relative to frame 714.

Figure 15:
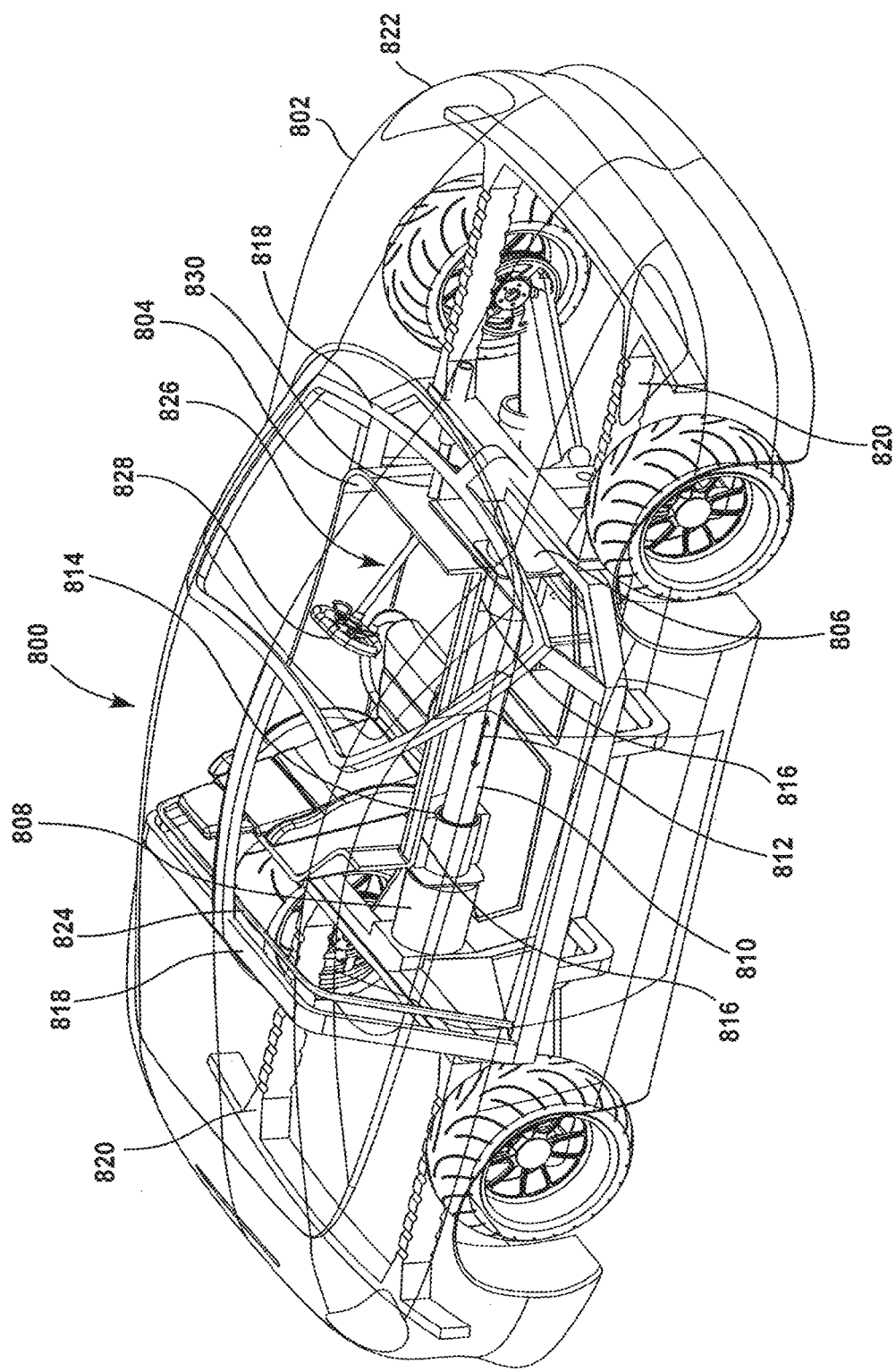
FIG. 15 is a perspective view of a first embodiment of a collision impact reduction system in accordance with aspects of the present invention.
Figure 16:
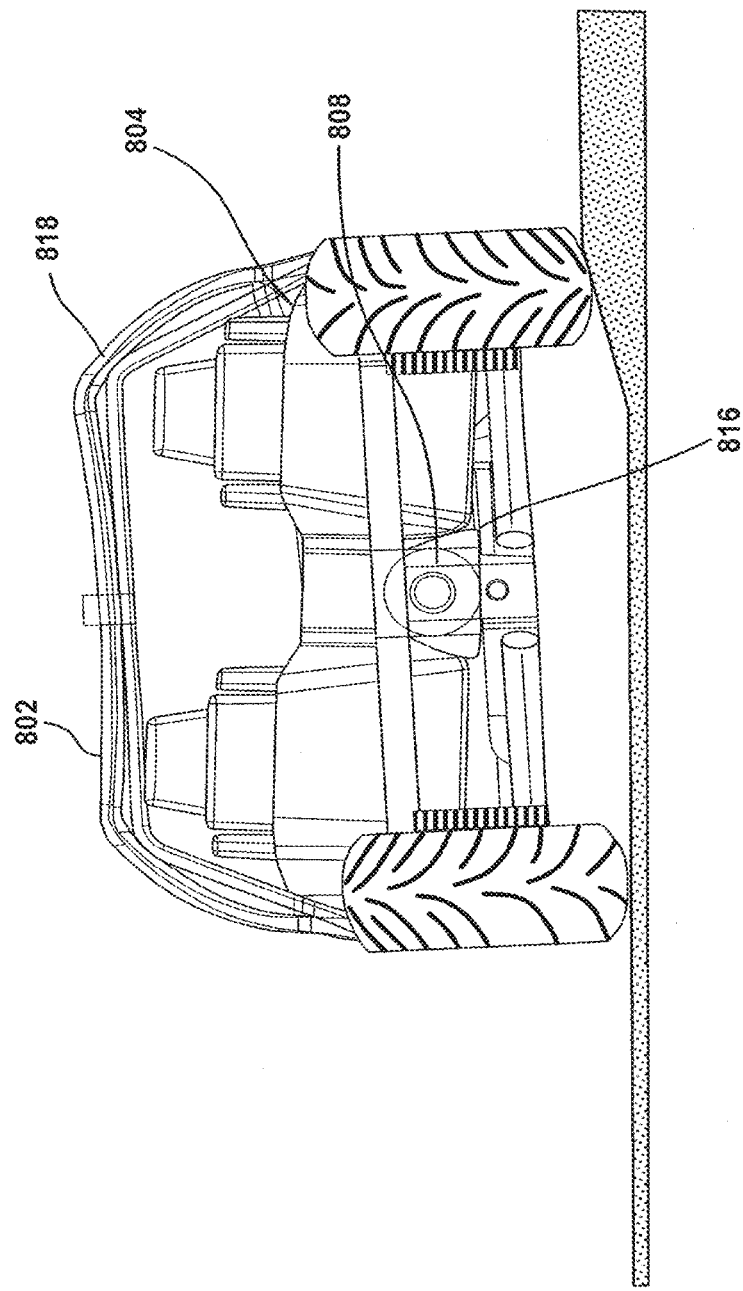
FIG. 16 is a rear view of the collision impact reduction system of FIG. 15.

Some aspects of the present disclosure relate to methods and arrangements for providing a collision impact reduction system for a vehicle. Referring now to FIGS. 15 and 16, a first example of a collision impact reduction system 800 designed in accordance with aspects of this disclosure will be described. Collision impact reduction system 800 is designed for use in a passenger carrying vehicle such as vehicle 802 of FIGS. 15 and 16 and collision impact reduction system 800 is designed to reduce the impact force associated with a collision on a passenger in a passenger carrying vehicle 802. Collision impact reduction system 800 includes a suspended passenger compartment 804 for carrying at least one passenger. Suspended passenger compartment 804 is supported within vehicle 802 such that suspended passenger compartment 804 is movable within the vehicle in at least one direction in response to vehicle 802 colliding with another object. Collision impact reduction system 800 also includes at least one shock absorbing mount, indicated by front shock absorbing mount 806 and rear shock absorbing mount 808 in this embodiment, for supporting suspended passenger compartment 804 within vehicle 802. Shock absorbing mounts 806 and 808 are attached between suspended passenger compartment 804 and another portion of vehicle 802 to dampen the impact force associated with the collision. This reduces the impact force that is transferred from vehicle 802 to suspended passenger compartment 804 and the passenger in the at least one direction that suspended passenger compartment 804 is able to move within vehicle 802.

Collision impact reduction system 800 may include a guide track 810 that extends in a longitudinal direction 812 within vehicle 802. Suspended passenger compartment 804 may be connected to guide track 810 such that suspended passenger compartment 804 is movable in longitudinal direction 812. Suspended passenger compartment 804 may also be connected to guide track 810 such that suspended passenger compartment 804 may pivot about longitudinal direction 812 of guide track 810 as shown best in FIG. 16.

Collision impact reduction system 800 may include one or more linear bearings 814 for pivotally connecting suspended passenger compartment 804 to guide track 810 in a manner that allows suspended passenger compartment 804 to slide along guide track 810 in longitudinal direction 812 in a front to back manner with respect to vehicle 802. This configuration also allows suspended passenger compartment 804 to have some rotationally movement about guide track 810. Collision impact reduction system 800 may include additional shock absorbing mounts 816 that are located between linear bearings 814 and suspended passenger compartment 804. Additional shock absorbing mounts 816 may be connected between linear bearings 814 and suspended passenger compartment 804 such that additional shock absorbing mounts 816 bias suspended passenger compartment 804 into a desired position and control and dampen the rotational movement of the suspended passenger compartment 804 about guide track 810. Additional shock absorbing mounts 816 may also provide side, top and bottom impact shock absorption between the suspended passenger compartment 804 and the rest of the vehicle.

In the embodiment being described, the linear movement of suspended passenger compartment 804 traveling along longitudinal direction 812 of guide track 810 is controlled by front shock absorbing mount 806 and rear shock absorbing mount 808. Front shock absorbing mount 806 and rear shock absorbing mount 808 are mounted around guide track 810 and are positioned between a portion of vehicle 802 and suspended passenger compartment 804. Guide track 810 is fixed to portions of vehicle 802. With this configuration, front shock absorbing mount 806 is configured to dampen the impact force transferred to suspended passenger compartment 804 during a frontal impact to vehicle 802 and rear shock absorbing mount 808 is configured to dampen the impact force transferred to suspended passenger compartment 804 during a rear impact to the vehicle. Front and rear shock absorbing mounts 806 and 808 may be any suitable and readily providable shock absorbing mount using any suitable and readily providable mechanism or material including a telescoping shock absorber, a foam material, a polymer material, or any other desired material.

Vehicle 802 may include a passenger safety frame 818, one or more crumple zone structures 820, and a vehicle body 822. Passenger safety frame 818 may be formed as part of vehicle body 822 or may be provided as one or more components that are incorporated into vehicle 802. Crumple zone structures 820 may also be formed as part of vehicle body 822.

Alternatively, as illustrated in FIGS. 15 and 16, crumple zone structures 820 may be replaceable crumple zone structures that are connected to passenger safety frame 818 of vehicle 802.

Although vehicle 802 has been described as including guide track 810 that is centrally located in vehicle 802, it should be understood that this is not a requirement. Instead, guide track 810 may be provided in a wide variety of other configurations and remain within the scope of the invention. For example, multiple guide tracks may be provided which could be mounted on the sides, above, or below the suspended passenger. Furthermore, although collision impact reduction system 800 is described as including one or more guide tracks, it should be understood that this is not a requirement. Instead, the suspended passenger compartment could be suspended by a shock absorbing polymer or memory foam within the structure of the vehicle without the use of guide tracks or any other mechanical device and still be within the scope of the present invention.

Although suspended passenger compartment 804 has been described as a compartment, this is not a requirement. Instead, suspended passenger compartment 804 could be provided in the form of a simple moveable platform or platforms that allows the platform to move in a suspended manner independent of the main vehicle body, frame or structure. Furthermore, although suspended passenger compartment 804 has been described as being one fixed assembly, this is not a requirement. For example, suspended passenger compartment 804 may be divided into right and left sections that would enable the right and left halves of the suspended passenger compartment to move independently of each other.

Although vehicle 802 has been described as including passenger safety frame 818 and suspended passenger compartment 804 has been described as being supported within vehicle 802, it should be understood that the passenger safety frame may be provided as part of the suspended passenger compartment rather that as part of the vehicle body. For example, suspended passenger compartment 804 may include a roll bar 824 that is formed as an integrated part of the suspended passenger compartment 804 as illustrated in FIG. 15. Alternatively, the suspended passenger compartment may include a full roll cage which would then be suspended independently of the rest of the vehicle.

Vehicle 802 further includes a steering system 826 having a steering wheel 828 located within suspended passenger compartment 804 for steering vehicle 802. Steering system 826 is configured to allow movement of steering wheel 828 with suspended passenger compartment 804 relative to the rest of vehicle 802 while maintaining steering control of vehicle 802 using steering wheel 828. In a preferred embodiment, steering system 826 includes a telescopic section 830 that allows steering wheel 828 to move with the suspended passenger compartment 804 during any movement of suspended passenger compartment 804. Telescopic section 830 of steering system 826 may include a driving and a driven member that are configured to allow the transfer of the rotational movement from steering wheel 828 through steering system 826 while allowing telescopic section 830 of steering system 826 to change lengths as suspended passenger compartment 804 moves.

Although steering system 826 is described as being a mechanical linkage with a driving and driven member to translate the steering wheel motion to the rest of the vehicle, it should be understood that this is not a requirement. Instead, a wide range of suitable and readily providable devices may be used to transfer the driver's steering input to the rest of the vehicle. These devices may include, but are not limited to, electric motors, hydraulic, pneumatic, or magnetic actuators, gear systems such as a rack and pinion, belts, chains and levers, or any number of combinations thereof.

Figure 17:
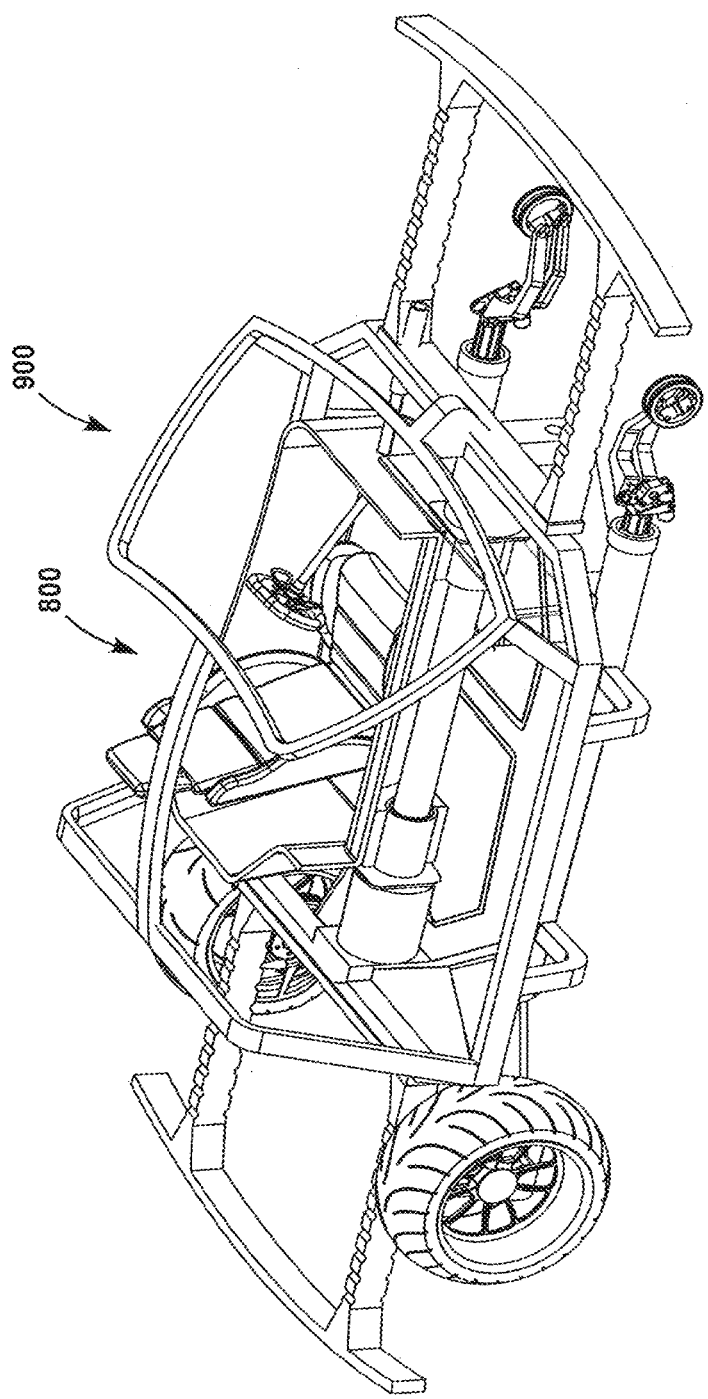
FIG. 17 is a perspective view of another embodiment of a vehicle in accordance with aspects of the present invention.

A number of specific implementations of the present disclosure have been described with reference to specific types of vehicles. Nevertheless, it should be understood that various modifications may be made without departing from the spirit and scope of the present disclosure. Therefore, it should be understood that various systems that have been described above may be combined in a wide variety of ways to provide vehicles for different applications. For example, as illustrated in FIG. 17, an automobile 900 may be provided that includes collision impact reduction system 800 along with variations of the variable path front suspension systems described above for vehicle 100. Accordingly, other implementations are within the scope of the following claims.

Some aspects of the present disclosure relate to methods and arrangements for providing a wheeled vehicle having a multi-axis suspension system. Referring now to the illustrative embodiment of FIGS. 18-23 and 26-29, a vehicle 1100 is provided which is designed in accordance with this disclosure. The vehicle 1100 is configured similarly and functions in similar fashion to vehicle 100 described above, and includes many identical or substantially similar components, but includes some alternative and/or additional methods, arrangements, and components which are discussed hereinafter. In this example, vehicle 1100 takes the form of a motorcycle, however, although the methods and arrangements will be described initially as being part of a motorcycle, it should be understood that the suspension systems of the present disclosure may be used in a wide variety of applications and are not limited to motorcycles. Instead, these methods and arrangements may be used in any desired application including a wide variety of vehicles such as bicycles, automobiles, trucks, off-road vehicles, or any other type of vehicle.

For reference purposes, substantially similar or identical arrangements and components of vehicle 1100 as compared to vehicle 100 are labeled with the same label number appended with the addition of 1000 (compare FIGS. 1-4 and 9-11 with FIGS. 18-23 and 26-29; e.g. the first front path 1124 is substantially similar to first front path 124). The following is a listing of just some of the arrangements and components of vehicle 1100 which are identical or substantially similar to the arrangements and components of vehicle 100 discussed above, with significant differences discussed in detail further below: front suspension system 1102; rear suspension system 1104; main vehicle body 1106; front suspended assembly 1109; rear suspended assembly 1110; hub arrangement 1112; seat support arrangement 1114; handle bar support arrangement 1116; front wheel 1118; rear wheel 1120; first front suspension arrangement 1122; first front path 1124; second front path 1128; telescoping shock absorber 1130; longitudinal axis 1132; first rear suspension arrangement 1170; first handle bar axis 1312; seat 1402; and position locking arrangement or position lock 1404, in addition to other substantially similar arrangements and components.

Figure 18:
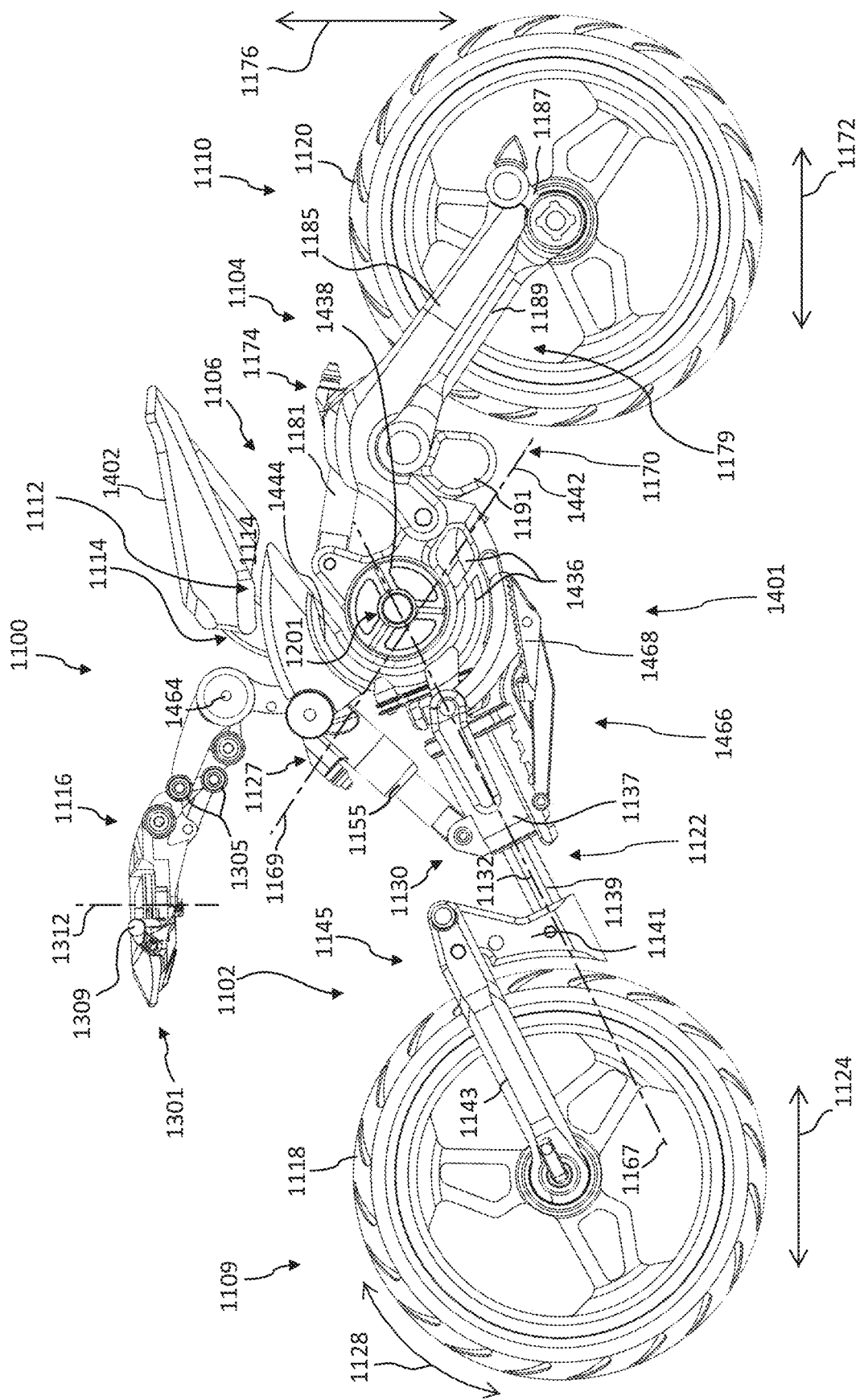
FIG. 18 is a left side view of a motorcycle in accordance with aspects of the present invention.

As illustrated in FIG. 18, vehicle 1100 includes a main vehicle body 1106 and a front and a rear suspended assembly 1109 and 1110 that are configured to support main body 1106 of vehicle 1100. In this embodiment, main body 1106 includes a hub arrangement or assembly 1112, a seat support arrangement, assembly, or system 1114, and a handle bar support arrangement, assembly, or system 1116. Front suspended assembly 1109 includes a front wheel 1118 that is movably connected to main body 1106 of vehicle 1100 using front suspension system 1102. Rear suspended assembly 1110 includes a rear wheel 1120 that is movably connected to main body 1106 of vehicle 1100 using rear suspension system 1104. Suspended assemblies 1109 and 1110 are configured to support vehicle 1100 and assist in providing directional control of the vehicle and stability in a lateral direction relative to a normal straight-ahead direction of travel of the vehicle.

As will be described in more detail hereinafter, front suspension system 1102 and rear suspension system 1104 of vehicle 1100 are different variations of suspension systems that are both designed in accordance with aspects of this disclosure. Although front suspension system 1102 will be described herein as being a suspension system for a steerable front wheel of a motorcycle and rear suspension system 1104 will be described herein as being a suspension system for a rear wheel of a motorcycle, it should be understood that the invention is not limited to these specific applications. Instead, various aspects of front suspension system 1102 and/or rear suspension system 1104 may be used to provide a suspension system for a front wheel or a rear wheel for any desired vehicle. Furthermore, it should be understood that aspects of the suspension arrangements described herein may be used in any desired suspended assembly in any desired application and remain within the scope of the invention. This includes suspended assemblies that have support elements such as a wheel, a ski, a skid, a float, a tread, or any other support element for a suspended assembly.

Referring now to FIGS. 18-21 and 26-27, a first embodiment of a suspension system in accordance with aspects of this disclosure will be described in more detail with reference to front suspension system 1102. Front suspension system 1102 includes a first front suspension arrangement 1122 that movably connects front suspended assembly 1109 (which in this example includes wheel 1118) to hub 1112 and main vehicle body 1106. First front suspension arrangement 1122 controls the movement of front suspended assembly 1109 relative to main vehicle body 1106 through a range of motion along a first front path 1124 that is primarily perpendicular to the lateral direction relative to the normal straight-ahead direction of travel of vehicle 1100. This allows front suspension system 1102 to support main body 1106 of vehicle 1100 while also providing lateral stability to the vehicle. In this example, first front path 1124 is primarily horizontal and parallel with the normal straight-ahead direction of travel of the vehicle 1100.

Front suspension system 1102 also includes a second front suspension arrangement 1127 (FIGS. 18-19 and 26-29) that controls movement of front suspended assembly 1109 relative to main vehicle body 1106 through a range of motion along a second front path 1128 (FIG. 18) that is also primarily perpendicular to the lateral direction when vehicle 1100 is traveling in the normal straight-ahead direction. This again allows front suspension system 1102 to support main body 1106 of vehicle 1100 while also providing lateral stability to the vehicle. In this example, second front path 1128 is primarily vertical and perpendicular to the normal straight-ahead direction of travel of the vehicle.

In accordance with some aspects of this disclosure, second front path 1128 of second front suspension arrangement 1127 is different than first front path 1124 of first front suspension arrangement 1122. With this configuration, front suspension system 1102 may use the combination of the range of motion of first front suspension arrangement 1122 and the range of motion of second front suspension arrangement 1127 to provide an overall range of motion for the suspended assembly relative to the main body that is defined by a surface area when the vehicle is traveling in the normal straight-ahead direction. As is the case in the embodiment being described, this surface area may be defined by a planar surface area in configurations in which the first path and the second path fall entirely within a common plane. Alternatively, this surface area may be defined by a curved surface area in configurations in which at least one of the first or second paths is a curved path that is not entirely coplanar with the other path.

Although first front path 1124 associated with first front suspension arrangement 1122 has been described as being primarily horizontal and second front path 1128 associated with second front suspension arrangement 1127 has been described as being primarily vertical, this is not a requirement. Instead, it should be understood that first and second front suspension arrangements 1122 and 1127 may be oriented in any desired manner and remain within the scope of the invention. This may cause first and second front paths 1124 and 1128 to be paths that are not primarily horizontal and vertical. As would be understood by one skilled in the art, the variable path feature associated with using a first and a second front suspension arrangement as described herein would be provided regardless of the orientation or angles of the first and second paths associated with the two suspension arrangements so long as the two paths are different from one another.

In the specific embodiment of front suspension system 1102 that is being described, front suspended assembly 1109 and front wheel 1118 are steerable. In the illustrated embodiment of FIGS. 18-21 and 26-29, the front suspended assembly 1109 is fixed relative to the first front suspension arrangement 1122 during operation of the vehicle 1100. This is in contrast to front suspended assembly 108 of FIGS. 1-3 which is moveable relative to the first front suspension arrangement 122 as described above. First front suspension arrangement 1122 and second front suspension arrangement 1127 cooperate to movably connect front suspended assembly 1109 to the main vehicle body 1106. Also in contrast to steerable front suspended assembly 108 and front wheel 118 of vehicle 100, the front wheel 1109 of vehicle 1100 is not independently steerable in relation to the first front suspension arrangement 1122, as will be described in more detail further below. Thus, unlike that of vehicle 100, the suspension arrangements 1122 and 1127 of vehicle 1100 do not provide for a multi-axis steering system on their own, instead, suspension arrangements 1122 and 1127 cooperate with the functionality of the hub 1112 to provide a multi-axis steering system for the vehicle 1100, as will be described in further detail below.

Figure 20:
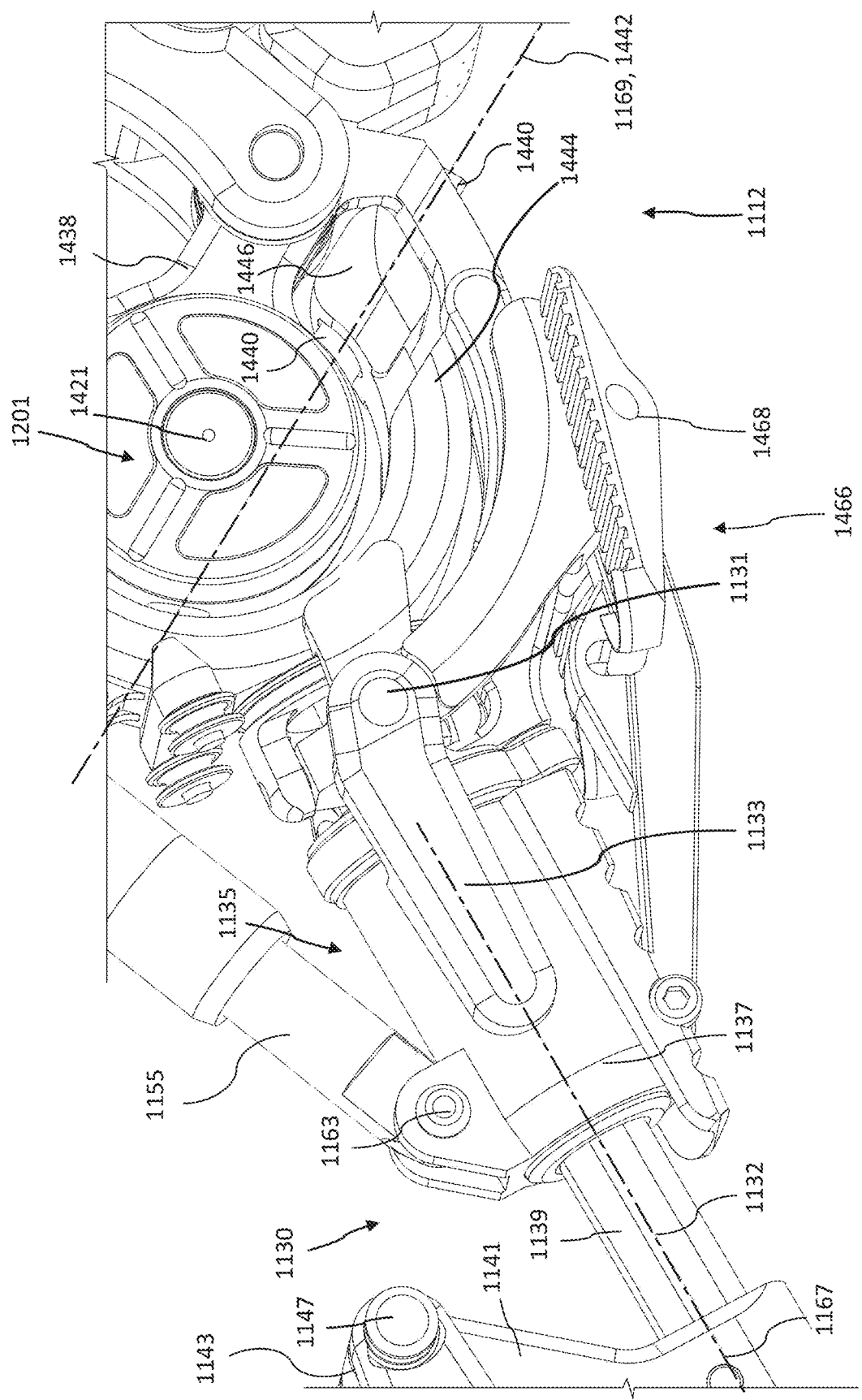
FIG. 20 is an enlarged front-left side perspective views of a portion of a hub of the motorcycle of FIG. 18.
Figure 21:
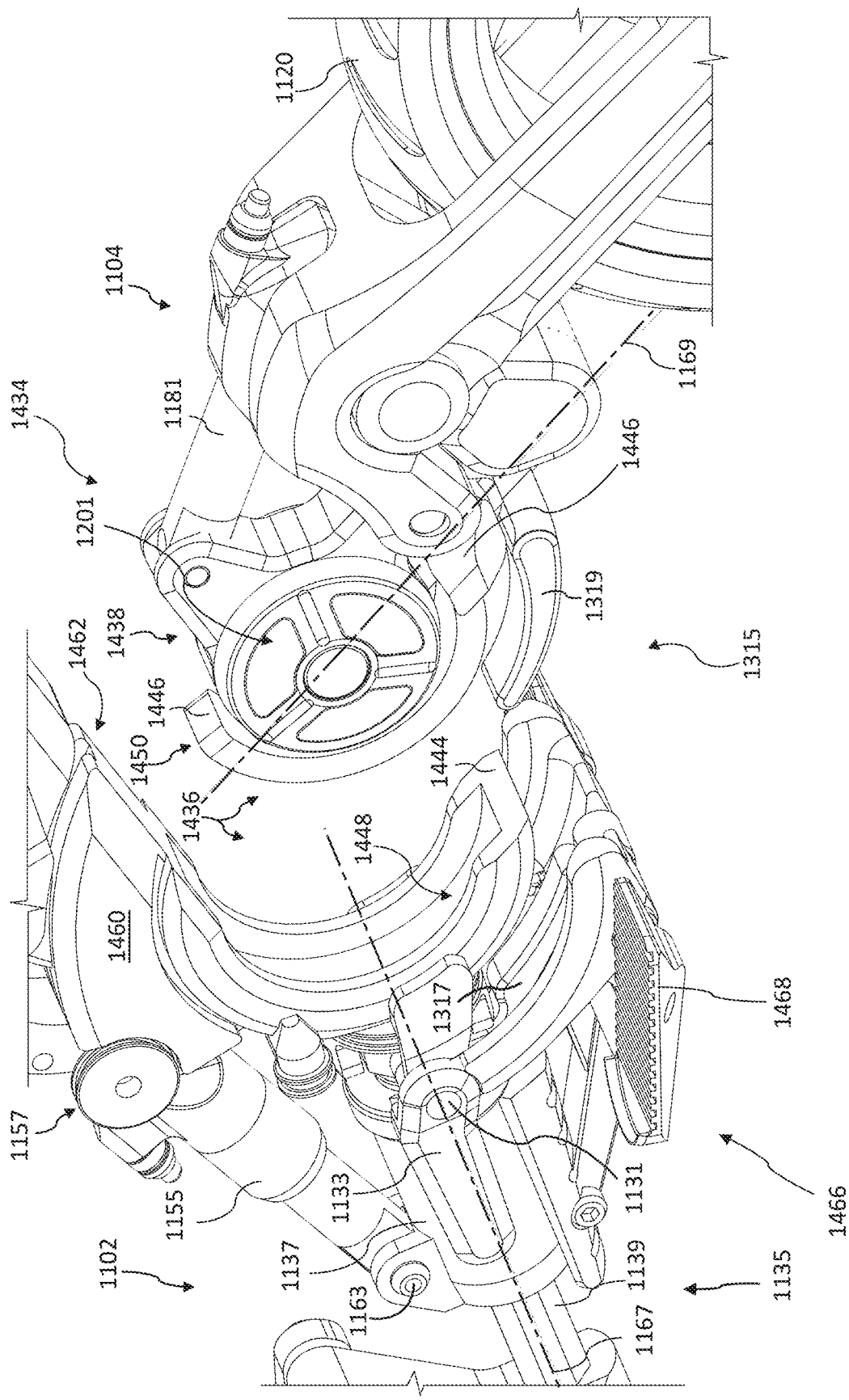
FIG. 21 is a partially exploded rear-left side perspective view of the hub portion of the motorcycle of FIG. 18.

As best illustrated in FIGS. 20-21, first front suspension arrangement 1122 of front suspension system 102 includes a telescopic shock absorber 1130 having a longitudinal axis 1132 with a first end 1134 and a second end 1136. First end 1134 of telescoping shock absorber 1130 is pivotally attached to hub 1112 of main vehicle body 1106 at pivot point 1131 (FIGS. 20 and 21). The telescoping shock absorber 1130 includes a first axis steering arrangement or assembly in the form of a steering tube assembly 1135 that includes an outer steer tube 1137 and an inner steer tube 1139. The inner steer tube 1139 is telescopically movable along longitudinal axis 1132 of telescopic shock absorber 1130 relative to the outer steer tube 1137, first end 1134 of the telescopic shock absorber 1130, and main vehicle body 1106. A strut 1133 is fixed to the outer steer tube 1137 (FIGS. 20 and 21) and includes an extension that extends beyond the first end 1134 of the telescoping shock absorber 1130 and provides pivot point 1131 at which the telescoping shock absorber 1130 pivotally connects with the main vehicle body 1106. The outer steer tube 1137 telescopically supports the inner steer tube 1139 and second end 1136 of telescoping shock absorber 1130. The inner steer tube 1139 of steering tube assembly 1135 is rotatable about longitudinal axis 1132 of telescopic shock absorber 1130 relative to the outer steer tube 1137, first end 1134 of the telescopic shock absorber 1130, and main vehicle body 1106. Movable second end 1136 of telescopic shock absorber 1130 controls movement of front suspended assembly 1109 relative to main vehicle body 106 through the range of motion along first front path 1124.

Figure 19:
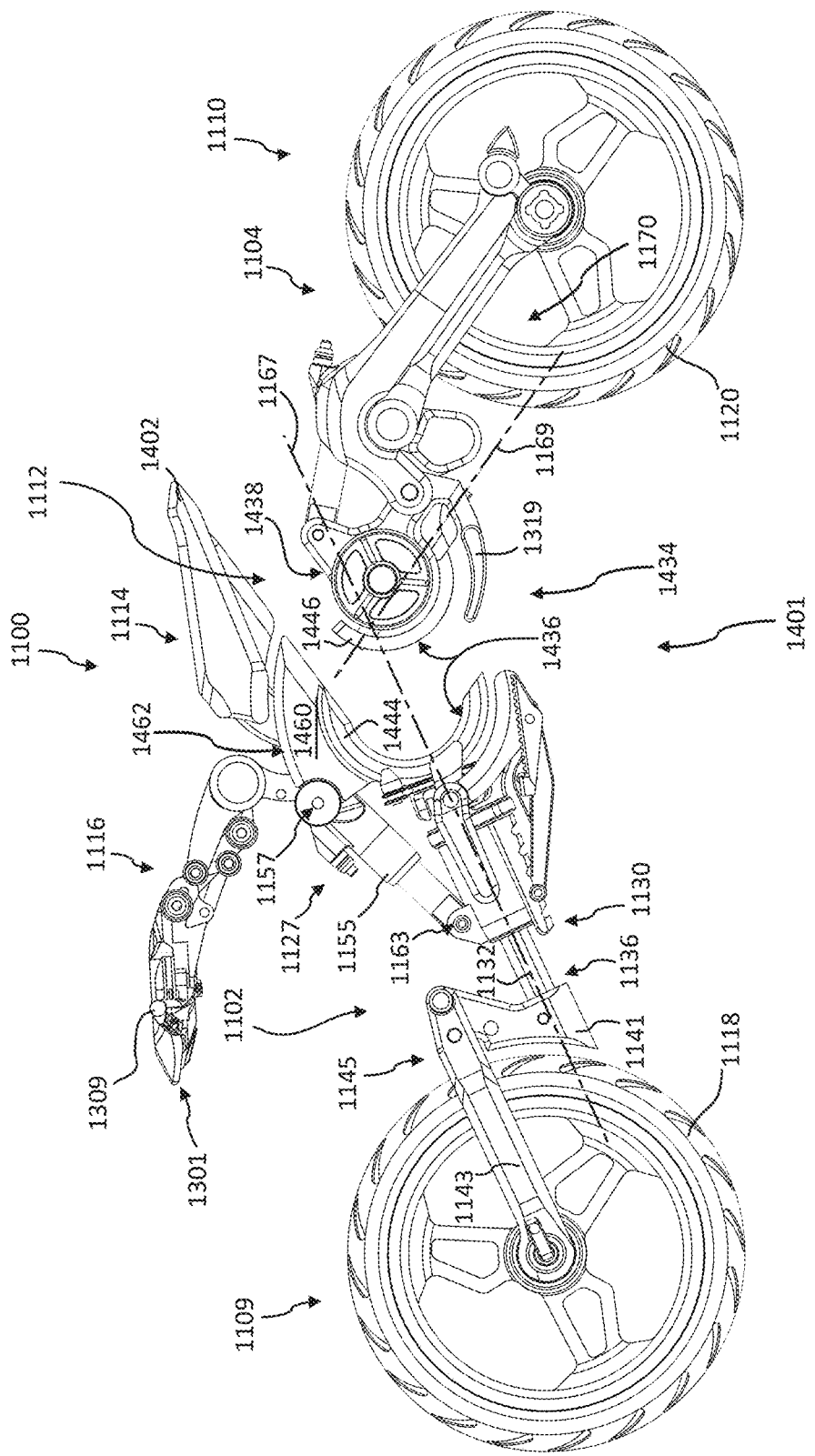
FIG. 19 is a partially exploded left side view of the motorcycle of FIG. 18.

As shown best in FIGS. 18-19, front suspended assembly 1109 of the vehicle includes a first link 1141 and a second link 1143 which form a fixed front fork assembly 1145. The fixed front fork assembly 1145 of vehicle 1100 retains the front suspended assembly 1109 in a generally consistent position relative to the second end 1136 of the telescopic shock absorber 1130 (FIG. 18) and so differs from the articulated linkage 138 of vehicle 100 in which the front suspended assembly 108 is movable relative to the second end 136 of telescopic shock absorber 130 (see FIG. 1). The first link 1141 is fixed to the second end 1136 of the telescopic shock absorber 1130 and the second link 1143 is retained in a set or locked position relative to the first link 1141 during operation of the vehicle 1100 (FIGS. 18-19). Fixed front fork assembly 1145 connects front suspended assembly 1109 to first front suspension arrangement 1122. A pivot point of first link 1141 is pivotally connected to a pivot point of second link 1143 at a fork pivot point 1147 (FIGS. 20 and 21). In the illustrated embodiment, the first link 1141 and second link 1143 are fixed relative to one another when the vehicle 1100 is operation.

When the vehicle 1100 is not in operation, a user may release the front fork assembly 1145, such as by removing a locking pin or dowel between the links 1141 and 1143, to allow the second link 1143 to pivot relative to the first link 1141 about the fork pivot point 1147 (see FIGS. 20 and 21). For example, when not riding the vehicle 1100, a user may wish to store the vehicle and may release the front fork assembly 1145 so that the front wheel 1118 and second link 1143 may rotate upward and toward the main vehicle body 1106 such that the vehicle 1100 occupies a smaller footprint and requires less space for storage. It is contemplated that the first link 1141 may rotate downward and toward main vehicle body 1106, as opposed to upward, to provide an added layer of safety and security to the front fork assembly 1145.

Optionally, the first and second links 1141 and 1143 of front fork assembly 1145 may be fully fixed to one another and the pivot point 1147 omitted, thus simplifying the front fork assembly. Further optionally, it will be appreciated that the second link 1143 may be dynamically coupled to the first link 1141 such that the second link 1143 may pivot relative to the first link 1141, telescopic shock absorber 1130, and main vehicle body 1106 during operation of the vehicle 1100. For example, a shock absorber, a polymer or coil spring, or other readily providable biasing and dampening arrangement may be provided between the first and second links 1141 and 1143 to retain a generally consistent orientation between the links and to absorb shock and vibration experienced at the links. It is preferable that such an arrangement provide only a limited or relatively small amount of articulation between the first and second links 1141 and 1143 thereby limiting the travel of front wheel 1118 due to the articulation of the links (e.g. front wheel travel of between about three-quarters of an inch to about one and a half inches (0.75" to 1.50")).

As best illustrated in FIGS. 18-19 and 26-27, second front suspension arrangement 1127 of front suspension system 1102 includes a shock absorber 1155 that is connected between telescopic shock absorber 1130 and an upper-front portion of the main vehicle body 1106. As shown best in FIGS. 20 and 21, in this specific embodiment, shock absorber 1155 is pivotally mounted to main vehicle body at a first pivot point 1157 and pivotally mounted to telescopic shock absorber 1130 at a second pivot point 1163. Unlike the second front suspension arrangement 126 of vehicle 100 which permits the front suspended assembly 108 to move relative to the second end 136 of telescopic shock absorber 130 (see FIG. 1), the second front suspension arrangement 1127 of front suspension system 1102 cooperates with the pivotable telescopic shock absorber 1130 to permit the front suspended assembly 1109 to move relative to the main vehicle body 1106 while retaining a generally consistent orientation with the second end 1136 of the telescopic shock absorber 1130 (FIG. 18). In this embodiment, shock absorber 1155 is connected to the telescopic shock absorber 1130 such that it controls movement of front suspended assembly 1109 relative to main vehicle body 1106 through the range of motion along second front path 1128 (FIG. 18). Shock absorber 1155 also biases the telescopic shock absorber 1130 into a position that allows front suspension system 1102 to support main vehicle body 1106 while allowing for the range of motion of the front suspended assembly 1109 along second front path 1128.

Although first front suspension arrangement 1122 of vehicle 1100 has been described as being provided by a telescoping shock absorber 1130 and second front suspension arrangement 1127 of vehicle 1100 has been described as being provided by shock absorber 1155 between the telescoping shock absorber 1130 and main vehicle body 1106, this is not a requirement of the invention. Instead, it should be understood that the first and second suspension arrangements may be provided by any suitable and readily providable suspension arrangement. This includes various spring suspension arrangements with separate dampeners, compressible foam or polymer mounts, torsion bars with dampeners, various multi-link suspension arrangements, or any other suitable and readily providable suspension arrangement.

The following describes the structure and function of a multi-axis steering system of vehicle 1100 and describes the contrast in structure and function between the multi-axis steering system of vehicle 1100 of the illustrated embodiment of FIGS. 18-23 and 26-29 and the multi-axis steering system of vehicle 100 of the illustrated embodiment of FIGS. 1-11 as described above. As previously mentioned, front suspended assembly 1109 of front suspension system 1102 may be a steerable suspended assembly. However, unlike the front wheel 118 of front suspended assembly 108 of front suspension system 102, the front wheel 1118 of vehicle 1100 is not independently steerable relative to the front suspension system 1102. In other words, vehicle 1100 does not have a steering axis similar in orientation and position of the first steering axis 166 of vehicle 100. Instead, the multi-axis steering system of vehicle 1100 is provided by a first steering axis 1167 and a second steering axis 1169. The first steering axis 1167 corresponds to longitudinal axis of telescoping shock absorber 1130 and extends or passes through the main vehicle body 1106 (FIGS. 18-19). The first steering axis 1167 is identical or substantially similar in function as the second steering axis 168 of vehicle 100 (see FIG. 1). The second steering axis 1169 extends or passes through the main vehicle body 1106 near a central portion of the vehicle 1100 and rearward of the telescoping shock absorber 1130 (FIGS. 18-21). The second steering axis 1169 is associated with a position adjusting arrangement, assembly, or system 1401 of vehicle 1100. The position adjusting assembly 1401 will be discussed in detail below.

Figure 22A:
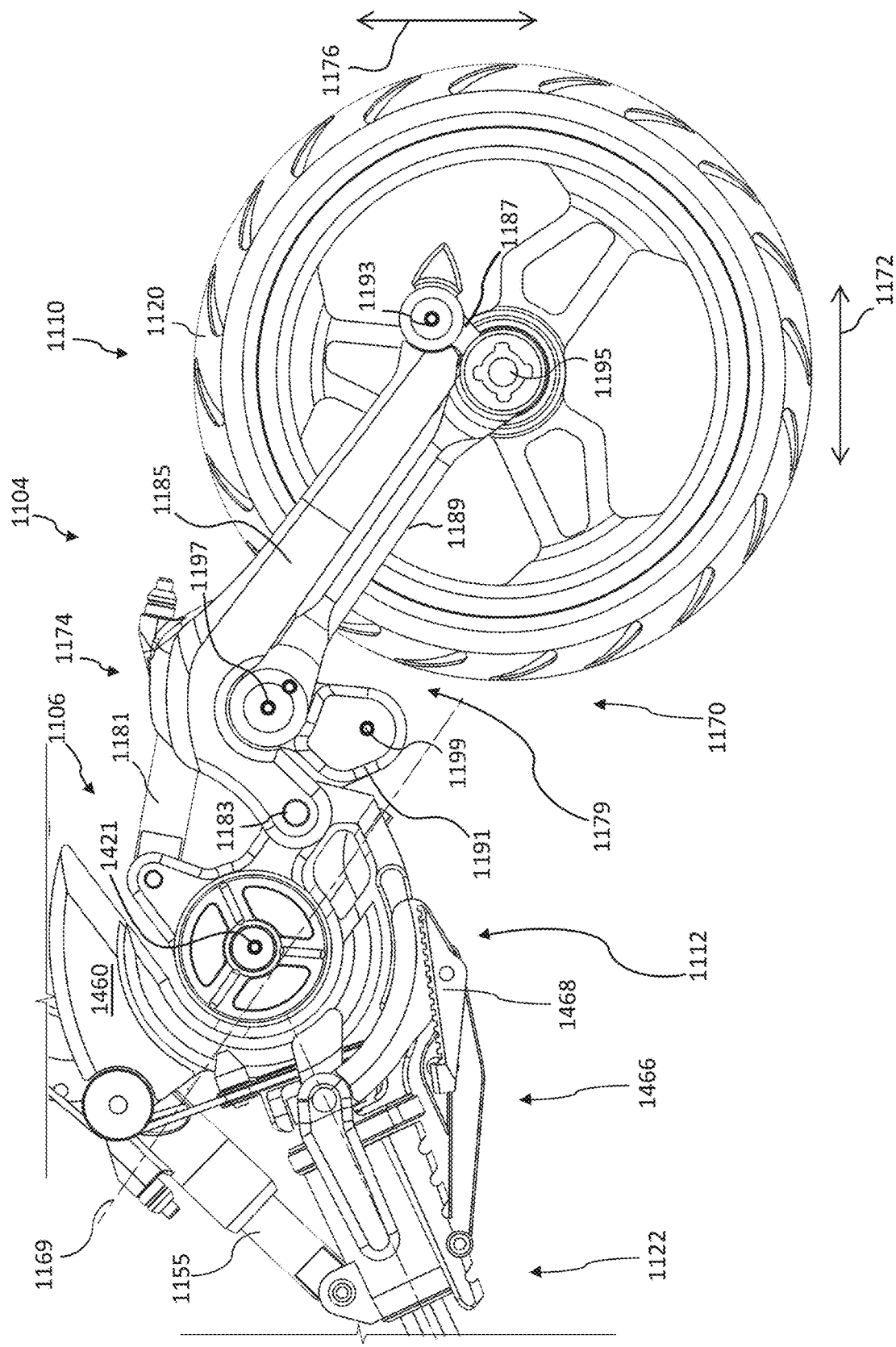
FIGS. 22A-22B are sequential enlarged left side views of a rear suspension system and rear suspended assembly of the motorcycle of FIG. 18, depicting four possible positions of the rear suspension system.
Figure 22B:
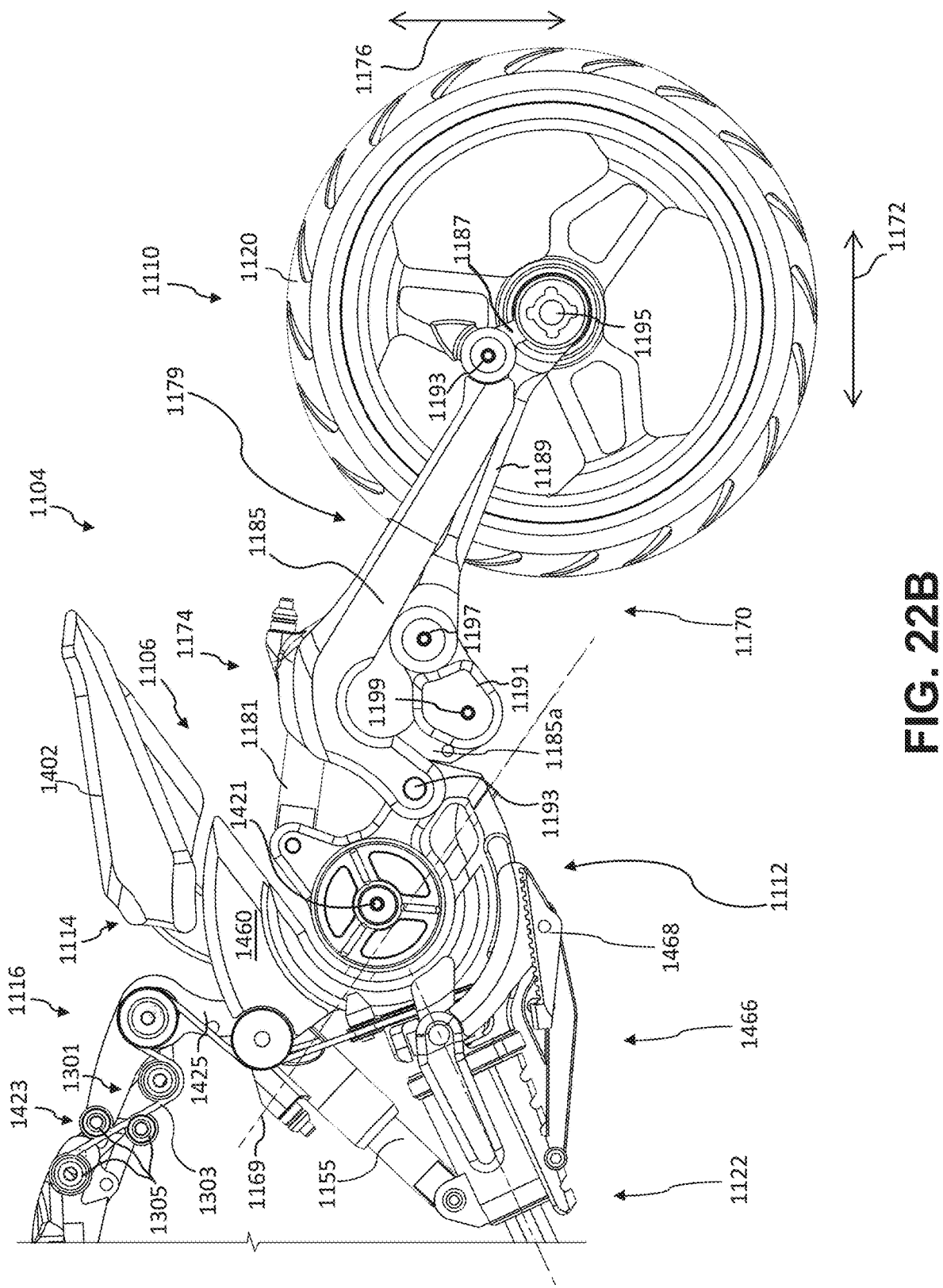
Figure 22C:
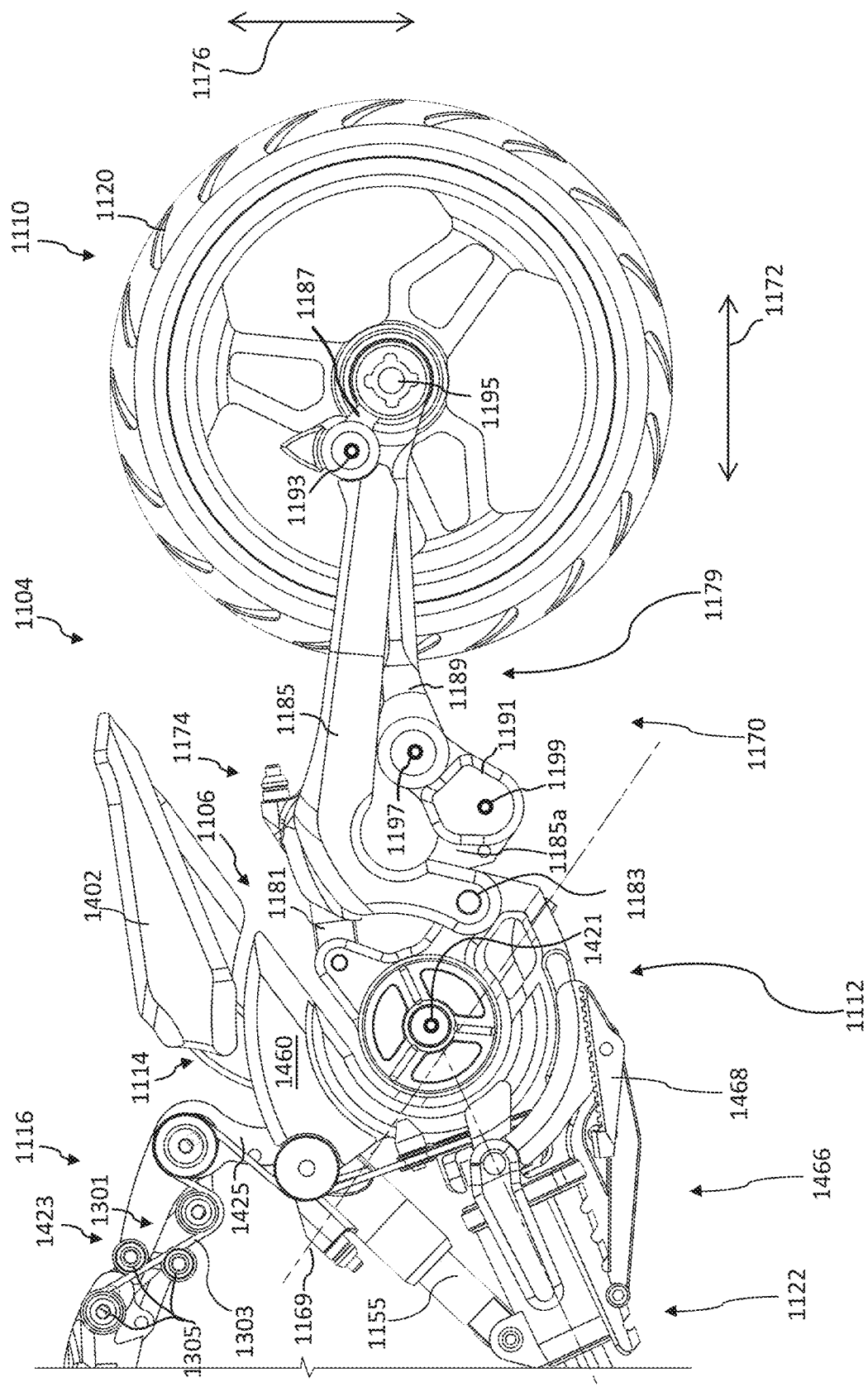
Figure 22D:
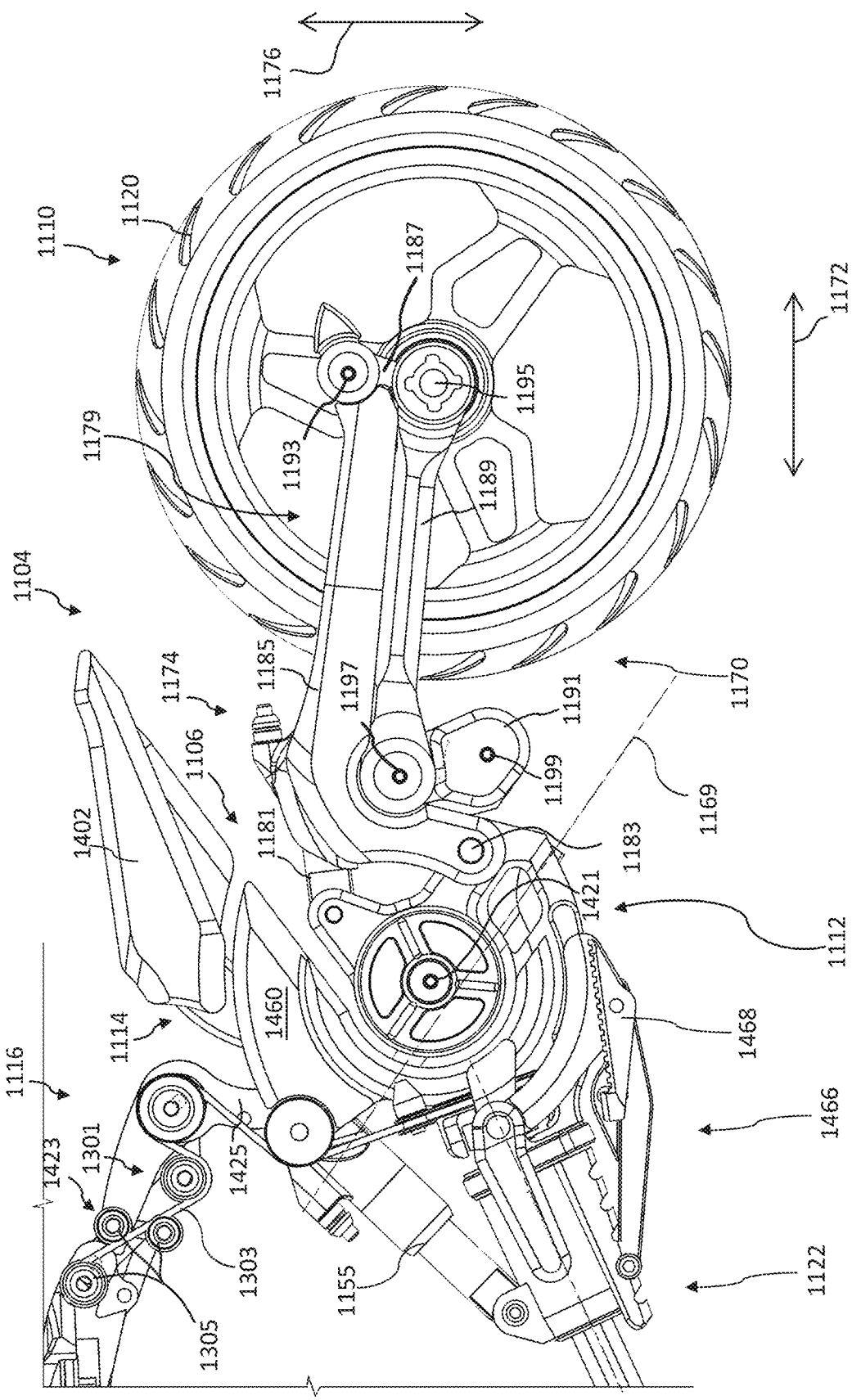

In the illustrated embodiment, second end 1136 of telescopic shock absorber 1130 is rotatable about longitudinal axis 1132 of telescopic shock absorber 1130 relative to first end 1134 of the telescopic shock absorber 1130 and main body 1106 of vehicle 1100. This configuration of telescoping shock absorber 1130 provides the first steering axis 1167 that corresponds to longitudinal axis 1132 of telescoping shock absorber 1130 (FIG. 18). As will be described in more detail hereinafter, the rotation or pivoting of second end 1136 of telescoping shock absorber 1130 causes front suspended assembly 1109 to rotate or pivot about first steering axis 1167. In the illustrated embodiment of FIGS. 18-23 and 26-29, this rotation or pivoting of second end 1136 of telescoping shock absorber 1130 is controlled by a cable steering system or arrangement 1301 that includes a steering cable 1303 and a plurality of pulleys 1305 (FIGS. 22B-22D). However, it will be appreciated that the rotation and pivoting of second end 1136 may be controlled by any suitable and readily providable steering assembly. This may include, but is not limited to a hydraulic steering assembly, a pneumatic steering assembly, other forms of cable steering assemblies, a rack and pinion steering assembly, or a mechanical push rod steering assembly.

Depending upon the specific requirements of a particular application, the first front suspension arrangement 1122, and therefore the range of motion of the first front suspension arrangement 1122 along the first path 1124, may be oriented in any desired orientation relative to the vehicle 1100. For example, first front suspension arrangement 1122 and first front path 1124 may be primarily horizontal and parallel with the normal straight-ahead direction of travel of vehicle 1100. However, as best illustrated in FIG. 18, first front suspension arrangement 1122 and first front path 1124 may be oriented at a slight angle from horizontal. For example, this angle may be in the range of about zero to thirty degrees (0°-30°) from horizontal. Setting this angle to a particular angle for a specific application may allow the overall suspension system to be tuned to provide a desired set of operating characteristics for the specific application.

In a similar manner, the specific configuration of second front suspension arrangement 1127 determines the relative shape and orientation of the range of motion of front suspended assembly 1109 along second path 1128. In the embodiment described above, second path 1128 is a linear curved path relative to the position of second front suspension arrangement 1127. Again, it should be understood that the specific configuration of second front suspension arrangement 1127 may be arranged to provide desired suspension characteristics. This ability to design the configuration of the suspension system to provide desired suspension characteristics again allows the overall suspension system to be tuned to provide a specific set of operating characteristics for a specific application.

As mentioned above, the combination of the ability of second front suspension arrangement 1127 to move through a range of motion along second path 1128 and first front suspension arrangement 1122 to move through a range of motion along first front path 1124 allows front suspended assembly 1109 to move through a variable path. In accordance with aspects of this disclosure, this variable path suspension system may be used to allow the suspension system to respond to a wide variety of obstacles or terrain while providing improved stability and control of the vehicle.

As also mentioned above, the combination of the range of motion of first front suspension arrangement 1122 and the range of motion of second front suspension arrangement 1127 provide an overall range of motion for the front suspended assembly 1109 relative to the main body 1106 that is defined by a surface area when the vehicle is traveling in the normal straight-ahead direction. However, it should be understood that the addition of a second steering axis, such as second steering axis 1169 as referenced above for telescoping shock absorber 1130, introduces another degree of freedom for an overall suspension system such as front suspension system 1102. This means that front suspension system 1102 still provides a range of motion for the front suspended assembly 1109 relative to the main body 1106 that is defined by a surface area when the vehicle is traveling in the normal straight-ahead direction. However, this configuration with a second steering axis also allows an overall range of motion for front suspended assembly 1109 relative to main body 1106 that is defined by a volume rather than a surface area when the range of motion associated with the pivoting of the second steering axis is included in the overall range of motion of the suspended assembly relative to the main vehicle body.

Referring now to FIGS. 18 and 19, a second embodiment of a suspension system in accordance with aspects of this disclosure will be described in more detail with reference to rear suspension system 1104. In a manner similar to that described above for front suspension system 1102, suspension system 1104 includes a first rear suspension arrangement 1170 that movably connects a rear suspended assembly 1110 (which in this example includes rear wheel 1120) to hub 1112 of main vehicle body 1106. First rear suspension arrangement 1170 controls movement of rear suspended assembly 1110 relative to main vehicle body 1106 through a range of motion along a first rear path 1172 that is primarily perpendicular to the lateral direction when the vehicle is traveling in the normal straight-ahead direction (FIG. 1). This allows rear suspension system 1104 to support main body 1106 of vehicle 1100 while also providing lateral stability to the vehicle. In this example, first rear path 1172 is primarily horizontal and parallel with the normal straight-ahead direction of travel of the vehicle.

Rear suspension system 1104 also includes a second rear suspension arrangement 1174 that controls movement of rear suspended assembly 1110 relative to main vehicle body 1106 through a range of motion along a second rear path 1176 that is also primarily perpendicular to the lateral direction when vehicle 1100 is traveling in the normal straight-ahead direction. This again allows rear suspension system 1104 to support main body 1106 of vehicle 1100 while also providing lateral stability to the vehicle. In this example, second rear path 1176 is primarily vertical and perpendicular to the normal straight-ahead direction of travel of the vehicle.

In accordance with aspects of this disclosure, second rear path 1176 of second rear suspension arrangement 1174 is different than first rear path 1172 of first rear suspension arrangement 1170. With this configuration, rear suspension system 1104 may use the combination of the range of motion of first rear suspension arrangement 1170 along first rear path 1172 and the range of motion of second rear suspension arrangement 1174 along second rear path 1176 to provide a combined range of motion for rear suspended assembly 1110 relative to main body 1106 that is defined by a surface area. In the embodiment being described, this surface area is defined by a planar surface area. As mentioned above and in accordance with aspects of this disclosure, this configuration allows rear suspended assembly 1110 to move through a variable path relative to main vehicle body 1106 in response to obstacles. This variable path suspension system may be used to allow the suspension system to respond to a wide variety of obstacles or terrain while providing improved stability and control of the vehicle.

Although first rear path 1172 associated with first rear suspension arrangement 1170 has been described as being primarily horizontal and second rear path 1176 associated with second rear suspension arrangement 1174 has been described as being primarily vertical, this is not a requirement. Instead, as mentioned above for front suspension system 1102, the suspension arrangements may be oriented in any desired manner such that the paths defined by the range of motion associated with the suspension arrangements are oriented at any desired orientation or angle relative to the direction of travel of the vehicle. It should be understood that any of these configurations remain within the scope of the invention.

As illustrated best in FIGS. 22A-22D, suspension system 1104 includes an articulated linkage 1179 that connects rear suspended assembly 1110 to hub 1112 of main vehicle body 1106. In this embodiment, second rear suspension arrangement 1174 includes a biasing and dampening arrangement in the form of a shock absorber 1181 connected between hub 1112 of main vehicle body 1106 and articulated linkage 1179 to control movement of rear suspended assembly 1110 relative to main vehicle body 1106 through the range of motion along second rear path 1176. While the biasing and dampening arrangement of second rear suspension arrangement 1174 is described as a shock absorber 1181, it will be appreciated that this is not a requirement. Instead, any suitable and readily providable biasing and dampening arrangement may be used. This includes various spring arrangements with separate dampeners, compressible foam or polymer mounts, torsion bars with dampeners, or any other suitable and readily providable biasing and dampening arrangement.

In the case of rear suspension system 1104, as best shown in FIGS. 22A-22D, articulated linkage 1179 includes a first link in the form of an upper swing arm 1185, a second link 1187, a third link 1189 (later described as a drive link), and a fourth link 1191 (later described as an articulating drive transmitting link). As best shown in FIGS. 22B and 22C, the upper swing arm 1185 includes a fixed swing arm extension 1185a positioned proximate the forward portion of the swing arm 1185 and the extension 1185a moves with the swing arm 1185 as it moves relative to the main vehicle body 1106.

Each of the links of the articulated linkage 1179 has a first and a second spaced apart pivot point and the swing arm extension 1185a includes a single pivot point at a distal end of the extension 1185a (FIGS. 22A-22D). In this embodiment, articulated linkage 1179 connects rear suspended assembly 1110 directly to hub 1112 of main vehicle body 1106. The first pivot point of first link/swing arm 1185 is pivotally connected to hub 1112 of main vehicle body 1106 at a first articulated linkage or first swing arm pivot point 1183. The second pivot point of first link 1185 is pivotally connected to the first pivot point of second link 1187 at a second articulated linkage or second swing arm pivot point 1193. The second pivot point of second link 1187 and the first pivot point of third link/drive link 1189 are pivotally connected to one another at a third articulated linkage pivot point 1195. The second pivot point of third link 1189 is pivotally connected to the first pivot point of fourth link 1191 at a fourth articulated linkage pivot point 1197. The second pivot point of fourth link 1191 is pivotally connected to swing arm extension 1185a at a fifth articulated linkage pivot point 1199. The swing arm extension 1185a is fixed to a lower portion of the swing arm 1185 proximate to but spaced apart from the swing arm pivot point 1183 such that the extension 1185a moves when the swing arm 1185 moves (FIGS. 22B and 22C). And finally, in this embodiment, rear wheel 1120 of rear suspended assembly 1110 is rotatably connected to articulated linkage 1179 at third articulated linkage pivot point 1195 (FIGS. 22A-22D).

In similar fashion to that of first rear suspension arrangement 170 of vehicle 100 described above, first rear suspension arrangement 1170 may include a biasing and dampening arrangement to control the movement of rear suspended assembly 1110 relative to main vehicle body 1106 through the range of motion along first rear path 1172 when second rear suspension arrangement 1174 is held in place. For example, a pull shock type biasing and dampening device may be provided between the articulating drive transmitting link 1191 and the swing arm 1185 in order to bias or pull the drive transmitting link 1191 back toward the swing arm 1185 when the articulated linkage 1179 is articulated/extended and the drive transmitting link 1191 is extended away from (see FIGS. 22B and 22C) its initial configuration (see FIGS. 22A and 22D). In similar fashion to that of second rear suspension arrangement 174 of vehicle 100 described above, and as best shown in FIGS. 22A-22D, second rear suspension arrangement 1174 includes a biasing and dampening arrangement in the form of a shock absorber 1181 connected between hub 1112 of main vehicle body 1106 and the swing arm 1185 of articulated linkage 1179. Shock absorber 1181 controls the movement of rear suspended assembly 1110 relative to main vehicle body 1106 through the range of motion along second rear path 1176 when first rear suspension arrangement 1170 is held in place.

The above described suspension system configurations provide variable path suspension systems that may be used in vehicles such as bicycles, motorcycles, automobiles, off-road vehicles, or any other desired vehicle. In accordance with aspects of this disclosure, these variable path suspension systems utilize multiple suspension arrangements to allow a suspended assembly such as a wheel, tread, ski, skid, float, or any other desired suspended assembly to move along a variable path relative to the rest of the vehicle. The use of this variable path suspension system allows the suspension system to respond to a wide variety of obstacles or terrain while providing improved stability and control of the vehicle.

Referring back to FIG. 18, the action of front suspension system 1102 will be described in more detail to illustrate the capabilities of suspension systems designed in accordance with this disclosure. When front wheel 1118 initially strikes an obstacle such as a large rock, the initial reaction is that the force of the impact will tend to stop the forward progress of wheel 1118. The momentum of the bicycle will cause telescoping shock absorber 1130 of first front suspension arrangement 1122 to compress. This is because shock absorber 1130 of first front suspension arrangement 1122 is the suspension arrangement that provides the range of motion in the horizontal direction in this embodiment. This compression of telescoping shock absorber 1130 allows some time for second front suspension arrangement 1127 to react to the obstacle by allowing front wheel 1118 to move up vertically so that it can proceed over the obstacle. At this point, both suspension arrangements 1122 and 1127 are heavily loaded, in similar fashion to that shown in FIG. 2 for vehicle 100. However, because front suspension system 1102 allows front wheel 1118 to move both horizontally and vertically relative to the main body 1106 of the motorcycle, the force of the impact with the obstacle is spread out over a much longer time than would be the case with a conventional suspension system. This very significantly reduces the intensity of the impact.

As front wheel 1118 rides up the obstacle, the heavy loading of telescoping shock absorber 1130 of first front suspension arrangement 1122 begins to push wheel 1118 forward over the obstacle. This allows front wheel 1118 to crawl over the obstacle as first front suspension arrangement 1122 unloads and moves back to its original position (see FIG. 18). The heavy loading of second front suspension arrangement 1127 then pushes front wheel 1118 back down as the front wheel 1118 clears the obstacle. This allows second front suspension arrangement 1127 to unload and move back to its original position (see FIG. 18).

In accordance with aspects of this disclosure, the suspension path that is described above and that the suspended assembly travels relative to the main body of the vehicle is a variable path. In other words, the path that the suspended assembly follows during the loading of the suspension arrangements is very different than the path that the suspended assembly follows during the unloading of the suspension arrangements. In the example described above, the suspended assembly initially moves primarily back horizontally, then primarily up vertically, then primarily forward horizontally, and finally primarily down vertically. This ability to travel through a wide variety of variable paths allows this type of variable path suspension to respond to a wide variety of obstacles or terrain while providing improved stability and control of the vehicle.

The variable path suspension systems described herein allow a suspended assembly to move through a range of motion that provides time for the suspension system to react to obstacles it encounters. This reaction time significantly reduces the impact forces associated with encountering the obstacle. This in turn reduces the stresses placed on the vehicle and may provide a smoother ride compared to conventional suspension systems. This may also allow the variable path suspension systems described herein to keep a suspended assembly in better contact with the surface supporting the vehicle compared to conventional suspension systems. This may provide improved handling and safety for the vehicle.

Similar to vehicle 100 and its arrangements, components, and functionalities, it will be appreciated that while vehicle 1100 is described herein as two wheeled, it should be understood that this is not a requirement, and vehicle 1100 may be a tricycle or a quadracycle and still remain within the scope of the invention. Furthermore, while vehicle 1100 is described as a motorcycle (i.e. motor driven vehicle), it may also be a human powered vehicle using a pedal and crank assembly to rotationally drive the rear wheel. The motor drive system of vehicle 1100 will be described in further detail below. Alternatively, vehicle 1100 may be a hybrid vehicle utilizing both human power and a motor to drive the rear wheel. The vehicle 1100 may also be configured with all-wheel drive, in which each of the wheels are powered either by a human, a motor, or both.

In some situations, the variable path suspension system described herein may act as a safety system to a degree, by absorbing some of the impact associated with a collision. For example, if vehicle 1100 collides with an obstacle that front wheel 1118 is not able to pass over, telescoping shock absorber 1130 of first front suspension arrangement 1122 would act as an impact reduction system by compressing along the primarily horizontal direction along first front path 1124. This relative motion between front wheel 1118 and main vehicle body 1106 provides some time for the rider and the vehicle to react to the impact and may significantly reduce the impact forces that are transferred to the rider.

Vehicle 1100 may include a suspension adjusting system, similar to suspension adjusting system 202 described above for vehicle 100 and illustrated in FIG. 5. The suspension adjusting system provides for adjusting the suspension action of suspension systems 1102 and 1104.

Vehicle 1100 may include a drive motor and a drive transmission arrangement, similar to drive transmission arrangement 212 described above for vehicle 100 and illustrated in FIGS. 4, 6, and 7. For example, an electric drive motor 1201 may be located within the main vehicle body 1106 near the hub 1112 and a drive transmission arrangement may be provided to transfer torque generated by the motor 1201 to the rear wheel 1120 through a series of drive members or elements (e.g. shaft drives, chains, belts, or the like). The torque transfers occur at various pivot points of the articulated linkage 1179, including pivot points 1183, 1195, 1197, and 1199. As such, the drive transmission arrangement for vehicle 1100 functions in similar or substantially identical fashion to drive transmission arrangement 212 of vehicle 100, with significant differences described herein. By utilizing pivot points 1183, 1195, 1197, and 1199 as torque transfer locations, the articulated linkage 1179 is permitted to articulate substantially freely without being significantly constrained by the drive transmission arrangement.

The arrangement of pivot point torque transfers enables the weight of the motor to be centralized within the main vehicle body 1106. This centralized motor positioning may reduce the amount of unsprung weight experienced at the rear wheel 1120 of the vehicle 1100, such as may be experienced with wheel hub motors and the like. The centralized position of motor 1201 is also beneficial in providing for a balanced feel while operating the vehicle 1100 and optimizing the center of gravity of the vehicle 1100, while also optimizing turning capabilities as compared to traditional all wheel steering systems. Optionally, if unsprung weight is not a concern and/or if additional power is desired to drive the vehicle 1100, a hub motor may be coupled to the wheel hub of the rear wheel 1120 and/or the front wheel 1118 in order to propel the vehicle 1100. Hub motors may be used in combination with a vehicle body mounted motor and drive transmission arrangement or as an alternative to the vehicle body mounted motor and drive transmission arrangement. If only hub motors are utilized, the drive transmission arrangement may be omitted without significantly affecting the function of the vehicle 1100.

In exemplary embodiments utilizing a drive transmission arrangement, a shifting arrangement may be provided with the drive transmission arrangement, such as similar to shifting arrangement 228 of vehicle 100 described above. For example, a shifting arrangement may be positioned inside of the articulating drive transmitting link 1191. It will be appreciated that in an embodiment utilizing an electric drive motor there may not be a need for a shifting arrangement as the torque output is controlled based on the electrical output supplied from the battery to the motor. On the other hand, combustion engine embodiments and human powered embodiments may benefit from a shifting arrangement. In embodiments utilizing an electric motor and without a shifting arrangement, the drive transmission arrangement may be provided with planetary gears in communication with one or more of the drive members in order to reduce the RPMs output at the output shaft of the electric motor, thereby increasing the torque output to the rear wheel 1120.

A drive transmission arrangement may be provided for vehicle 1100, such as a rotational drive transmission arrangement 1212 (FIGS. 23A-23B) which utilizes the same pivot point torque transfer principles as rotational drive transmission arrangement 212 of vehicle 100, as described above and illustrated in FIG. 6. The rotational drive transmission arrangement 1212 for vehicle 1100 includes a drive transmitting articulated linkage 1214 that makes up a portion of articulated linkage 1179 of rear suspension system 1104. Drive transmitting articulated linkage 1214 includes a plurality of rotational drive transmitting links that each have a first and a second spaced apart hinge point. Accordingly, drive transmitting articulated linkage 1214 includes a first rotational drive transmitting link provided between pivot points 1183 and 1199 of articulated linkage 1179 (the first rotational drive transmitting link may be disposed inside an interior of swing arm extension 1185a or disposed alongside the extension 1185a), a second rotational drive transmitting link provided by articulating drive transmission link 1191 of articulated linkage 1179, and a third rotational drive transmitting link provided by third link 1189 of articulated linkage 1179.

The first and second spaced apart hinge points of the first, second, and third rotational drive transmitting links each have an associated axis of rotation that provides a pivot point for drive transmitting articulated linkage 1214. In this case, the first hinge point and associated axis of rotation for the first rotational drive transmitting link 1185a is located at pivot point 1183 of articulated linkage 1179. The second hinge point and associated axis of rotation for the first rotational drive transmitting link 1185a is located at pivot point 1199 of articulated linkage 1179. The first hinge point and associated axis of rotation for the second rotational drive transmitting link 1191 is also located at pivot point 1199 of articulated linkage 1179 where link 1191 is pivotally connected to swing arm extension 1185a. The second hinge point and associated axis of rotation for the second rotational drive transmitting link 1191 is located at pivot point 1197 of articulated linkage 1179. The first hinge point and associated axis of rotation for the third rotational drive transmitting link 1189 is also located at pivot point 1197 of articulated linkage 1179 where third link 1189 is pivotally connected to link 1191. And finally, the second hinge point and associated axis of rotation for third rotational drive transmitting link 1189 is located at pivot point 1195 of articulated linkage 1179, where third link 1189 is coupled to the rear wheel 1120.

In accordance with aspects of this disclosure, each rotational drive transmitting link of articulated linkage 1179 includes a driven member, a drive member, and a drive mechanism that allows the driven member to drive the drive member of the rotational drive transmitting link. For illustrative purposes, the rotational drive transmitting links of vehicle 1100 and articulated linkage 1179 are illustrated as dashed lines in FIGS. 23A and 23B. However, it will be appreciated that in many embodiments, as described previously for vehicle 100, an enclosed space within the respective components of the articulated linkage 1179 may house the associated drive member, driven member, and drive mechanism of each rotational drive transmitting link (see rotational drive transmission arrangement 212 of FIG. 6 and the geared shaft drive that is housed within second link 186 for the rotational drive mechanism 226 of FIG. 7).

In this example for vehicle 1100, first rotational drive transmitting link 1185a includes a driven member that is supported and rotates about the axis of the first hinge point of first rotational drive transmitting link 1185a at pivot point 1183 of drive transmitting articulated linkage 1214. Second rotational drive transmitting link 1191 also includes a driven member that is supported and rotates about the axis of the first hinge point of rotational drive transmitting link 1191 at axis or pivot point 1199 of drive transmitting articulated linkage 1214. Third rotational drive transmitting link 1189 also includes a driven member that is supported and rotates about the axis of the first hinge point of rotational drive transmitting link 1189 at axis or pivot point 1197 of drive transmitting articulated linkage 1214. First rotational drive transmitting link 1185a further includes a drive member which is supported and rotates about the axis of the second hinge point of rotational drive transmitting link 1185a at pivot point 1191 of drive transmitting articulated linkage 1214. Second rotational drive transmitting link 1191 further includes a drive member that is supported and rotates about the axis of the second hinge point of rotational drive transmitting link 1191 at pivot point 1197 of drive transmitting articulated linkage 1214. And, third rotational drive transmitting link 1189 further includes a drive member that is supported and rotates about the axis of the second hinge point of rotational drive transmitting link 1189 at pivot point 1195 of drive transmitting articulated linkage 1214. In the exemplary embodiment of FIGS. 23A-23B, the driven member of one of the rotational drive transmitting links and the drive member of an adjacent rotational drive transmitting link are coupled together such that the driven member drives the accompanying drive member.

For example, each rotational drive transmitting link may include a torque transfer arrangement, in the form of a sprocket assembly coupled between two drive chains (i.e. driven members as described further below), for transmitting rotational movement from the driven member of one rotational drive transmitting link to the drive member of an adjacent rotational drive transmitting link. For another example, a torque transfer sprocket assembly may include a first side sprocket (i.e. driven member) connected with a drive chain 1224 (i.e. drive mechanism) of the first rotational drive transmitting link 1185a and a second side sprocket (i.e. drive member) connected with a drive chain 1226 of the second rotational drive transmitting link 1191. In this example, as the drive chain 1224 of the first rotational drive transmitting link 1185a is driven by an upstream motor or other drive transmitting link, the first side sprocket is rotated by the drive chain 1224 of transmitting link 1185a, thereby rotating the torque transfer sprocket assembly and second side sprocket. The second side sprocket thereby drives the drive chain 1226 of the second rotational drive transmitting link 1191.

Referring to the drive transmitting articulated linkage 1214 of vehicle 1100 and the articulating linkage 1179, the link at swing arm extension 1185a includes a rotational drive mechanism 1224, fourth link 1191 includes a rotational drive mechanism 1226, and third link 1189 includes a rotational drive mechanism 1227. While rotational drive mechanisms 1224, 1226, and 1227 are illustrated are endless loop drive members (i.e. chains and belts), it will be appreciated that the rotational drive mechanisms may be any suitable and readily providable drive mechanism such as a shaft drive, a gear drive, or any other drive mechanism.

Figure 23A:
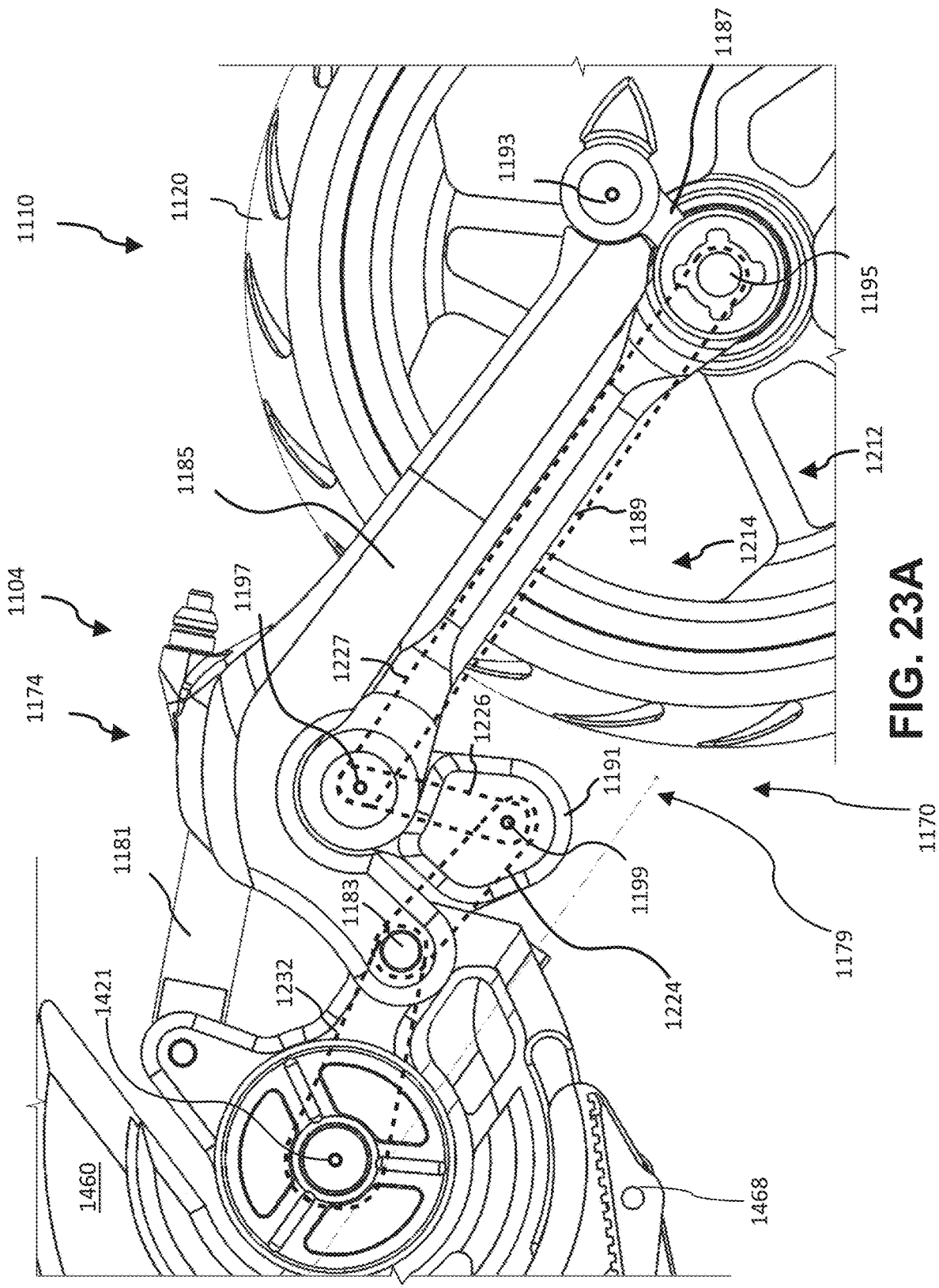
FIG. 23A is an enlarged side view of the rear suspension system of FIG. 22A and a rotational drive transmission in accordance with aspects of the present invention, depicted with the rear suspension system in a neutral position.
Figure 23B:
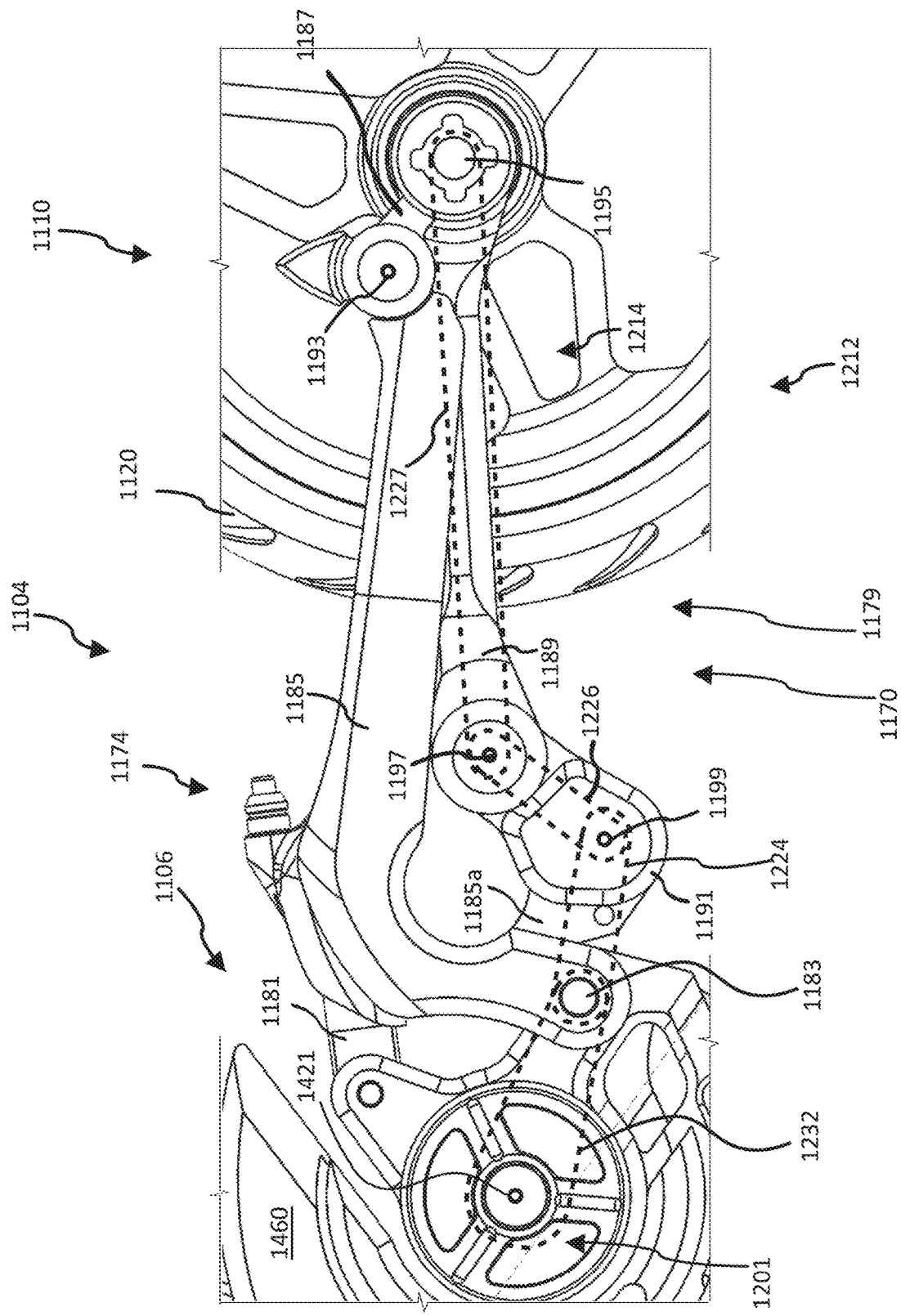
FIG. 23B is an enlarged side view of the rear suspension system of FIG. 22C and the rotational drive transmission, depicted with the rear suspension system in an upward and rearward position.

In the illustrated embodiments of FIGS. 23A and 23B, a rotational drive mechanism 1232 is provided between the motor 1201 and the swing arm pivot point 1183 in order to transmit torque from the motor 1201 to the drive transmitting articulated linkage 1214. As previously noted, it will be appreciated that vehicle 1100 may be powered by a human operated crank system, and as such, the crank system may be coupled to the drive transmitting articulated linkage 1214 via a rotational drive mechanism, similar to that described above for crank assembly 210 and drive member 216 of vehicle 100 (FIG. 6). It will be appreciated that in other contemplated embodiments the drive mechanisms 1224 and 1232 may be omitted, and a single drive mechanism (i.e. chain, belt, shaft, etc.) may be provided between the motor 1201 and pivot point 1199 of drive transmitting articulated linkage 1214, bypassing the swing arm pivot point 1183 and thus reducing the number of drive mechanisms required to transmit power form the motor to the rear wheel 1120. In such an embodiment, it may be advantageous to provide a drive mechanism guide or tensioner to maintain generally consistent tension in the drive mechanism as the swing arm 1185 and extension 1185a rotate relative to the main vehicle body 1106 and the motor 1201.

Figure 24:
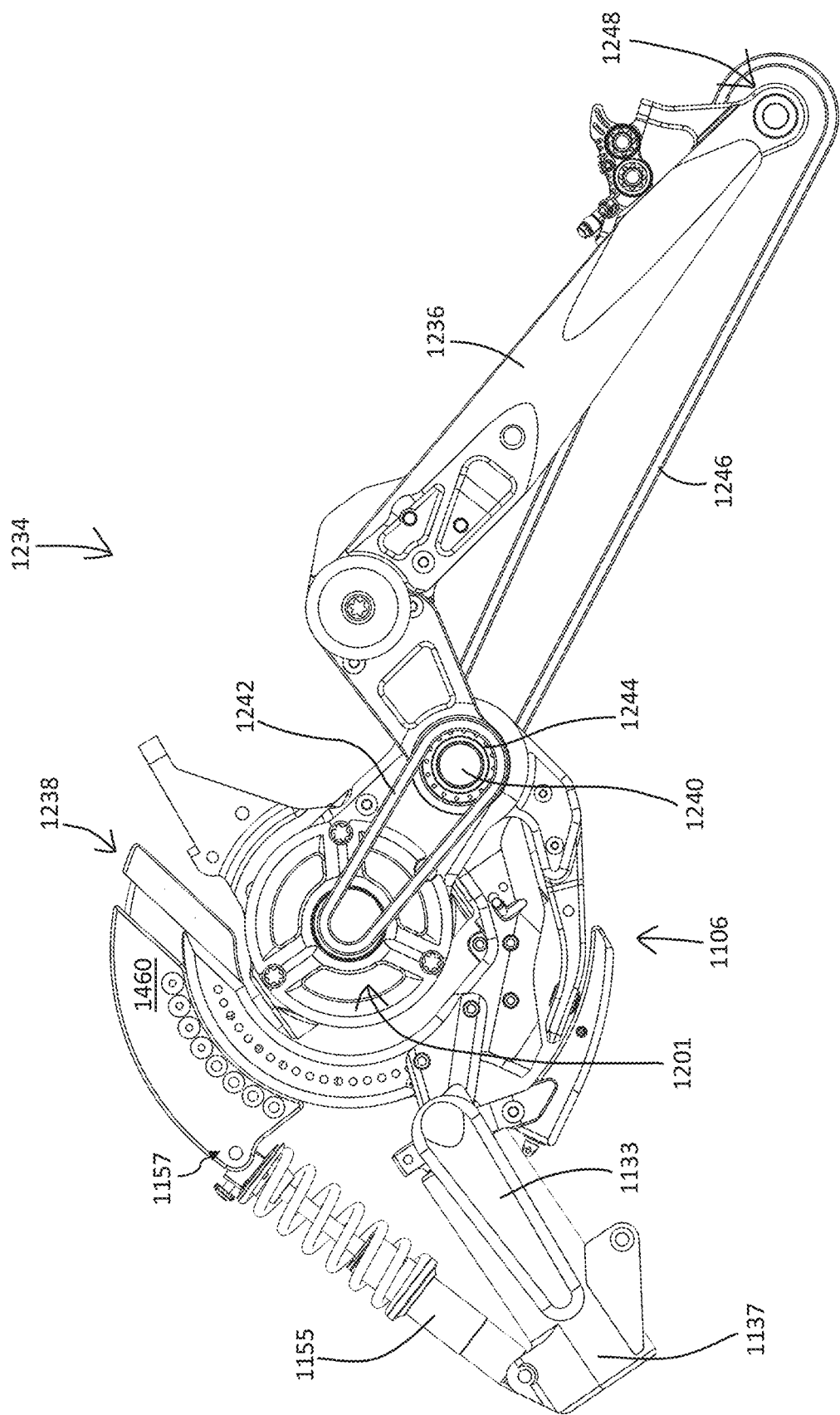
FIG. 24 is a side elevation view of a non-articulating rear suspension system and a rotational drive transmission for a motorcycle in accordance with aspects of the present invention, depicted with the rear suspension system in a neutral position.
Figure 25:
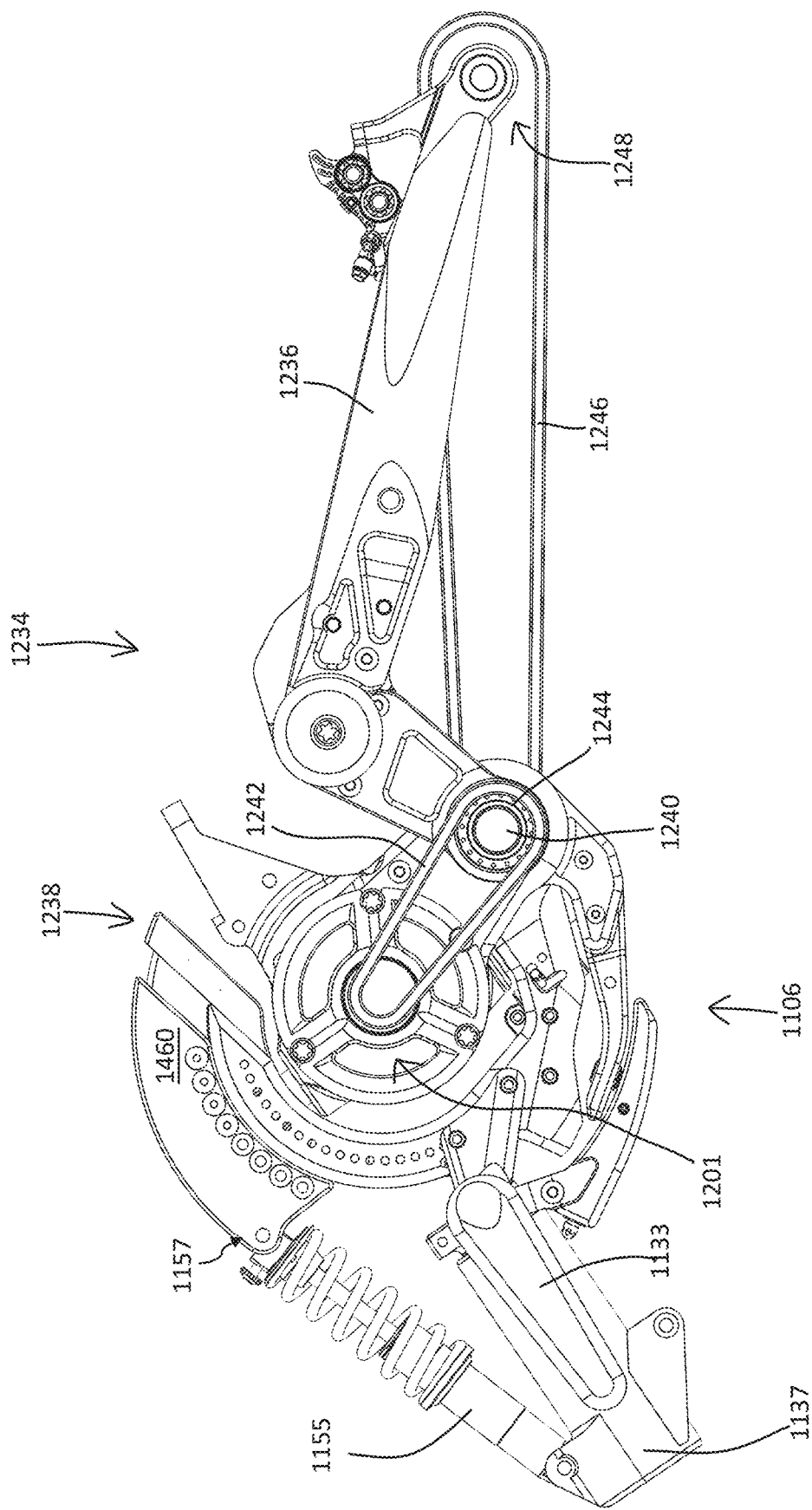
FIG. 25 is another side elevation view of the non-articulating rear suspension system and a rotational drive transmission of FIG. 24, depicted with the rear suspension in a upward position.

Another exemplary embodiment for a rotational drive transmission arrangement 1234 for a non-articulating swing arm 1236 is illustrated in FIGS. 24-25. Rotational drive transmission arrangement 1234 utilizes similar structures and principle functions of the rotational drive transmission arrangement 212 of vehicle 100 and rotational drive transmission arrangement 1212 of vehicle 1100, including pivot point torque transfer principles. The rotational drive transmission arrangement 1234 is depicted with a main vehicle body 1238 and the non-articulating swing arm 1236 in order to illustrate how the rotational drive transmission arrangement 1234 transfers torque from a motor 1201 to the rear wheel 1120 via the first pivot point 1240 of the swing arm 1236. A first drive member, such as in the form of a belt 1242, is provided between an output shaft of the motor 1201 and a torque transfer arrangement 1244 at the first swing arm pivot point 1240. A second drive member, such as in the form of a belt 1246, is provided between the torque transfer gear 1244 and the wheel hub 1248. In the illustrated embodiment of FIGS. 24 and 25, the torque transfer arrangement 1244 provides a driven member which is driven by the first belt 1242 and a drive member which drives the second belt 1246. Thus, torque output from the motor 1201 is transferred via first belt 1242 to the driven member of the torque transfer arrangement 1244, then to the second belt 1246 via the drive member of the torque transfer arrangement 1244, and finally to the wheel hub 1248 in order to drive the rear wheel 1120. While the first and second drive members illustrated in FIGS. 24 and 25 are depicted as belts, it will be appreciated that any suitable drive element may be utilized, including shaft drives and chains.

Referring to FIGS. 18-19, 22, and 26-27, an embodiment of a position adjusting assembly 1401 designed in accordance with aspects of the present disclosure will be described with reference to vehicle 1100. As mentioned above, vehicle 1100 includes seat support 1114, handle bar support 1116, rear wheel 1120, steerable front wheel 1118, steering arrangement 1301, and hub 1112 for interconnecting components of vehicle 1100. Steering arrangement 1301 includes handle bar 1309 for allowing the rider to control steerable front wheel 1118. Seat support 1114 includes a seat 1402 for supporting the rider. In this embodiment, seat support 1114 is an adjustable seat support arrangement slideably and/or pivotally connected to an upper portion of the hub 1112 and handle bar support 1116 is an adjustable handle bar support arrangement slideably and/or pivotally connected to hub 1112. Position adjusting assembly 1401 may further include a releasable position lock or locking arrangement that is releasable by the rider when the rider is riding vehicle 1100. The position locking arrangement is configured to lock the relative positions of hub 1112, adjustable seat support 1114, and adjustable handle bar support 1116 when the position locking arrangement is not released by the rider. The above described configuration of position adjusting assembly 1401 allows a rider to adjust the position of the handle bar support 1116 and/or seat support 1114 relative to the rest of vehicle 1100 by releasing the position locking arrangement.

The hub 1112 provides for many of the functions of position adjusting assembly 1401 as well as providing for the second steering axis 1169. In the illustrated embodiments of FIGS. 18-23 and 26-29, the hub 1112 includes a second axis steering arrangement or assembly in the form of an orbital steering arrangement 1434 which provides for the interconnection of the components of vehicle 1100 with the main vehicle body 1106 while also enabling the vehicle 1100 to be steerable about the second steering axis 1169 without substantially inhibiting any of the functionality and adjustability of the components of vehicle 1100. As best illustrated in FIGS. 19 and 21, the orbital steering arrangement 1434 includes a front orbital assembly 1436 and a rear orbital assembly 1438. The front orbital assembly 1436 and rear orbital assembly 1438 are pivotally connected to one another at a hub axle 1440, as best shown in FIG. 20. The axis of the hub axle 1440 defines a hub orbit axis 1442 about which the orbital assemblies 1436, 1438 of the hub 1112 are orbitally pivotable. The hub orbit axis 1442 corresponds to the second steering axis 1169. The rear suspension arrangement 1104 is coupled to the rear orbital assembly 1438 (FIGS. 18-19). As described above, an electric motor 1201 may be provided with vehicle 1100 and may be positioned at an inner portion of a main body of the rear orbital assembly 1438 (FIGS. 20-21). Accordingly, because the motor 1201 pivots with the rear wheel 1120 (i.e. remains coplanar with the rear wheel) and the rear suspension arrangement 1104, vehicle 1100 provides advantages over known, complex drive transmitting articulation mechanisms commonly required to maintain power to a driven wheel as the wheel articulates to turn.

The orbital steering arrangement 1434 is provided by the orbiting of the front orbital assembly 1436 and rear orbital assembly 1438 relative to one another about the second steering axis 1169. When the vehicle is travelling in a normal straight-ahead direction, the hub 1112 is oriented in a planar or unturned manner. When the vehicle is steered or turned away from the normal straight-ahead direction of travel, the front orbital assembly 1436 and rear orbital assembly 1438 articulate relative to one another about the second steering axis 1169 such that the hub 1112 is in a turned or non-planar orientation. When the vehicle 1100 is turning and the hub 1112 is in the turned orientation the travel path of the front wheel 1118 and the rear wheel 1120 are similar or substantially identical to one another. In other words, when the hub 1112 is in the turned orientation, the rear wheel 1120 tracks along a similar or substantially identical travel path which the front wheel 1118 travelled. Thus, the orbital steering arrangement 1434, in combination with the telescopic shock absorber 1130, provides for part of the multi-axis steering system of vehicle 1100.

The hub 1112 may include a second steering axis actuation arrangement or actuator in the form of a steering actuation linkage 1315 to cause the orbital assemblies 1436, 1438 to pivot relative to one another about the second steering axis 1169 automatically when the steerable front suspended assembly 1109 rotates about the first steering axis 1167. For example, the steering linkage arrangement 1315 may include a steering actuation linkage assembly having a first link 1317 fixedly attached to a first end of the steering tube assembly 1130 and a second link 1319 that is pivotally coupled to the first link 1315 and fixedly attached to a portion of the rear orbital assembly 1438 (FIG. 21). The steering actuation linkage 1315 operates such that when the cable steering arrangement 1301 causes the inner steer tube 1139 to rotate about the first steering axis 1167, the first link 1317 is automatically rotated along with the inner steer tube 1139 and the first link 1317 urges the second link 1319 to move, thereby causing the rear orbital assembly 1438 to pivot about the second steering axis 1169 relative to the front orbital assembly 1436.

The front orbital assembly 1436 is defined by a hub pivot actuation arrangement or actuator in the form of an assembly of a pair of concentric C-shaped or arcuate frames, including an outer C-frame 1444 and an inner C-frame 1446 (FIGS. 19 and 21). The hub pivot actuator provides for the adjustment of the wheelbase length and the angle between the first steering axis 1167 and the second steering axis 1169 (see sequential change in wheelbase and steering axes angle between FIGS. 26 and 27). For illustrative purposes, as shown in FIGS. 19 and 21, the inner and outer C-frames 1444, 1446 are detached/exploded from one another. The hub 1112 may be disassembled to separate the front portion of the vehicle 1100 from the rear portion, thereby facilitating compact storage and making the vehicle 1100 more portable (FIGS. 19 and 21). The front suspension arrangement 1102 is coupled to the outer C-frame 1444 of front orbital assembly 1436, and as previously noted, the rear suspension arrangement 1104 is coupled to the rear orbital assembly 1438 (FIGS. 19 and 21). Accordingly, the front suspension arrangement 1102 and rear suspension arrangement 1104 portions of vehicle 1100 are therefore separable from one another by separating the C-frames 1444 and 1446 from one another. Optionally, the hub 1112 may be selectively separable by separating the front orbital assembly 1436 and rear orbital assembly 1438 from one another (by removal of the hub axle 1140) such that a user may dismantle and separate the forward and rearward portions of the vehicle 1100 from one another.

It will be appreciated that the hub 1112 may be considered as a two-component system, wherein the rear orbital assembly 1438 represents one component of hub 1112 and the front orbital assembly 1436 (including C-frames 1444 and 1446) represents another component of hub 1112, with the hub axle 1440 coupling the front and rear orbital assemblies 1436 and 1438 together. Alternatively, the hub 1112 may be considered in another manner as a two-component system, wherein the outer C-frame 1444 represents one component of hub 1112 and the combination of the inner C-frame 1446 and rear orbital assembly 1438 (coupled together by the hub axle 1440) represents another component of hub 1112. In another alternative, the hub 1112 may be considered in another manner as a three-component system in which each of the rear orbital assembly 1438, the outer C-frame 1444, and the inner C-frame 1446 represent the three components of the hub 1112.

The inner C-frame 1446 and outer C-frame 1444 are rotatably coupled to one another such that they may move relative to one another by pivoting around a hub arrangement actuation pivot point or axis 1421, hereinafter referred to as the hub pivot axis 1421 (FIGS. 22A-22D). The hub pivot axis 1421 is located at the concentric center of inner C-frame 1446 and outer C-frame 1444 and is perpendicular relative to the first steering axis 1167 and the normal straight-ahead direction of travel. The rotation of the C-frames 1444, 1446 relative to one another provide for selective adjustment of the wheelbase length and the angle between the first steering axis 1167 and the second steering axis 1169. For illustrative purposes, the inner C-frame 1446 and outer C-frame 1444 may be considered to operate in similar fashion to a rotary bearing in which the C-frames 1444 and 1446 are able to rotate substantially freely relative to one another. Although, it will be appreciated that unlike a typical rotary bearing, the inner and outer C-frames 1446, 1444 have a less than full range of rotation (less than 360°) relative to one another, as adjacent components of the vehicle 1100 and/or a rotation limiting arrangement provided with the front orbital frame assembly may limit the maximum relative rotation between the C-frames.

As sequentially depicted in FIGS. 26 and 27, the C-frames 1444 and 1446 rotate relative to one another in a plane that is parallel to the vehicle's upright, end-to-end centerline when the vehicle is travelling in an upright position and a normal straight-ahead direction. The pivotable/rotatable relationship between C-frames 1444 and 1446 provides a function of the position adjusting assembly 1401 in the form of vehicle ride position/height adjustment/wheelbase adjustment. As an example, the horizontal dashed lines in FIGS. 26 and 27 are positioned at the tops of the front and rear wheels, respectively, and provide a reference of how relative rotation between the C-frames 1444 and 1446 affects the ride position of the vehicle main body 1106 relative to the wheel height of the vehicle. The vehicle ride height or ride position as illustrated in FIG. 26 may represent a relaxed and upright riding position with the seat located closer to the ground, whereas the vehicle ride height or ride position as illustrated in FIG. 27 may represent a tactical or forward riding position with the seat higher above the ground. The wheelbase of vehicle 1100 in FIG. 26 is longer than the wheelbase in FIG. 27.

Further, because the rear orbital assembly 1438 is coupled to the inner C-frame 1446 and contains the hub axle 1440 of orbital steering arrangement 1434, the typical angle between the second steering axis 1169 (which corresponds with the hub orbit axis 1442 of hub axle 1440) and the first steering axis 1167 (which corresponds with axis 1132 of telescopic shock absorber 1130) is adjustable by rotating the C-frames 1444 and 1446 relative to one another. In the illustrative example of FIG. 26, the first steering axis 1167 and second steering axis 1169 have a relatively flat angle between them (hence the extended wheelbase) which facilitates increased stability at higher speeds. Conversely, in the illustrative example of FIG. 27, the first steering axis 1167 and second steering axis 1169 have a relatively steep angle between them (hence the shortened wheelbase) which facilitates increased responsiveness and maneuverability when turning and cornering.

It will be appreciated that a biasing and dampening arrangement may be provided between inner C-frame 1446 and outer C-frame 1444 to provide a suspension or shock absorbing function for the vehicle 1100. Such a biasing and dampening arrangement may include springs, shock absorbers, compressible foam or polymer mounts, or any other suitable and readily providable biasing and dampening arrangement, for example.

The outer C-frame 1444 includes a guide or raceway 1448 defining an arcuate channel formed along the inner diameter of the outer C-frame 1444 (FIG. 21). The inner C-frame 1446 includes an arcuate rail 1450 that is received in the raceway 1448. The arcuate rail 1450 includes an outer diameter that is somewhat smaller than the inner diameter of the raceway 1448. As such, the arcuate rail 1450 is dimensioned to nest inside the raceway 1450 and form a sliding clearance fit relationship with raceway 1448 such that arcuate rail 1450 is substantially freely slideable within raceway 1448. As the inner C-frame 1446 rotates relative to the outer C-frame 1444, the arcuate rail 1450 tracks or slides within the arcuate raceway 1448, and as an end of the arcuate rail 1450 approaches a respective end of the raceway 1448, the inner C-frame 1446 is prevented from rotating any further. For example, a rotation limiting arrangement may confine the arcuate rail 1450 radially within the raceway 1448 and the rotation limiting arrangement may include stop blocks at the ends of the raceway to prevent the arcuate rail 1450 from further rotation once the arcuate rail 1450 has met a stop block.

The position adjusting assembly 1401 may include a hub locking arrangement that includes a C-frame rotation locking arrangement to lock the outer and inner C-frames 1444, 1446 relative to one another. The hub locking arrangement may include an orbital locking arrangement to lock the front orbital assembly 1436 and rear orbital assembly 1438 relative to one another. The C-frame rotation locking arrangement and/or orbital locking arrangement may be any suitable and readily providable locking arrangement including a clamping arrangement, a cam lock arrangement, or any other desired locking arrangement.

Figure 30:
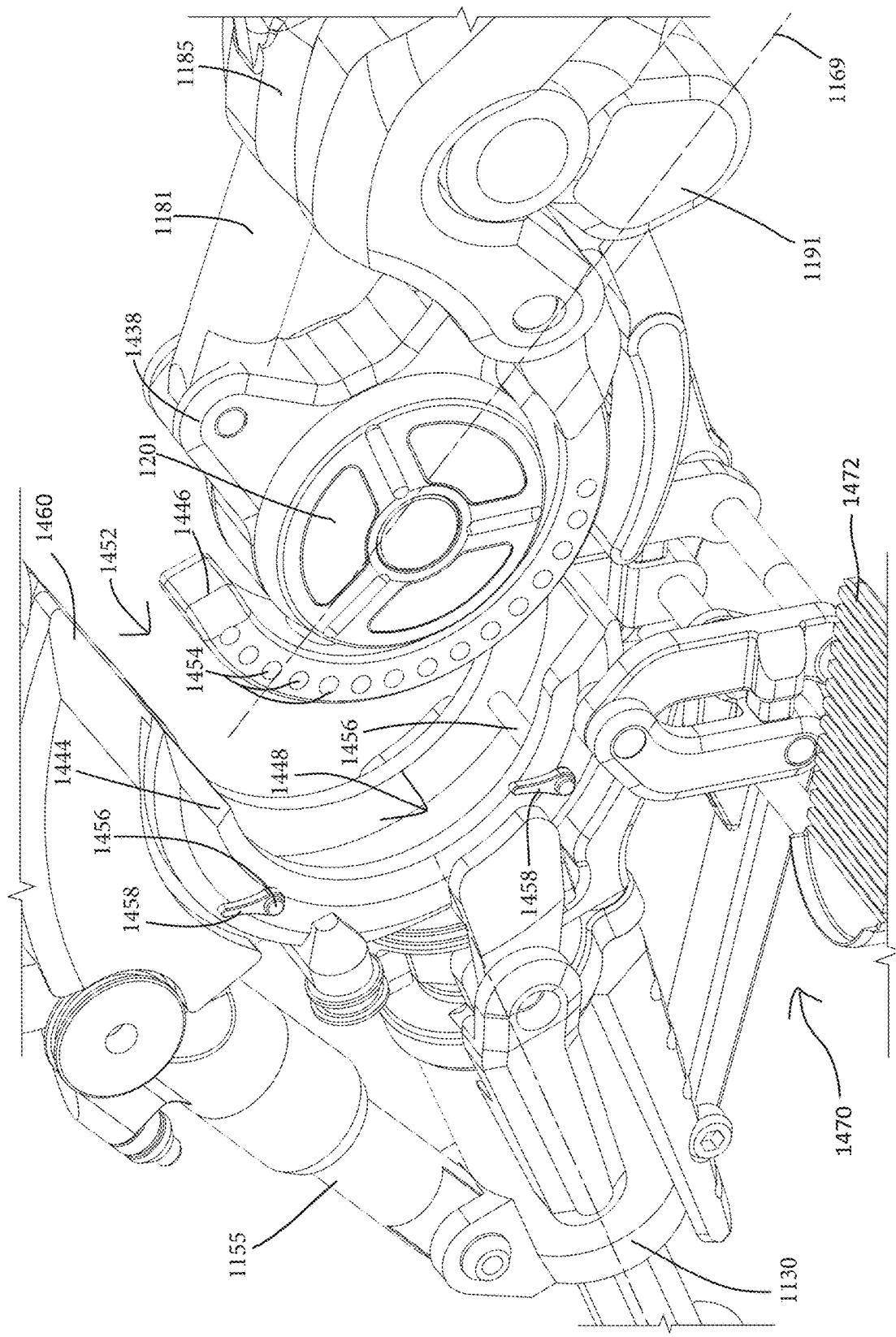
FIG. 30 is a partially exploded rear-left side perspective view of the hub portion of a motorcycle in accordance with aspects of the present invention, depicting a dowel hub locking arrangement.

For example, as shown in the illustrative embodiment of FIG. 30, an exemplary C-frame rotation locking arrangement 1452 includes an arrangement of rail holes 1454 formed axially through the sides of the arcuate rail 1450 of the inner C-frame 1446. The rotation locking arrangement 1452 includes one or more removable dowels 1456 that are each received in a dowel hole formed axially through the sides of the outer C-frame 1444 proximate the raceway 1448 such that each dowel 1456, when inserted in the outer C-frame 1444, extends through the void defined by the raceway 1448 (FIG. 30). The rail holes 1454 of arcuate rail 1450 are positioned such that when the C-frames 1444 and 1446 are coupled together, the rail holes 1454 are alignable with corresponding dowel holes in the outer C-frame 1444. When a dowel hole in outer C-frame 1444 is aligned with one of the rail holes 1454 of inner C-frame 1446, a dowel 1456 is inserted into the hole on one side of the outer C-frame, through the aligned rail hole 1454 in the arcuate rail 1450, and then through the hole on the other side of the outer C-frame 1444 to lock the C-frames 1444 and 1446 in a desired position relative to one another. The dowels 1456 each include a lever 1458 to facilitate removal of the dowel from the hub 1112. It is contemplated that the dowels 1456 may be uniform cylindrical dowels that may be secured with a retaining clip or ball plunger type retainer. Alternatively, each dowel 1456 may include a cam locking/clamping arrangement, such that as the lever 1458 is turned, the cam arrangement imparts a clamping/locking force between adjacent portion of the raceway 1458 and arcuate rail 1450.

In the illustrated embodiment of FIG. 30, when a user desires to adjust the relative positions of the C-frames 1444 and 1446, each dowel 1456 is released and removed from its respective dowel hole and rail hole 1454, then the C-frames are rotated to the desired position, and the dowels 1456 are each reinserted through an aligned dowel hole and rail hole 1454. When a user desires to separate the front portion of the vehicle 1100 from the rear portion, each dowel 1456 is released and removed from its respective dowel hole and rail hole 1454 and the front and rear portions of the vehicle 1100 may then be slid or pulled apart from one another (FIG. 30).

Although the specific embodiment of C-frame rotation locking arrangement 1452 shown in FIG. 30 has been described as a dowel arrangement, this is not required. Instead, as would be understood by one skilled in the art, other examples of potential hub locking arrangements may be provided, such as spring-loaded clamps that are normally biased into a locked position.

In some embodiments, the C-frame rotation locking arrangement 1452 and orbital locking arrangement of the hub locking arrangement may be releasable on-the-fly such that a rider may adjust the relative position of the C-frames 1444 and 1446 or the orbital assemblies 1436 and 1438 while riding and operating the vehicle 1100. For example, a position actuator such as a controllable lead screw, or hydraulic or pneumatic cylinder may be provided between the C-frames 1444 and 1446 to permit a rider to adjust the relative position of the C-frames while riding the vehicle 1100. A controller for the position actuator may be provided at the handle bars 1309 such that a rider may control the position actuator without removing their hands from the handle bars.

The outer C-frame 1444 includes an upper support arrangement 1460 to connect the seat support 1114, handle bar support 1116, and shock absorber 1155 to couple to hub 1112 (FIGS. 18, 19, and 21). The shock absorber 1155 is pivotally coupled to a forward portion of C-frame upper support arrangement 1460 at pivot point 1157. Seat support 1114 and handle bar support 1116 are each selectively, moveably coupled to C-frame upper support arrangement 1460. As best illustrated in FIG. 21, the C-frame upper support arrangement 1460 includes a slot or raceway 1462 defined by a channel formed along the upper edge of the upper support arrangement. Seat support 1114 and handle bar support 1116 are each moveably connected with raceway 1462. Seat support 1114 and handle bar support 1116 are moveable independent of one another such that the seat 1402 and handle bars 1309 may be adjusted to desired positions relative to one another and relative to the main vehicle body 1106. The seat support 1114 and/or handle bar support 1116 may be releasable on-the-fly such that a rider may adjust the arrangement's position relative to the C-frame upper support arrangement 1460 and main vehicle body 1106 while riding and operating the vehicle 1100.

In the illustrated embodiment in which the seat support 1114 of vehicle 1100 is coupled to the C-frame upper support arrangement 1460, the seat 1402 remains in-line or parallel to the center line of the telescopic shock absorber 1130 regardless of the configuration of the orbital steering arrangement 1434. In other words, if the vehicle 1100 is turned such that the front orbital assembly 1436 is not co-planar with the rear orbital assembly 1438, the seat 1402 remains in-line and coplanar with the front orbital assembly 1436 and is thus not coplanar with the rear orbital assembly 1438. However, this is not a requirement. Instead, as would be understood by one skilled in the art, embodiments are contemplated in which the seat 1402 and seat support 1114 remain in-line or parallel to the center line of the rear orbital assembly 1438 and the rear wheel 1120 regardless of the configuration of the orbital steering arrangement 1434. Further embodiments are contemplated in which the seat 1402 and/or seat support 1114 move or pivot independent of the orbital steering arrangement 1434.

In the illustrated embodiment of FIGS. 18-23B and 26-29, a rider foot support arrangement 1466 is coupled to the front suspension system 1102 and/or the front orbital assembly 1436. The foot support arrangement includes rider foot support platforms 1468 on each side of the vehicles main body 1106. In the illustrated embodiments of FIGS., the support platforms 1468 remain in-line with the center line of the telescopic shock absorber 1130 regardless of the configuration of the orbital steering arrangement 1434. In other words, the support platforms 1468 pivot with the front orbital assembly 1436 when the vehicle 1100 pivots about the hub 1112. However, this is not a requirement. Instead, as would be understood by one skilled in the art, embodiments are contemplated in which the rider support platforms 1468 remain in-line with the center line of the rear orbital assembly 1438 and the rear wheel 1120 regardless of the configuration of the orbital steering arrangement 1434. Further embodiments are contemplated in which the foot support platforms 1468 and/or rider foot support arrangement 1466 move or pivot independent of the orbital steering arrangement 1434. Another example of a rider foot support arrangement 1470 with rider foot support platforms 1472 is illustrated in FIG. 30. The rider foot support arrangement 1470 is coupled to the front suspension system 1102 and/or the front orbital assembly 1436. The support platforms 1472 pivot with the front orbital assembly 1436 when the vehicle 1100 pivots about the hub 1112.

In human powered embodiments of the vehicle 1100, the vehicle may be powered by bicycle cranks and pedals. In some crank and pedal embodiments, the cranks and pedals may be configured in such a manner that they pivot or move with the rear orbital assembly 1438 such that they remain in-line with the center line of the rear orbital assembly 1438 and the rear wheel 1120 regardless of the configuration of the orbital steering arrangement 1434. With the cranks and pedals moving with the rear orbital assembly 1438, the rotational drive transmission arrangement does not require any articulating drive transmitting members to transfer torque from the cranks to the drive transmitting articulated linkage 1214 of vehicle 1100.

In other contemplated crank and pedal embodiments of vehicle 1100, the cranks and pedals may pivot or move with the front orbital assembly 1436 such that they remain in-line with the center line of the telescopic shock absorber 1130 regardless of the configuration of the orbital steering arrangement 1434. With the cranks and pedals moving with the front orbital assembly 1436, the rotational drive transmission arrangement may include articulating drive transmitting members (e.g. a universal joint) to transfer torque from the cranks to the drive transmitting articulated linkage 1214 of vehicle 1100. It is also contemplated that an electronic drive transmitting member may be provided to capture power generated at the cranks and transfer the power to the drive wheel(s). For example, a generator or alternator may be coupled to the cranks to capture the power output from the rider and then transfer the power from the alternator to an electric motor positioned at the drive wheel(s).

Figure 29:
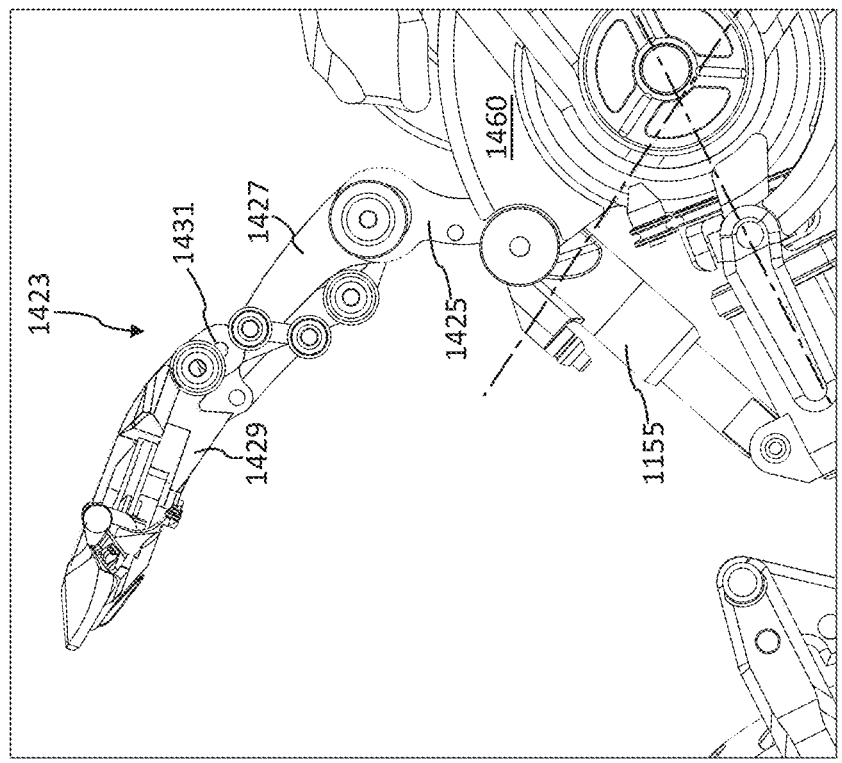
FIGS. 28-29 are sequential partial left side views of the motorcycle of FIG. 18, depicting two possible positions of a cable steering system.
Figure 28:
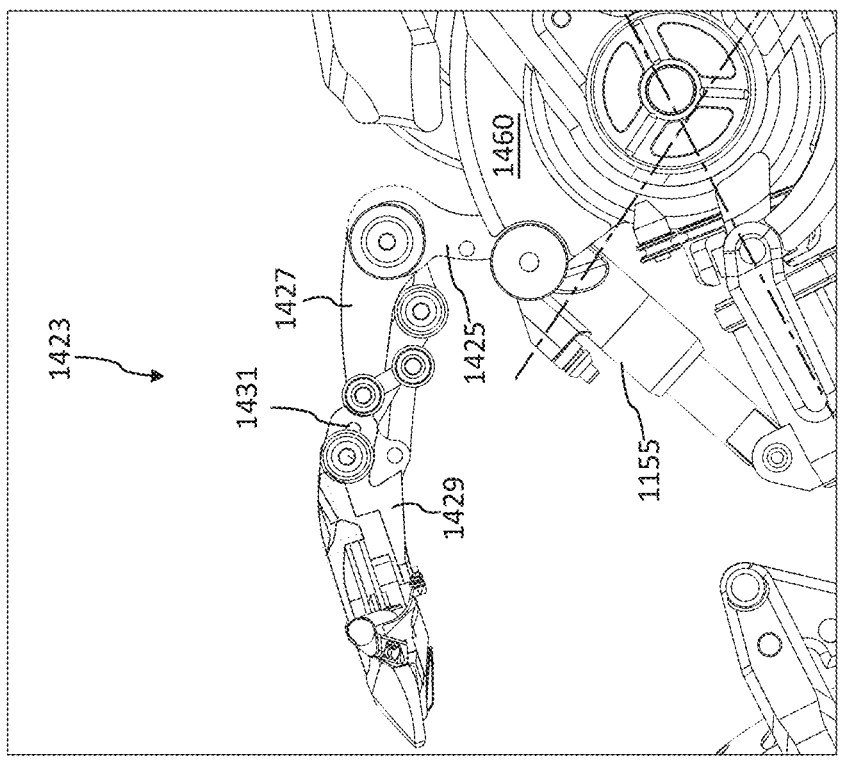

Referring now to FIGS. 28-29, handle bar support 1116 of vehicle 1100 includes a handle bar articulated linkage 1423 pivotally connected to a slidable support arm 1425 at pivot point 1464 to allow the height of handle bar 1309 to be adjusted. Pivot point 1464 may include a locking arrangement for locking the position of articulated linkage 1423 relative to slidable support arm 1425. For example, an adjustable type articulating clamp may be provided to lock the relative positions of articulated linkage 1423 and slidable support arm 1425. Slideable support arm 1325 is slideably connected to raceway 1462 of C-frame upper support arrangement 1460. Articulated linkage 1423 includes a first link 1427 and a second link 1429 that are pivotally connected at pivot point 1431. A biasing and dampening arrangement may be provided between the first link 1427 and second link 1429 of articulated linkage 1423 to provide a suspension or shock absorbing function for the handle bar support 1116. The handle bar 1309 is pivotally connected to the distal end of the second link 1429 of articulated linkage 1423 such that the handle bar is pivotable about a handle bar pivot axis 1312 (FIG. 18).

Broadly, this writing discloses at least the following. A vehicle includes a main vehicle body, a suspended assembly that supports the main body of the vehicle, a suspension system for connecting the suspended assembly to the main vehicle body, a position adjusting system for adjusting the positions of a handle bar, a set, a rider support platform, and the suspension systems of the vehicle relative to the main body of the vehicle and/or relative to one another, a multi-axis steering system for the vehicle, and a cable operated steering system for controlling a steerable wheel about each of the axes of the multi-axis steering system. The suspended assembly assists in providing directional control of the vehicle and stability in a lateral direction relative to a normal straight-ahead direction of travel of the vehicle. The suspension system including a first suspension arrangement that movably connects the suspended assembly to the main vehicle body and controls movement of the suspended assembly relative to the main vehicle body through a range of motion along a first path that is primarily perpendicular to the lateral direction. The suspension system also including a second suspension arrangement that controls movement of the suspended assembly relative to the main vehicle body through a range of motion along a second path that is primarily perpendicular to the lateral direction when the vehicle is traveling in the normal straight-ahead direction. The second path of the second suspension arrangement being different than the first path of the first suspension arrangement such that the combination of the range of motion of the first suspension arrangement along the first path and the range of motion of the second suspension arrangement along the second path result in an overall range of motion for the suspended assembly relative to the main body that is defined by a surface area.

This writing further discloses the following. A vehicle includes a suspended assembly that supports a main body and a suspension system for connecting the suspended assembly to the main vehicle body. The suspended assembly assists in providing directional control of the vehicle and stability in a lateral direction relative to a normal straight-ahead direction of travel of the vehicle. The suspension system including first and second suspension arrangements that control movement of the suspended assembly relative to the main vehicle body through a range of motion along first and second paths that are primarily perpendicular to the lateral direction. The second path differs from the first path such that the combination of the range of motion of the first suspension arrangement along the first path and the second path result in an overall range of motion for the suspended assembly relative to the main body that is defined by a surface area.

All elements, parts and steps described herein are preferably included. It is to be understood that any of these elements, parts and steps may be replaced by other elements, parts and steps or deleted altogether as will be obvious to those skilled in the art.

Concepts

This writing discloses at least the following Concepts.

Concept 1. A suspension system for use in a vehicle that has a main vehicle body and a suspended assembly that supports the main body of the vehicle, the suspended assembly assisting in providing directional control of the vehicle and stability in a lateral direction relative to a normal straight-ahead direction of travel of the vehicle, the suspension system comprising:

a first suspension arrangement that movably connects the suspended assembly to the main vehicle body and controls movement of the suspended assembly relative to the main vehicle body through a range of motion along a first path that is primarily perpendicular to the lateral direction; and a second suspension arrangement that controls movement of the suspended assembly relative to the main vehicle body through a range of motion along a second path that is primarily perpendicular to the lateral direction when the vehicle is traveling in the normal straight-ahead direction, the second path being different than the first path of the first suspension arrangement such that the combination of the range of motion of the first suspension arrangement along the first path and the range of motion of the second suspension arrangement along the second path result in an overall range of motion for the suspended assembly relative to the main body that is defined by a surface area when the vehicle is traveling in the normal straight-ahead direction.

Concept 2. A suspension system according to Concept 1 wherein the surface area is a planar surface area.

Concept 3. A suspension system according to Concept 1 wherein the surface area is a curved surface area.

Concept 4. A suspension system according to Concept 1, 2, or 3 wherein the first path of the first suspension arrangement is primarily horizontal and parallel with the normal straight-ahead direction of travel of the vehicle and the second path of the second suspension arrangement is primarily vertical and perpendicular to the normal straight-ahead direction of travel of the vehicle.

Concept 5. A suspension system according to Concept 1, 2, 3, or 4 wherein the first path of the first suspension arrangement is oriented at an angle in the range of about zero to thirty degrees (0°-30°) from horizontal.

Concept 6. A suspension system according to Concept 1, 2, 3, 4, or 5 wherein the suspended assembly that supports the vehicle includes a component selected from a group of components consisting of a wheel, a ski, a skid, a float, and a tread.

Concept 7. A suspension system according to Concept 1, 2, 3, 4, 5, or 6 wherein the second suspension arrangement movably connects the suspended assembly to the first suspension arrangement.

Concept 8. A suspension system according to Concept 7 wherein the first suspension arrangement includes a telescopic shock absorber having a longitudinal axis with a first end attached to the main body of the vehicle and a second end that is telescopically movable along the longitudinal axis of the telescopic shock absorber relative to the first end of the telescopic shock absorber and the main body of the vehicle such that the movable second end of the telescopic shock absorber controls movement of the suspended assembly relative to the main vehicle body through the range of motion along the first path.

Concept 9. A suspension system according to Concept 8 wherein:

the second suspension arrangement includes an articulated linkage having a first link, a second link, a third link, and a fourth link with each of the links having a first and a second spaced apart pivot point;

the articulated linkage connects the suspended assembly to the first suspension arrangement such that the first link is fixed to the movable second end of the telescopic shock absorber of the first suspension arrangement, the first pivot point of the first link is pivotally connected to the first pivot point of the second link at a first articulated linkage pivot point, the second pivot point of the first link is pivotally connected to the first pivot point of the third link at a second articulated linkage pivot point, the second pivot point of the second link is pivotally connected to the first pivot point of the fourth link at a third articulated linkage pivot point, the second pivot point of the third link is pivotally connected to the second pivot point of the fourth link at a fourth articulated linkage pivot point, and the fourth link is connected to and supports the suspended assembly; and the second suspension arrangement includes a shock absorber connected between the first link that is fixed to the movable second end of the telescopic shock absorber of the first suspension arrangement and one of the other links of the articulated linkage, the shock absorber being connected to the articulated linkage such that it controls movement of the suspended assembly relative to the movable second end of the telescopic shock absorber of the first suspension arrangement through the range of motion along the second path.

Concept 10. A suspension system according to Concept 1, 2, 3, 4, 5, 6, 7, 8, or 9 wherein the suspended assembly is a steerable suspended assembly with the suspended assembly being connected to the second suspension arrangement such that at least portions of the suspended assembly are rotatable relative to the second suspension arrangement about a first steering axis.

Concept 11. A suspension system according to Concept 10 wherein the rotation of the rotatable portions of the suspended assembly about the first steering axis is controlled by a steering assembly selected from a group of steering assemblies consisting of a hydraulic steering assembly, a pneumatic steering assembly, a cable steering assembly, a rack and pinion steering assembly, and a mechanical push rod steering assembly.

Concept 12. A suspension system according to Concept 10 or 11 wherein the second end of the telescopic shock absorber is rotatable about the longitudinal axis of the telescopic shock absorber relative to the first end of the telescopic shock absorber and the main body of the vehicle thereby providing a second steering axis.

Concept 13. A suspension system according to Concept 10, 11, or 12 wherein the rotation of the second end of the telescopic shock absorber is controlled by a steering assembly selected from a group of steering assemblies consisting of a hydraulic steering assembly, a pneumatic steering assembly, a cable steering assembly, a rack and pinion steering assembly, and a mechanical push rod steering assembly.

Concept 14. A suspension system according to Concept 1, 2, 3, 4, 5, 6, 7, 8, 9, 10, 11, 12, or 13 wherein the second suspension arrangement movably connects the suspended assembly to the main vehicle body.

Concept 15. A suspension system according to Concept 14 wherein:

the suspension system includes an articulated linkage that connects the suspended assembly to the main vehicle body;

the first suspension arrangement includes a first biasing and dampening arrangement connected between the main vehicle body and the articulated linkage to control movement of the suspended assembly relative to the main vehicle body through the range of motion along the first path; and the second suspension arrangement includes a second biasing and dampening arrangement connected between the main vehicle body and the articulated linkage to control movement of the suspended assembly relative to the main vehicle body through the range of motion along the second path.

Concept 16. A suspension system according to Concept 15 wherein the first and second biasing and dampening arrangements are shock absorbers.

Concept 17. A suspension system according to Concept 15 or 16 wherein:

a plurality of the links of the articulated linkage are rotational drive transmitting links that include a first and a second spaced apart hinge point, the spaced apart hinge points each having an associated axis of rotation that provides a pivot point for the articulated linkage, each rotational drive transmitting link including a driven member that is supported and rotates about the axis of the first hinge point of the rotational drive transmitting link and the associated pivot point of the articulated linkage, a drive member that is supported and rotates about the axis of the second hinge point of the rotational drive transmitting link and the associated pivot point of the articulated linkage, and a rotational drive mechanism for transmitting rotational movement from the driven member of the rotational drive transmitting link to the drive member of the rotational drive transmitting link; and the plurality of rotational drive transmitting links are connected to one another in series with the second hinge point of a given one of the rotational drive transmitting links being pivotally connected to the first hinge point of the next rotational drive transmitting link such that the drive member of the given rotational drive transmitting link rotationally drives the driven member of the next rotational drive transmitting link to rotate about the associated pivot point of the articulated linkage thereby providing the transmission of a rotational drive through the series of rotational drive transmitting links.

Concept 18. A suspension system according to Concept 17 wherein the rotational drive mechanism is a mechanism selected from the group of mechanisms consisting of a chain drive, a belt drive, a shaft drive, and a gear drive.

Concept 19. A suspension system according to Concept 17 or 18 wherein each rotational drive transmitting link includes an enclosed space that houses the associated drive member, driven member, and drive mechanism of the rotational drive transmitting link.

Concept 20. A suspension system according to Concept 15, 16, 17, 18, or 19 wherein:

the articulated linkage has a first link, a second link, a third link, and a fourth link with each of the links having a first and a second spaced apart pivot point;

the articulated linkage connects the suspended assembly to the main vehicle body such that the first pivot point of the first link and the first pivot point of the fourth link are pivotally connected to one another and pivotally connected to the main body of the vehicle at a first articulated linkage pivot point, the second pivot point of the first link is pivotally connected to the first pivot point of the second link at a second articulated linkage pivot point, the second pivot point of the fourth link is pivotally connected to the first pivot point of the third link at a third articulated linkage pivot point, and the second pivot point of the second link and the second pivot point of the third link are pivotally connected to one another at a fourth articulated linkage pivot point, the suspended assembly is connected to the articulated linkage;

the first suspension arrangement includes a first biasing and dampening arrangement connected between the main vehicle body and one of the links of the articulated linkage to control movement of the suspended assembly relative to the main vehicle body through the range of motion along the first path; and the second suspension arrangement includes a second biasing and dampening arrangement connected between the main vehicle body and another one of the links of the articulated linkage to control movement of the suspended assembly relative to the main vehicle body through the range of motion along the second path.

Concept 21. A suspension system according to Concept 20 wherein the first and second biasing and dampening arrangements are shock absorbers.

Concept 22. A suspension system according to Concept 1, 2, 3, 4, 5, 6, 7, 8, 9, 10, 11, 12, 13, 14, 15, 16, 17, 18, 19, 20, or 21 wherein the vehicle is a human powered vehicle selected from the group of vehicles consisting of a bicycle, a tricycle, and a quadracycle.

Concept 23 A suspension system according to Concept 1, 2, 3, 4, 5, 6, 7, 8, 9, 10, 11, 12, 13, 14, 15, 16, 17, 18, 19, 20, 21, or 22 wherein the suspension system includes a sensing arrangement for sensing certain characteristics of the movement of the suspension system and wherein the suspension system includes an arrangement for modifying the function of elements of the suspension system in response to the certain characteristics sensed by the sensing arrangement.

Concept 24. A rotational drive transmission for use in a vehicle, the transmission comprising:

an articulated linkage including a plurality of rotational drive transmitting links that each have a first and a second spaced apart hinge point, the spaced apart hinge points each having an associated axis of rotation that provides a pivot point for the articulated linkage, each rotational drive transmitting link including a driven member that is supported and rotates about the axis of the first hinge point of the rotational drive transmitting link and the associated pivot point of the articulated linkage, a drive member that is supported and rotates about the axis of the second hinge point of the rotational drive transmitting link and the associated pivot point of the articulated linkage, and a rotational drive mechanism for transmitting rotational movement from the driven member of the rotational drive transmitting link to the drive member of the rotational drive transmitting link;

the plurality of rotational drive transmitting links being connected to one another in series with the second hinge point of a given one of the rotational drive transmitting links being pivotally connected to the first hinge point of a next rotational drive transmitting link such that the drive member of the given rotational drive transmitting link rotationally drives the driven member of the next rotational drive transmitting link to rotate about the associated pivot point of the articulated linkage thereby providing the transmission of a rotational drive through the series of rotational drive transmitting links.

Concept 25. A transmission according to Concept 24 wherein the rotational drive mechanism for transmitting rotational movement from the driven member of one of the rotational drive transmitting links to the drive member of that rotational drive transmitting link includes a shifting arrangement for changing the drive ratio between the driven member and the drive member of that rotational drive transmitting link.

Concept 26. A transmission according to Concept 25 wherein the shifting arrangement includes a selecting arrangement for selecting any given one of a plurality of different drive ratios.

Concept 27. A transmission according to Concept 24, 25, or 26 wherein the rotational drive mechanism is a mechanism selected from the group of mechanisms consisting of a chain drive, a belt drive, a shaft drive, and a gear drive.

Concept 28. A transmission according to Concept 24, 25, 26, or 27 wherein each rotational drive transmitting link includes an enclosed space that houses the associated drive member, driven member, and drive mechanism of the rotational drive transmitting link.

Concept 29. A transmission according to Concept 24, 25, 26, 27, or 28 wherein:

the transmission includes a first and a second rotational drive transmitting link;

the vehicle is a wheeled vehicle that includes a main body, a suspended wheel assembly including a drive wheel that supports the main body of the vehicle, a suspension system for connecting the suspended wheel assembly to the main body of the vehicle, and a crank set assembly having a crank set rotational axis, the crank set allowing a rider of the vehicle to input a rotational drive about the crank set rotational axis;

the articulated linkage provides at least a portion of the suspension system for connecting the suspended wheel assembly to the main body of the vehicle;

the first rotational drive transmitting link is pivotally connected to the main body of the vehicle with the driven member of the first rotational drive transmitting link being rotationally connected to the crank set assembly such that the rotational drive input from the rider drives the driven member of the first rotational drive transmitting link; and the drive wheel is rotationally connected to the drive member of the second rotational drive transmitting link such that the drive member of the second rotational drive transmitting link drives the drive wheel thereby causing the rotational drive input from the rider to drive the drive wheel.

Concept 30. A transmission according to Concept 29 wherein the vehicle is a human powered vehicle selected from the group of vehicles consisting of a bicycle, a tricycle, and a quadracycle.

Concept 31. A rear wheel suspension adjusting arrangement for use in a vehicle including a frame having a front and a back, a suspended rear drive wheel that supports the frame, and a suspension system for connecting the rear drive wheel to the frame, the suspension adjusting arrangement comprising:

a configuration adjusting arrangement for changing the positioning of the suspension system relative to the frame such that the suspension system may be moved into an uphill configuration when the vehicle is traveling uphill and such that the suspension system may be moved into a downhill configuration when the vehicle is traveling downhill, and an activating arrangement for activating the configuration adjusting arrangement to cause the configuration adjusting arrangement to change the positioning of the suspension system relative to the frame while the vehicle is being used.

Concept 32. A suspension adjusting arrangement according to Concept 31 wherein the vehicle includes a front wheel, the vehicle has a wheel base that is defined by the distance between the front wheel and the rear wheel, and the suspension adjusting arrangement changes the wheel base of the vehicle as the configuration adjusting arrangement moves the suspension system between the uphill configuration and the downhill configuration.

Concept 33. A suspension adjusting arrangement according to Concept 31 or 32 wherein the vehicle is a human powered vehicle selected from the group of vehicles consisting of a bicycle, a tricycle, and a quadracycle.

Concept 34. A suspension adjusting arrangement according to Concept 31, 32, or 33 wherein the activating arrangement includes a sensor arrangement for sensing when the vehicle is traveling uphill and downhill.

Concept 35. A suspension adjusting arrangement according to Concept 31, 32, 33, or 34 wherein the activating arrangement is manually controlled by an operator of the vehicle.

Concept 36. A suspension adjusting arrangement according to Concept 31, 32, 33, 34, or 35 wherein the configuration adjusting arrangement includes an actuator selected from the group of actuators consisting of a motorized actuator, a pneumatic actuator, a hydraulic actuator, a cable driven actuator, a push rod driven actuator, and a magnetic actuator.

Concept 37. A suspension adjusting arrangement according to Concept 31, 32, or 33 wherein the vehicle further includes a crank set assembly having a crank set rotational axis, the crank set being configured to allow a rider to input a rotational drive about the crank set rotational axis for driving the rear drive wheel, the rear wheel has a rear wheel axis, the suspension system has an effective swing arm length that extends from the crank set rotational axis to the rear wheel axis, and the configuration adjusting arrangement decreases the effective swing arm length when the vehicle is traveling uphill and increases the effective swing arm length when the vehicle is traveling downhill.

Concept 38. A suspension adjusting arrangement according to Concept 37 wherein the activating arrangement includes a pivoting member that is pivotally connected to the frame of the vehicle about a pivoting member rotational axis that is parallel to, but spaced apart from, the crank set rotational axis, the crank set rotational axis being located below the pivoting member rotational axis when the vehicle is in an upright position such that the weight of the rider on the crank set causes the pivoting member to pivot causing the crank set rotational axis to move toward the front of the frame when the vehicle is traveling downhill and causing the crank set rotational axis to move toward the rear of the frame when the vehicle is traveling uphill, and the configuration adjusting arrangement includes a suspension pivot point that is located on the pivoting member above the pivoting member rotational axis when the vehicle is in the upright position, the suspension system being pivotally connected to the suspension pivot point of the pivoting member of the suspension adjusting arrangement such that the weight of the rider on the crank set causes the pivoting member to pivot with the suspension pivot point moving toward the rear of the frame causing the suspension system to move into a downhill configuration when the vehicle is traveling downhill and with the suspension pivot point moving toward the front of the frame causing the suspension system to move into a uphill configuration when the vehicle is traveling uphill.

Concept 39. A suspension adjusting arrangement according to Concept 38 wherein the suspension adjusting arrangement includes a dampening arrangement for dampening the speed of the pivoting of the pivoting member of the activating arrangement.

Concept 40. A steering system for use in a wheeled vehicle that has a main vehicle body and a steerable wheel that supports the main body of the vehicle, the steerable wheel having a wheel axis around which the wheel rotates in a wheel rotation plane that is perpendicular to the wheel axis, the steerable wheel assisting in providing directional control of the vehicle and stability in a lateral direction relative to a normal straight-ahead direction of travel for the vehicle, the steering system comprising:

a first steering arrangement that controls movement of the steerable wheel relative to the main vehicle body such that the steerable wheel pivots about a first steering axis; and a second steering arrangement that controls movement of the steerable wheel relative to the main vehicle body such that the steerable wheel pivots about a second steering axis, the second steering axis being different than the first steering axis.

Concept 41. A steering system according to Concept 40 wherein the first steering axis is primarily vertical allowing the first steering arrangement to move the steerable wheel through a range of motion that pivots the wheel rotation plane of the steerable wheel relative to the normal straight-ahead direction of travel and the second steering axis is primarily horizontal allowing the second steering arrangement to move the steerable wheel through a range of motion that tilts the wheel rotation plane of the steerable wheel relative to the normal straight-ahead direction of travel.

Concept 42. A steering system according to Concept 40 or 41 wherein the second steering axis of the second steering arrangement is oriented at an angle in the range of about zero to thirty degrees (0°-30°) from horizontal.

Concept 43. A steering system according to Concept 40, 41, or 42 wherein the vehicle is a human powered vehicle selected from the group of vehicles consisting of a bicycle, a tricycle, and a quadracycle.

Concept 44. A steering system for use in a vehicle that includes a main vehicle body, a suspended assembly that supports the main body of the vehicle, and a suspension arrangement for connecting the suspended assembly to the main body of the vehicle, the suspended assembly assisting in providing directional control of the vehicle, the steering system comprising:

an axle that makes up a portion of the suspended assembly, the wheel axle having an axle rotational axis and two bearing surfaces that are spaced apart from one another along the wheel axle rotational axis, the wheel axle defining an opening within the wheel axle that is located between the two spaced apart bearing surfaces;
a steering arrangement that is located within the opening within the axle, the steering arrangement defining a steering axis and the steering arrangement being rotatably connected to the wheel axle such that the wheel axle is movable about the steering axis; and
a steering actuator that is connected to the steering arrangement such that the steering actuator controls the movement of the wheel axle about the steering axis.

Concept 45. A steering system according to Concept 44 wherein the suspended assembly that supports the vehicle includes a component selected from a group of components consisting of a wheel, a ski, a skid, a float, and a tread.

Concept 46. A steering system according to Concept 44 or 45 wherein the vehicle is a human powered, wheeled vehicle selected from the group of vehicles consisting of a bicycle, a tricycle, and a quadracycle.

Concept 47. A steering system according to Concept 44, 45, or 46 wherein the opening within the wheel axle has a shape selected from the group of shapes consisting of a cylinder, a sphere, a combination of portions of a sphere, and a combination of one or more cylinders and portions of a sphere.

Concept 48. A steering system according to Concept 44, 45, 46, or 47 wherein the steering actuator includes a steering assembly selected from a group of steering assemblies consisting of a hydraulic steering assembly, a pneumatic steering assembly, a cable steering assembly, a rack and pinion steering assembly, and a mechanical push rod steering assembly.

Concept 49. A steering system according to Concept 44, 45, 46, 47, or 48 wherein portions of the steering actuator are enclosed within portions of the suspension arrangement.

Concept 50. A position adjusting arrangement for use in a wheeled vehicle including a seat for supporting a rider, a plurality of wheels with at least one of the wheels being a steerable wheel, a steering arrangement having a handle bar for allowing the rider to control the steerable wheel, and a hub for interconnecting the components of the wheeled vehicle, the position adjusting arrangement comprising:
an arrangement for connecting the wheels to the hub;
an adjustable seat support arrangement for connecting the seat to the hub, the adjustable seat support arrangement being movably connected to the hub;
an adjustable handle bar support arrangement for connecting the handle bar to the hub, the adjustable handle bar support arrangement being movably connected to the hub; and
a releasable position locking arrangement or system that is releasable by the rider when the rider is riding the vehicle, the position locking arrangement being configured to lock the relative positions of the hub, the adjustable seat support arrangement, and the adjustable handle bar support arrangement when the position locking arrangement is not released by the rider.

Concept 51. A position adjusting arrangement according to Concept 50 wherein the vehicle is a human powered vehicle selected from the group of vehicles consisting of a bicycle, a tricycle, and a quadracycle.

Concept 52. A position adjusting arrangement according to Concept 50 or 51 wherein;
the position adjusting arrangement further includes a variable length link for connecting the adjustable seat support arrangement to the adjustable handle bar support arrangement, the variable length link having a first end that is pivotally connected to the adjustable handle bar support arrangement and a second end that is pivotally connected to the adjustable seat support arrangement; and
the position locking arrangement includes a link locking arrangement for locking the variable length link at a desired length.

Concept 53. A position adjusting arrangement according to Concept 50, 51, or 52 wherein the adjustable seat support arrangement and the adjustable handle bar support arrangement are pivotally connected to one another at a same pivot point that they are pivotally connected to the hub.

Concept 54. A position adjusting arrangement according to Concept 50, 51, 52, or 53 wherein:
the hub includes a first portion that is connected to the wheels, a second portion that is connected to the adjustable seat support arrangement and the adjustable handle bar support arrangement, and a hub positioning arrangement that is configured to allow the first portion of the hub to move relative to the second portion of the hub; and
the position locking arrangement includes a hub position locking arrangement or hub position lock for locking the position of the first portion of the hub relative to the second portion of the hub.

Concept 55. A position adjusting arrangement according to Concept 54 wherein the hub positioning arrangement includes a slidable track connecting the first portion of the hub to the second portion of the hub.

Concept 56. A position adjusting arrangement according to Concept 54 wherein the second portion of the hub is connected to the first portion of the hub and the hub positioning arrangement is provided by the pivoting of the second portion of the hub relative to the first portion of the hub.

Concept 57. A signal arrangement for use in a vehicle by a vehicle operator to indicate the intentions of the operator of the vehicle, the signal arrangement comprising:
a plurality of signaling elements configured to indicate the operator's intention to continue traveling in a primarily straight-ahead direction.

Concept 58. A signal arrangement according to Concept 57 wherein the vehicle is a human powered vehicle selected from the group of vehicles consisting of a bicycle, a tricycle, and a quadracycle.

Concept 59. A signal arrangement according to Concept 57 or 58 wherein the plurality of signaling elements include a plurality of vertically spaced apart, upwardly pointing, lighted arrows that are controlled to illuminate in sequence from the lowermost arrow to the uppermost arrow when the operator activates the signal arrangement to indicate the intention to continue traveling in the primarily straight-ahead direction.

Concept 60. A bicycle seat for supporting a bicycle rider on a bicycle, the bicycle seat comprising:
a saddle for supporting the rider when the bicycle seat is attached to the bicycle, the saddle having a nose portion located at the front of the saddle when the seat is attached to the bicycle;
a seat mount having a first end configured to allow the bicycle seat to be attached to the bicycle and a second end that is pivotally connected to the saddle such that the seat mount supports the saddle and such that the nose portion of the saddle is free to pivot relative to the seat mount when the seat is attached to the bicycle; and
a biasing arrangement connected between the seat mount and the nose portion of the saddle for biasing the nose portion of the saddle into a desired position when the seat is attached to the bicycle, the biasing arrangement allowing the nose portion of the saddle to pivot downward relative to the rider when pressure is applied to the nose portion of the saddle.

Concept 61. A bicycle seat according to Concept 60 wherein the bicycle includes a frame and the seat mount includes a seat post for attaching the seat to the frame, the seat post being slidably connected to the frame to allow the position of the seat to be adjusted relative to the frame.

Concept 62. A collision impact reduction system for reducing the impact force associated with a collision on a passenger in a passenger carrying vehicle, the collision impact reduction system comprising:
- a suspended passenger compartment for carrying at least one passenger, the suspended passenger compartment being supported within the vehicle such that the suspended passenger compartment is movable within the vehicle in at least one direction in response to the vehicle colliding with another object;
- at least one shock absorbing mount for supporting the suspended passenger compartment within the vehicle, the shock absorbing mount being attached between the suspended passenger compartment and another portion of the vehicle to dampen the impact force associated with the collision that is transferred from the vehicle to the suspended passenger compartment and passenger in the at least one direction that the suspended passenger compartment is able to move within the vehicle.

Concept 63. The collision impact reduction system of Concept 62 wherein the collision impact reduction system further includes a guide track that extends in a longitudinal direction within the vehicle and wherein the suspended passenger compartment is connected to the guide track such that the suspended passenger compartment is movable in the longitudinal direction.

Concept 64. The collision impact reduction system of Concept 63 wherein the suspended passenger compartment is connected to the guide track such that the suspended passenger compartment may also pivot about the longitudinal direction of the guide track.

Concept 65. The collision impact reduction system of Concept 62, 63, or 64 wherein the at least one shock absorbing mount includes a front shock absorbing mount and a rear shock absorbing mount, the front shock absorbing mount being configured to dampen a frontal impact to the vehicle and the rear shock absorbing mount being configured to dampen a rear impact to the vehicle.

Concept 66. The collision impact reduction system of Concept 62, 63, 64, or 65 wherein the at least one shock absorbing mount is provided by a shock absorbing mount selected from the group consisting of a shock absorber, a foam mount, and a polymer mount.

Concept 67. The collision impact reduction system of Concept 62, 63, 64, 65, or 66 wherein the suspended passenger compartment includes a roll bar.

Concept 68. The collision impact reduction system of Concept 62, 63, 64, 65, 66, or 67 wherein the vehicle includes a steering system having a steering wheel located within the suspended passenger compartment for steering the vehicle, the steering system being configured to allow movement of the steering wheel with the suspended passenger compartment relative to the rest of the vehicle while maintaining steering control of the vehicle with the steering wheel.

Concept 69. The collision impact reduction system of Concept 68 wherein the steering system is a steering system selected from the group of steering systems consisting of a steering system having a telescoping articulated linkage, an electric steering system, a hydraulic steering system, a pneumatic steering system and a magnetically coupled steering system.

Concept 70. A wheeled vehicle having a position adjusting arrangement, a main vehicle body, a seat for supporting a rider, a plurality of wheels with at least one of the wheels being a steerable wheel, a handle bar for allowing the rider to control the steerable wheel, a first steering axis about which the steerable wheel is steerable, and a second steering axis about which the steerable wheel is steerable. One or both of the steering axes passes through the main vehicle body. The position adjusting arrangement includes a hub arrangement defining a portion of the main vehicle body, the hub arrangement includes a first hub portion and a second hub portion movable relative to one another, and at least one of the first hub portion and the second hub portion is movable relative to one of the steering axes, a seat support arrangement for connecting the seat to the hub arrangement, and a handle bar support arrangement for connecting the handle bar to the hub arrangement. The hub arrangement is configured for movably interconnecting the plurality of wheels, the seat support arrangement, and the handle bar support arrangement.

Concept 71. The wheeled vehicle and position adjusting arrangement of Concept 70 wherein the seat support arrangement and the handle bar support arrangement are each moveably connected to the hub arrangement such that the seat support arrangement and the handle bar support arrangement are movable relative to the main vehicle body.

Concept 72. The wheeled vehicle and position adjusting arrangement of Concept 70 or 71 wherein the hub arrangement further includes a slidable track connecting the first hub portion to the second hub portion.

Concept 73. The wheeled vehicle and position adjusting arrangement of Concept 70, 71, or 72 wherein the hub arrangement further includes a hub positioning arrangement, wherein the second hub portion is connected to the first hub portion and the hub positioning arrangement is provided by the pivoting of the second hub portion relative to the first hub portion.

Concept 74. The wheeled vehicle and position adjusting arrangement of Concept 70, 71, 72, or 73 wherein the hub positioning arrangement includes a hub position locking arrangement or hub position lock for locking the position of the first hub portion relative to the second hub portion.

Concept 75. The wheeled vehicle and position adjusting arrangement of Concept 70, 71, 72, 73, or 74 wherein the wheeled vehicle and position adjusting arrangement includes a releasable position locking arrangement or system that is releasable by the rider when the rider is riding the vehicle, the position locking arrangement configured to lock the relative positions of the hub arrangement, the seat support arrangement, and the handle bar support arrangement when the position locking arrangement is not released by the rider.

Concept 76. The wheeled vehicle and position adjusting arrangement of Concept 70, 71, 72, 73, 74, or 75 wherein the wheeled vehicle and position adjusting arrangement includes a first axis steering arrangement or system that controls movement of the steerable wheel relative to the main vehicle body about the first steering axis and a second axis steering arrangement or assembly that controls movement of the steerable wheel relative to the main vehicle body about the second steering axis.

Concept 77. The wheeled vehicle and position adjusting arrangement of Concept 70, 71, 72, 73, 74, 75, or 76 wherein the first axis steering assembly and the second axis steering assembly each includes a cable steering system disposed along the handle bar support arrangement.

Concept 78. The wheeled vehicle and position adjusting arrangement of Concept 70, 71, 72, 73, 74, 75, 76, or 77 wherein the handle bar is moveable relative to the handle bar support arrangement about a first handle bar steering axis and movement of the handle bar about the first handle bar steering axis controls movement of the steerable wheel about the first steering axis.

Concept 79. The wheeled vehicle and position adjusting arrangement of Concept 70, 71, 72, 73, 74, 75, 76, 77, or 78 wherein the handle bar is further moveable relative to the handle bar support arrangement about a second handle bar steering axis and movement of the handle bar about the second handle bar steering axis controls movement of the steerable wheel about the second steering axis.

Concept 80. The wheeled vehicle and position adjusting arrangement of Concept 70, 71, 72, 73, 74, 75, 76, 77, 78, or 79 wherein the first axis steering assembly further includes a rotatable steering tube assembly disposed between the steerable wheel and the main vehicle body and the longitudinal axis of the steering tube assembly defines the first steering axis, wherein a portion of the steering tube assembly is rotatable relative to the main vehicle body about the first steering axis.

Concept 81. A wheeled vehicle having a main vehicle body, a seat for supporting a rider, a plurality of wheels with at least one of the wheels being a steerable wheel, and a handle bar for allowing the rider to control the steerable wheel, the wheeled vehicle having a first steering axis and a second steering axis wherein at least one of the first and second steering axes extends through the main vehicle body, the position adjusting arrangement includes a hub arrangement defining a portion of the main vehicle body, the hub arrangement interconnecting the plurality of wheels, the seat, and the handle bars of the wheeled vehicle, the hub arrangement having a first hub portion and a second hub portion that are movable relative to one another, a seat support arrangement for connecting the seat to the hub arrangement, a handle bar support arrangement for connecting the handle bar to the hub arrangement, a first axis steering assembly configured to control movement of the steerable wheel relative to the main vehicle body about the first steering axis, and a second axis steering assembly configured to control movement of the steerable wheel relative to the main vehicle body about the second steering axis.

Concept 82. The position adjusting system of Concept 81 wherein the first axis steering assembly includes a cable steering system disposed along the handle bar support arrangement, wherein movement of the handle bar about a handle bar steering axis controls movement of the steerable wheel about the first steering axis.

Concept 83. The position adjusting system of Concept 81 or 82, wherein the second axis steering assembly includes a cable steering system disposed along the handle bar support, wherein movement of the handle bar about a handle bar steering axis controls movement of the steerable wheel about the second steering axis.

Concept 84. The position adjusting system of Concept 81, 82, or 83, wherein the cable steering system of the first axis steering assembly is different from the cable steering system of the second axis steering assembly.

Concept 85. The position adjusting system of Concept 81, 82, 83, or 84, wherein the handle bar steering axis of the first axis steering assembly is different from the handle bar steering axis of the second axis steering assembly Concept 86. The wheeled vehicle and position adjusting arrangement of Concept 81, 82, 83, 84, or 85, wherein the first and second hub portions are moveably coupled to one another at a hub axle.

Concept 87. A wheeled vehicle including a main vehicle body, a seat coupled to the main vehicle body for supporting a rider, a plurality of wheels coupled to the main vehicle body wherein at least one of the wheels is a steerable wheel that is steerable about a first steering axis and a second steering axis that is different from said first steering axis, a handle bar for allowing the rider to control the steerable wheel, and a cable steering system for controlling the steerable wheel about the first steering axis and the second steering axis. The cable steering system includes a first axis steering assembly, a second axis steering assembly, a first cable operably connected between the handle bar and the first axis steering assembly, and a second cable operably connected between the handle bar and the second axis steering assembly. Movement of the handle bar about a first handle bar steering axis moves the first cable which thereby controls the first axis steering assembly to move the steerable wheel about the first steering axis and movement of the handle bar about a second handle bar steering axis moves the second cable which thereby controls the second axis steering assembly to move the steerable wheel about the second steering axis.

Concept 88. The vehicle of Concept 87, further including a hub defining a portion of the main vehicle bod and provided for interconnecting the plurality of wheels, the seat, and the handle bar of the wheeled vehicle. The hub includes a first hub portion and a second hub portion that are either slideably movable relative to one another, pivotably movable relative to one another, or a combination of slideably and pivotably movable relative to one another.

Concept 89. The vehicle of Concept 87 or 88, wherein the first axis steering assembly includes a rotatable steering tube assembly between the steerable wheel and the main vehicle body. The longitudinal axis of the steering tube assembly defines the first steering axis. A portion of the steering tube assembly is rotatable relative to the main vehicle body about the first steering axis.

Changes and modifications in the specifically described embodiments can be carried out without departing from the principles of the present invention which is intended to be limited only by the scope of the appended claims, as interpreted according to the principles of patent law including the doctrine of equivalents.

LISTING OF REFERENCE NUMERALS

100 Vehicle
102 Front Suspension System
104 Rear suspension System
106 Main Vehicle Body
108 Suspended Assembly
110 Suspended Assembly
112 Hub Arrangement
114 Seat Support Arrangement
116 Handle Bar Support Arrangement
118 Front Wheel
120 Rear Wheel
122 First Front Suspension Arrangement
124 First Front Path
126 Second Front Suspension Arrangement
128 Second Front Path
130 Telescoping Shock Absorber 132 Longitudinal Axis
134 First End
136 Second End
138 Articulated Linkage
140 First Link
142 Second Link
144 Third Link
146 Fourth Link
148 First Pivot Point
150 Second Pivot Point
152 Third Pivot Point
154 Fourth Pivot Point
156 Wheel Hub
158 Shock Absorber
159 Pivot Point
160 Rocker Arm
161 Pull Link
162 Pivot Point
163 Pivot Point
164 Pivot Point
166 First Steering Axis
168 Second Steering Axis
170 First Rear Suspension Arrangement
172 First Rear Path
174 Second Rear Suspension Arrangement
176 Second Rear Path
178 Articulated Linkage
180 First Biasing and Dampening Arrangement
182 Second Biasing and Dampening Arrangement
184 First Link
186 Second Link
188 Third Link
190 Fourth Link
192 First Pivot Point
194 Second Pivot Point
196 Third Pivot Point
198 Fourth Pivot Point
200 Wheel Hub Motor
202 Suspension Adjusting Arrangement
204 Sensor Arrangement
206 Adjusting Arrangement
208 Control Arrangement
210 Crank Assembly
212 Rotational Drive Transmission Arrangement
214 Drive Transmitting Articulated Linkage
216 Driven Member
218 Driven Member
220 Drive Member
222 Drive Member
224 Rotational Drive Mechanism
226 Rotational Drive Mechanism
228 Shifting Arrangement
230 Selecting Arrangement
300 Multi-Axis Steering System
302 Front Wheel Axis
304 First Steering Arrangement
306 Second Steering Arrangement
308 Handle Bar
310 Outward End
312 First Handle Bar Steering Axis
314 Second Handle Bar Steering Axis
316 Axle
318 First Bearing
320 Second Bearing
322 Opening
400 Position Adjusting Arrangement
402 Seat
404 Position Locking Arrangement
406 Variable Length Link
408 First End
410 Second End
412 Link Locking Arrangement
414 Biasing Arrangement
416 First End
418 Second End
420 Pivot Point
422 Second Pivot Point
424 Hub Locking Arrangement
426 First Link
428 Second Link
430 Pivot Point
432 Slidable Track
500 Rear Suspension Adjusting Arrangement
502 Vehicle
504 Frame
506 Suspended Rear Drive Wheel
508 Suspension System
510 Configuration adjusting Arrangement
512 Activation Arrangement
514 Crank Set Assembly
516 Crank Set Rotational Axis
518 Rear Wheel Axis
520 Pivoting Member
522 Pivoting Member Rotational Axis
524 Suspension Pivot Point
526 Dampening Arrangement
528 Sensor Arrangement
530 Front Wheel
600 Signal Arrangement
602 Signal Element
604a-c Lighted Arrow
606 Controller
608 Additional Lighted Element
610 Lighted Arrow
612 Lighted Arrow
700 Bicycle Seat
702 Saddle
704 Nose Portion
706 Seat Mount
708 First End
710 Second End
712 Biasing Arrangement
714 Frame
716 Seat Post
800 Collision Impact Reduction System
802 Vehicle
804 Suspended Passenger Compartment
806 First Shock Absorbing Mount
808 Second Shock Absorbing Mount
810 Guide Track
812 Longitudinal Direction
814 Linear Bearing
816 Additional Shock Absorbing Mount
818 Passenger Safety Frame
820 Crumple Zone Structure
822 Vehicle Body
824 Roll Bar
826 Steering System
828 Steering Wheel
830 Telescopic Section
900 Vehicle
1100 Vehicle
1102 Front Suspension System
1104 Rear Suspension System 1106 Main Vehicle Body
1109 Front Suspended Assembly
1110 Rear Suspended Assembly
1112 Hub Arrangement
1114 Seat Support Arrangement
1116 Handle Bar Support Arrangement
1118 Front Wheel
1120 Rear Wheel
1122 First Front Suspension Arrangement
1124 First Front Path
1127 Second Front Suspension Arrangement
1128 Second Front Path
1130 Telescopic Shock Absorber
1131 Pivot Point
1132 Longitudinal Axis
1133 Strut
1134 First End of Telescopic Shock Absorber
1135 Steering Tube Assembly
1136 Second End of Telescopic Shock Absorber
1137 Steer Tube Housing/Outer Steer Tube
1139 Inner Steer Tube
1141 First Link
1143 Second Link
1145 Fixed Front Fork Assembly
1147 Fork Pivot Point
1155 Front Shock Absorber
1157 Pivot Point
1163 Pivot Point
1167 First Steering Axis
1169 Second Steering Axis
1170 First Rear Suspension Arrangement
1172 First Rear Path
1174 Second Rear Suspension Arrangement
1176 Second Rear Path
1179 Articulated Linkage
1181 Rear Shock Absorber
1183 Pivot Point
1185 First Link/Rear Swing Arm
1185a Swing Arm Extension
1187 Second Link
1189 Third Link/Drive Link
1191 Fourth Link/Articulating Drive Transmitting Link
1193 Pivot Point
1195 Pivot Point
1197 Pivot Point
1199 Pivot Point
1201 Electric Drive Motor
1212 Rotational Drive Transmission Arrangement
1214 Drive Transmitting Articulated Linkage
1224 Rotational Drive Mechanism
1226 Rotational Drive Mechanism
1227 Rotational Drive Mechanism
1232 Rotational Drive Mechanism
1234 Rotational Drive Transmission Arrangement
1236 Non-Articulating Swing Arm
1238 Main Vehicle Body
1240 Pivot Point
1242 Rotational Drive Mechanism
1244 Torque Transfer Arrangement
1246 Rotational Drive Mechanism
1248 Wheel Hub
1301 Cable Steering System
1309 Handle Bar
1312 First Handle Bar Steering Axis
1315 Steering Actuation Linkage
1317 First Link
1319 Second Link
1401 Position Adjusting Arrangement
1402 Seat
1421 Hub Pivot Axis
1423 Handlebar Articulated Linkage
1425 Slideable Base
1427 First Link
1429 Second Link
1431 Pivot Point
1434 Orbital Steering Arrangement
1436 Front Orbital Assembly
1438 Rear Orbital Assembly
1440 Hub Axle
1442 Hub Orbit Axis
1446 Inner C Frame
1444 Outer C Frame
1448 Raceway
1450 Arcuate Rail
1452 C-Frame Rotation Locking Arrangement
1454 Rail Hole
1456 Removable Dowel
1458 Dowel Lever
1460 C-Frame Upper Support Arrangement
1462 Raceway
1464 Pivot Point
1466 Rider Foot Support Arrangement
1468 Foot Support Platform
1470 Rider Foot Support Arrangement
1472 Foot Support Platform

The invention claimed is:

1. A wheeled vehicle comprising:
a main vehicle body;
a seat for supporting a rider;
a plurality of wheels with at least one of said wheels being a steerable wheel having a first steering axis and a second steering axis that is different from said first steering axis, wherein said second steering axis passes through said main vehicle body; and
a handle bar for allowing the rider to control said steerable wheel;
a position adjusting assembly comprising:
a hub defining a portion of said main vehicle body, said hub comprising a first hub portion and a second huh portion movable relative to one another, wherein said first hub portion is movable relative to one of said steering axes;
a seat support for connecting said seat to said hub; and
a handle bar support for connecting said handle bar to said hub;
wherein said hub is configured for movably interconnecting said plurality of wheels, said seat support, and said handle bar support relative to said main vehicle body.

2. The wheeled vehicle according to claim 1, wherein said seat support and said handle bar support are each moveably connected to said hub such that said seat support and said handle bar support are movable relative to one another.

3. The wheeled vehicle according to claim 1, wherein said hub further comprises a slidable track connecting said first hub portion to said second hub portion.

4. The wheeled vehicle according to claim 1, wherein said second huh portion is pivotally connected to said first hub portion.

5. The wheeled vehicle according to claim 4, wherein said hub comprises a hub position lock for selectively locking the position of said first hub portion against pivoting relative to said second hub portion.

6. The wheeled vehicle according to claim 1, further comprising a position locking system that is releasable by the rider when the rider is riding said vehicle, said position locking system configured to lock the positions of said hub, said seat support, and said handle bar support relative to one another when said position locking system is not released by the rider.

7. The wheeled vehicle according to claim 1, further comprising a first axis steering assembly that controls movement of said steerable wheel relative to said main vehicle body about said first steering axis and a second axis steering assembly that controls movement of said steerable wheel relative to said main vehicle body about said second steering axis.

8. The wheeled vehicle according to claim 7, wherein said first axis steering assembly and said second axis steering assembly each comprises a respective cable steering system disposed along said handle bar support.

9. The wheeled vehicle according to claim 1, wherein said handlebar is operable to control said steerable wheel about said first and second steering axes simultaneously.

10. The wheeled vehicle according to claim 1, wherein said handle bar is moveable relative to said handle bar support about a first handle bar steering axis and a second handle bar steering axis, wherein movement of said handle bar about said first and second handle bar steering axes controls movement of said steerable wheel about said first and second steering axes, respectively.

11. The wheeled vehicle according to claim 10, wherein said first axis steering assembly further comprises a rotatable steering tube assembly disposed between said steerable wheel and said main vehicle body, the longitudinal axis of said steering tube assembly defines said first steering axis, and a portion of said steering tube assembly is rotatable relative to said main vehicle body about said first steering axis.

12. A position adjusting system for use in a wheeled vehicle having a main vehicle body, a seat for supporting a rider, a plurality of wheels with at least one of the wheels being a steerable wheel, and a handle bar for allowing the rider to control the steerable wheel, the steerable wheel being steerable about a first steering axis and a second steering axis wherein at least one of the first and second steering axes extends through the main vehicle body, said position adjusting system comprising:
a hub defining a portion of the main vehicle body, said hub interconnecting the plurality of wheels, the seat, and the handle bars of the wheeled vehicle, said hub having a first hub portion and a second hub portion that are movable relative to one another;
a seat support for connecting the seat to said hub;
a handle bar support for connecting the handle bar to said hub;
a first axis steering assembly configured to control movement of the steerable wheel relative to the main vehicle body about the first steering axis; and
a second axis steering assembly configured to control movement of the steerable wheel relative to the main vehicle body about the second steering axis.

13. The position adjusting system according to claim 12, wherein the first steering axis is in an upright orientation, and the second steering axis is in a generally horizontal orientation and parallel to a plane that vertically bisects the main vehicle body.

14. The position adjusting system according to claim 12, wherein:
said first axis steering assembly comprises a cable steering system disposed along said handle bar support such that movement of said handle bar about a first handle bar steering axis controls movement of said steerable wheel about the first steering axis; and
said second axis steering assembly comprises a cable steering system disposed along said handle bar support such that movement of said handle bar about a second handle bar steering axis controls movement of said steerable wheel about the second steering axis.

15. The position adjusting system according to claim 14, wherein said cable steering system of said first axis steering assembly is different from said cable steering system of said second axis steering assembly.

16. The position adjusting system according to claim 14, wherein the handle bar steering axis of said first axis steering assembly is different from the handle bar steering axis of said second axis steering assembly.

17. The position adjusting system according to claim 12, wherein said first and second hub portions are moveably coupled together at a hub axle.

18. A wheeled vehicle comprising:
a main vehicle body;
a seat coupled to said main vehicle body for supporting a rider;
a plurality of wheels coupled to said main vehicle body, at least one of said wheels being a steerable wheel having a first steering axis and a second steering axis that is different from said first steering axis;
a handle bar for allowing the rider to control said steerable wheel; and
a cable steering system for controlling said steerable wheel about said first steering axis and said second steering axis, said cable steering system comprising:
a first axis steering assembly;
a second axis steering assembly;
a first cable operably connected between said handle bar and said first axis steering assembly; and
a second cable operably connected between said handle bar and said second axis steering assembly;
wherein movement of said handle bar about a first handle bar steering axis moves said first cable which controls said first axis steering assembly to move said steerable wheel about said first steering axis; and
wherein movement of said handle bar about a second handle bar steering axis moves said second cable which controls said second axis steering assembly to move said steerable wheel about said second steering axis.

19. The vehicle of claim 18, further comprising a hub defining a portion of said main vehicle body, said hub interconnecting said plurality of wheels, said seat, and said handle bars of said wheeled vehicle, said hub having a first hub portion and a second hub portion that are at least one chosen from slideably movable relative to one another and pivotably movable relative to one another.

20. The vehicle of claim 18, wherein said first axis steering assembly comprises a rotatable steering tube assembly disposed between said steerable wheel and said main vehicle body, the longitudinal axis of said steering tube assembly defines said first steering axis, and a portion of said steering tube assembly is rotatable relative to said main vehicle body about said first steering axis.

* * * * *

UNITED STATES PATENT AND TRADEMARK OFFICE
CERTIFICATE OF CORRECTION

| | | |
|---|---|---|
| PATENT NO. | : 11,999,435 B2 | Page 1 of 1 |
| APPLICATION NO. | : 17/348069 | |
| DATED | : June 4, 2024 | |
| INVENTOR(S) | : Jeffrey Michael | |

It is certified that error appears in the above-identified patent and that said Letters Patent is hereby corrected as shown below:

In the Claims

Column 72, Claim 1:
Line 42, "huh" should be --hub--

Column 72, Claim 4:
Line 60, "huh" should be --hub--

Column 73, Claim 12:
Line 47, "arc" should be --are--
Line 51, "huh" should be --hub--

Signed and Sealed this
Ninth Day of July, 2024

Katherine Kelly Vidal
*Director of the United States Patent and Trademark Office*